(12) United States Patent
Nishiyama et al.

(10) Patent No.: US 6,888,678 B2
(45) Date of Patent: May 3, 2005

(54) IRREGULAR-SHAPE BODY, REFLECTION SHEET AND REFLECTION-TYPE LIQUID CRYSTAL DISPLAY ELEMENT, AND PRODUCTION METHOD AND PRODUCTION DEVICE THEREFOR

(75) Inventors: Seiji Nishiyama, Osaka (JP); Naohide Wakita, Osaka (JP); Hirofumi Kubota, Ishikawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 132 days.

(21) Appl. No.: 10/203,930

(22) PCT Filed: Feb. 16, 2001

(86) PCT No.: PCT/JP01/01140
§ 371 (c)(1),
(2), (4) Date: Dec. 13, 2002

(87) PCT Pub. No.: WO01/61383
PCT Pub. Date: Aug. 23, 2001

(65) Prior Publication Data
US 2003/0142247 A1 Jul. 31, 2003

(30) Foreign Application Priority Data

| Feb. 16, 2000 | (JP) | ........................................ | 2000-037613 |
| Mar. 23, 2000 | (JP) | ........................................ | 2000-081205 |
| Jun. 16, 2000 | (JP) | ........................................ | 2000-181102 |

(51) Int. Cl.$^7$ .............................................. G02B 5/02
(52) U.S. Cl. ..................... 359/599; 359/619; 359/627
(58) Field of Search ..................... 359/599, 619–629, 359/850–855, 70–79; 349/67, 113

(56) References Cited
U.S. PATENT DOCUMENTS
4,456,336 A * 6/1984 Chung et al. ............... 349/160
(Continued)

FOREIGN PATENT DOCUMENTS

| JP | 61-6390 | 2/1986 |
| JP | 4-243226 | 8/1992 |
| JP | 5-281533 | 10/1993 |
| JP | 6-27481 | 2/1994 |
| JP | 10-177106 | 6/1998 |
| JP | 8-184846 | 7/1998 |
| JP | 11-101992 | 4/1999 |
| JP | 11-125707 | 5/1999 |
| JP | 11-237325 | 8/1999 |

OTHER PUBLICATIONS

"Trend of Reflective Color Liquid Crystal Displays", "Tatsuo Uchida", Department of Electronic Engineering, Faculty of Engineering, Aoba–ku, Sendai, Japan, pp. 23–27.
(Continued)

Primary Examiner—Mohammad Sikder
(74) Attorney, Agent, or Firm—McDermott Will & Emery LLP

(57) ABSTRACT

In a method for manufacturing a reflector having a plurality of convex portions 4 that are obtained by means of melt deformation of column-shaped bodys 15 formed of a photosensitive resin material, the photosensitive resin material has aspect ratio vs. average tilt angle characteristics in which an average tilt angle θ reaches a maximum value through an incremental change process and then converges to a certain value through a decremental process when an aspect ratio is gradually increased from a value close to zero, provided that the average tilt angle of the convex portion is an angle of elevation from the outer periphery of the bottom surface of the convex portion 4 to an apex of the convex portion and that the aspect ratio is a ratio of the height of said column-shaped body 15 with respect to the width thereof. A set value for the aspect ratio of the column-shaped body 15 that is obtained after the development step is determined to be a larger aspect ratio than a starting point from which convergence to said certain value begins. This configuration provides a reflector having good contrast characteristics and PAPER WHITE APPEARANCE, and a reflective liquid crystal display panel that uses the above-mentioned reflector.

15 Claims, 42 Drawing Sheets

U.S. PATENT DOCUMENTS

| | | | | |
|---|---|---|---|---|
| 4,485,264 A | * | 11/1984 | Izu et al. | 136/244 |
| 4,991,940 A | * | 2/1991 | Dalisa et al. | 349/113 |
| 5,018,837 A | * | 5/1991 | McKee et al. | 349/63 |
| 5,020,882 A | * | 6/1991 | Makow | 349/74 |
| 5,500,750 A | | 3/1996 | Kanbe et al. | |
| 5,973,843 A | | 10/1999 | Nakamura | |
| 6,061,110 A | * | 5/2000 | Hisatake et al. | 349/113 |
| 6,327,088 B1 | * | 12/2001 | Iwata et al. | 359/599 |
| 6,331,672 B1 | * | 12/2001 | Matsuda et al. | 136/256 |

OTHER PUBLICATIONS

"Optimization of Property of Reflective Color LCDs", "Norio Sugiura and Tatsuo Uchida", Faculty of Engineering, Tohoku University, Sendai, Japan, pp. 152–157.

* cited by examiner (a)

(b)

(a)

(b)

(c)

IRREGULAR-SHAPE BODY, REFLECTION SHEET AND REFLECTION-TYPE LIQUID CRYSTAL DISPLAY ELEMENT, AND PRODUCTION METHOD AND PRODUCTION DEVICE THEREFOR

TECHNICAL FIELD

The present invention relates to a reflector and a reflective liquid crystal display panel as well as to a method for manufacturing them and a manufacturing equipment with which bright and good image display can be provided with lower consumption current by using ambient light.

BACKGROUND TECHNIQUE (First Background Art)

Reflective liquid crystal display devices reflect ambient light from a reflector that is disposed inside the liquid crystal display device to provide a display. No backlight as a light source is required accordingly in contrast to conventional transmissive liquid crystal display devices. Consequently, an increased number of them are mounted on cell phones and portable information terminals, as a display device that can reduce consumption power as compared with transmissive liquid crystal display devices.

Reflective liquid crystal display devices comprises a liquid crystal display mode of, for example, a TN (twisted nematic) type, an STN (suoer twisted nematic) type, a GH (guest-host) type, or a PDLC type (polymer dispersed liquid crystal), a substrate having TFTs (thin flat transistors) or TFDs (thin flat diodes) that are cells for writing a video signal or a simple matrix substrate, and a reflector that is disposed inside or outside the liquid crystal display panel to reflect ambient light.

Reflective liquid crystal display devices have several requirements to provide good display qualities, of which white display is most important. Of the above-mentioned liquid crystal display modes, it is required from the display performance viewpoints that bright and white display can be provided when a liquid crystal material layer is under the state of transmitting the ambient light. In order to achieve such display performances, control of reflection characteristics of a reflector is an important factor.

Mirror-like reflectors largely depend on viewing angles because the display is bright only in a direction, that is, a regular reflection direction, along which incident lights reflect as reflected lights. Thus, diffusivity reflectors currently prevail that allow bright display in a certain range of viewing angles. In order to impart diffusivity to the reflector, a concave/convex shape is usually formed on a surface of the reflector.

As to the concave/convex shape on the surface of the reflector, the following facts are already known.

(1) The pitch of a convex shape is in the range of from 1 $\mu$m to 100 $\mu$m, the height of the irregularities is in the range of from 0.1 $\mu$m to 10 $\mu$m, and the tilt angle of the irregularities is from 0 degrees to 30 degrees, with respect to a horizontal surface of a substrate, in which the distance between peaks of the irregularities is not constant (Japanese Patent Publication No. 61-6390).

(2) In a reflector having a irregular concave/convex structure, a value obtained by standardizing a half-value width of a distance distribution graph between adjacent convex portions or concave portions with an average value of the distances between the adjacent convex portions or concave portions is in the range of from 0.3 to 0.9 (Japanese Patent Laid-open No. 8-184846).

(3) In a reflector having a irregular concave/convex structure, an average distance between adjacent convex portions or concave portions is in the range of from 1 $\mu$m to 80 $\mu$m (Japanese Patent Laid-open No. 8-184846). Thus, a random arrangement of concave/convex structure is an essential requirement of the conventional art.

However, reflectors are considered to be optimum when they control the diffusion characteristics such that the diffusivity is limited within a certain range of viewing angle and diffused light is concentrated to this specified range to provide uniform brightness in this range (N. Sugiura and T. Uchida, AM-LCD95 digest, 153 (1995); T. Uchida, AM-LCD95 digest, 23 (1995)).

When concave/convex structures are arranged irregularly during the control of the diffusion characteristics to become optimum, a flat portion between the concave/convex structures becomes relatively large. The amount of reflected lights in the regular reflection becomes relatively large with respect to the incident lights, accordingly.

On the other hand, when the concave/convex structures have regularity or recurrency to reduce the percentage of an area occupied by the flat portion, these configurations serve as a diffraction grating. The diffraction grating emits light having high intensity at a certain wavelength in a certain direction. Thus, rainbow-like coloring is sensed and white diffusivity is blocked due to the wavelength dependence of the diffraction grating.

(Second Background Art)

With rapid growth of mobile terminals, reflective liquid crystal panels are getting a lot more attention. The reflective liquid crystal panel reflects ambient light to provide a display. Sufficient display characteristics are achieved in environments such as outdoors where strong ambient light is available. However, visibility is significantly lower in a dark indoors or during night time.

Accordingly, in a reflective liquid crystal panel, it is desirable to improve reflectance in the direction of a viewer by using a diffusive reflector that reflects and concentrates lights received from peripheries toward the viewer. As means to achieve this, a technique to form a plurality of concave/convex structures on a pixel electrode is disclosed (Japanese Patent Laid-open No. 5-281533). In this event, concave/convex structures having a plurality of layers are formed through repeated processes of coating and exposure of a photosensitive polymer film, a development treatment, and a subsequent thermal annealing treatment.

The reflectance of a panel in the direction of a viewer depends on a concave/convex shape of a reflective layer. With ideal reflection characteristics, it is necessary to keep a high luminance in the range of from perpendicular to a polar angle of 30°.

In order to provide ideal reflectance characteristics, a sloped surface of a convex portion of the concave/convex shape is required to be precipitous as in a generally triangle shape. However, no technique is known conventionally to easily form a sloped surface of the concave/convex shape into a generally triangle shape. In addition, the formation of the concave/convex shapes conventionally involves repeated processes of coating and exposure of a photosensitive polymer film, and development and thermal annealing treatments. The processes are complicated and there is a challenge associated with productivity.

(Third Background Art)

In recent years, as AV equipment and information equipment has been reduced in size and thickness, demands on liquid crystal display panel for such equipment has been increased. For the information equipment, liquid crystal display panels that are available for more portable notebook personal computers are required, with the advent of the multimedia society. In the field of portable information terminals, a thinner and lighter liquid crystal display panel that consumes less power has been desired. In particular, reflective liquid crystal display panels require no light source such as a backlight unit because they reflect ambient light to show images. Accordingly, the reflective liquid crystal display panels have a chance of being reduced in side, weight, and consumption power, as compared with conventional transmissive liquid crystal display panels. As display modes for the reflective liquid crystal display panels, the TN (twisted nematic) method, the STN (super twisted nematic) method, a guest-host method with dichroic pigments are used more frequently.

In the reflective liquid crystal display panels, the intensity of light that reflects and diffuses incident lights in a perpendicular regular angle of visibility of a display screen should be increased in order to provide brighter and better display. Furthermore, it is preferable that the incident lights reflect and diffuse, in the direction of the regular angle of visibility, ambient light that is directed from a predetermined direction at a certain angle as well as reflect and diffuse, in the direction of the regular angle of visibility, the ambient light that is directed from various directions at random angles. Accordingly, it becomes necessary to prepare a reflector having optimum reflection characteristics that allows efficient use of the ambient light directed from any direction as display light. The term "optimum reflection characteristics" as used herein means that the reflector has characteristics of reflecting incident lights over a wide range with high reflectance.

Using conventional reflectors such as those having a mirror-faced metal film deposited on a substrate, the incident lights reflect only in the regular reflection direction. The reflectance is low in the directions other than the direction of the regular reflection. Consequently, the display screen is significantly dark in a viewing direction of a viewer such as a direction of the regular angle of visibility, which brings about drop in visual quality.

Against such problems, a picture element electrode having reflection characteristics that reduce reflection of incident lights to a regular reflection region is disclosed in, for example, Japanese Patent Laid-open No. 6-27481. According to this publication, as shown in FIG. 42, a reflector has a configuration in which a polymer resin film 2103 is formed on a substrate 2101 where a plurality of convex portions 2112*a* and 2112*b* are formed, and picture element electrodes 2104 are formed on the polymer resin film 2103. In addition, the surface of the picture element electrodes 2104 has a continuous wave shape.

The above-mentioned reflector may be formed by the following method. First, as shown in FIG. 42(*a*), a resist film 2112 made of a photosensitive resin is coated by spin coating on the substrate 2101. Subsequently, it is pre-baked at a predetermined processing temperature. Then, as shown in FIG. 42(*b*), a photomask 2105 is used and is placed above the resist film 2112 for exposure. Subsequently, a developing solution is used to make development. As shown in FIG. 42(*c*), the convex portions 2112*a* and 2112*b* which are different in height are formed on the substrate 2101. Then, as shown in FIG. 42(*d*), the convex portions 2112*a* and 2112*b* are heated for 1 hour at a predetermined temperature for the heat treatment. The above-mentioned operation produces convex portions 2112*a* and 2112*b* that corresponds to the convex portions 2112*a* and 2112*b* whose corners are chamfered. Next, as shown in FIG. 42(*e*), a polymer resin is spin coated on the substrate 2101 after the heat treatment to form the polymer resin film 2103. Finally, the picture element electrodes 2104 are formed by sputtering on the polymer resin film 2103 (FIG. 42(*f*)).

By the above-mentioned method, the tilt angle (the angle formed between tiny faces on the surface of a picture element electrode having irregularities and the surface of the substrate) of the convex portions 2112*a* and 2112*b* is controlled to improve the reflection characteristics.

However, in the above-mentioned conventional manufacturing method, the control of the tilt angle works in theory but a desired reflector cannot be manufactured due to too small manufacturing process margins. More specifically, in practical manufacturing process, a reflector having a desired tilt angle cannot be manufactured due to, for example, an error of a heating temperature or an error of heating time. Therefore, the reflectors obtained using the conventional manufacturing method are insufficient in brightness in the direction of the angle of visibility. Good PAPER WHITE APPEARANCE is not obtained over a wide range. Thus, the size of the manufacturing process margin is an important issue for the manufacturing process in practice.

In the conventional manufacturing method, reflow caused by heat is used to control the shape and apply a resist of the second layer. This results in increased tact time and increased costs.

SUMMARY OF THE INVENTION

In order to solve the problems associated with the prior art, the present inventors completed from a first group of inventions to a third group of inventions.

An object of the first group of inventions is to provide a reflector having ideal reflection characteristics with less clouring, and a reflective liquid crystal display panel which comprises the reflector and provides good visual quality.

An object of the second group of inventions is to provide a concave/convex shape structure, a reflector and a lens with which concave/convex structures can be manufactured easily, and a method and equipment for manufacturing them.

An object of the third group of inventions is to provide a reflector that exhibits good contrast characteristics and PAPER WHITE APPEARANCE, in which the tilt angle of reflective surfaces having irregularities can be controlled with high accuracy because of a large manufacturing process margin, as well as a reflective liquid crystal display panel using the above-mentioned reflector, and a method for manufacturing the same.

Another object of the third group of inventions is to provide a reflector that can be manufactured at a lower manufacturing cost in reduced tact time, by means of simplifying the manufacturing process, as well as a reflective liquid crystal display panel using the above-mentioned reflector, and a method for manufacturing the same.

In order to achieve the above-mentioned objects, the first group of inventions are characterized by comprising two or more types of regions having different optical characteristics, the regions including a plurality of diffusive or reflective small cells that are arranged thereon. In addition, it may comprise two or more types of regions having different polarization characteristics, the regions including a plurality of diffusive or reflective small cells that are arranged thereon. Further, it may comprise two or more types of regions having different reflection characteristics, the regions including a plurality of diffusive or reflective small cells that are arranged thereon. Here, the term "cell" as used herein refers to a configuration element that is used to provide diffusivity in reflectors having the diffusivity. For example, for the reflector having diffusivity provided by the concave/convex shape, convex portions formed on a surface of the reflector or concave portions formed therein are used as "cells".

With this configuration, larger portions of the diffracted lights can be overlapped with each other, reducing the clouring.

The present invention may be configured so that reflected lights have different diffraction angles in the two or more types of regions. More specifically, it may be configured so that an average pitch between the cells is different or that the minimum and maximum diffraction angles with respect to the two or more types of regions generally overlap with each other.

Furthermore, an arrangement of the cells may have regularity or recurrency.

In addition, the two or more types of regions may have anisotropy in arrangement of the cells or shape of the cells, and, the anisotropy direction may be different from region to region.

Furthermore, the present invention may comprise a color filter having transmission characteristics that control diffracted lights from the two or more types of regions. With this configuration, the diffracted lights from the regions corresponding to R, G, and B of the color filters overlap to make white. This reduces the clouring.

In order to achieve the above-mentioned objects, the second group of inventions are, in a concave/convex shape structure having a concave/convex structure portion on a substrate, characterized in that the concave/convex structure portion comprises a photosensitive polymer that contains a light absorbing substance. Alternatively, the concave/convex structure portion is characterized by comprising a photosensitive polymer that contains a light diffusing substance.

Using the photosensitive polymer that contains a light absorbing substance or a light diffusing substance to make back exposure and development treatments, a concave/convex structure having a predetermined degree of tilt angle can be obtained. The present invention may be applied to a concave/convex shape structure having a concave/convex structure portion, a diffusive reflector and a liquid crystal display panel that uses a diffusive reflector.

In order to achieve the above-mentioned objects, a first invention of the third group of inventions is a reflector comprising a substrate having a plurality of convex portions provided thereon, the convex portions being obtained by means of melt deformation of column-shaped bodys formed of a photosensitive resin material, and a thin light reflecting film that covers the convex portions, in which the photosensitive resin material has aspect ratio-average tilt angle characteristics in which an average tilt angle reaches a maximum value through an incremental change process and then converges to a certain value through a decremental process when an aspect ratio is gradually increased from a value close to zero, the aspect ratio being represented as a ratio of two representative dimensions that define the shape of the column-shaped body, provided that the average tilt angle of the convex portion is an angle between a straight line that connects a predetermined point on the outer periphery of the bottom surface of the convex portion and an apex of the convex portion, and the bottom surface of the convex portion, the average tilt angle of the a plurality of convex portions being the converged value in the aspect ratio vs. average tilt angle characteristics.

The above-mentioned configuration provides a reflector having good reflection characteristics. In this event, the cross section of the column-shaped body may be circular, elliptical, polygonal, or have any other irregular shape. In addition, the term "representative dimension" as used in the present invention includes an area of a cross section of the column-shaped body in addition to the height and width thereof. Therefore, the "aspect ratio" is used as a concept that includes, for example, height/cross section perpendicular to the axis of the column-shaped body in addition to the height/width of the column-shaped body.

A second invention is characterized in that, in the reflector according to the first invention, aspect ratio is a ratio of the height of the column-shaped body with respect to the width thereof.

The term "width of the column-shaped body" as used herein means, for example, a diameter or a radius of the cross section when the column-shaped body is a circular column-shaped body, while it means a minor axis or a major axis of a cross section when the column-shaped body is an elliptic column-shaped body.

A third invention is a method for manufacturing a reflector, characterized by comprising: the step of forming a concave/convex thermoplastic resin layer on a substrate, the concave/convex thermoplastic resin layer being made up of a thin film portion and a plurality of column-shaped body portions; the heat treatment step of melt deforming the column-shaped body portions by means of a heat treatment of the substrate having the plurality of column-shaped body portions formed thereon to form a plurality of convex portions having a predetermined average tilt angle; and the step of forming a thin light reflecting film on the convex portions; the resin material has aspect ratio vs. average tilt angle characteristics in which an average tilt angle reaches a maximum value through an incremental change process and then converges to a certain value through a decremental process when an aspect ratio is gradually increased from a value close to zero, the aspect ratio being represented as a ratio of two representative dimensions that define the shape of the column-shaped body, provided that the average tilt angle of the convex portion is an angle between a straight line that connects a predetermined point on the outer periphery of the bottom surface of the convex portion and an apex of the convex portion, and the bottom surface of the convex portion, a set value for the aspect ratio of the column-shaped body that is obtained in the resin layer build-up step is determined to be a larger aspect ratio than a starting point from which convergence to the certain value begins.

In the aspect ratio vs. average tilt angle characteristics as described above, the set value for the aspect ratio of the column-shaped body is determined to be a larger aspect ratio than a starting point from which the average tilt angle begins to converge. This allows a significantly larger manufacturing process margin than those obtained conventionally. Therefore, it is possible to form convex portions having a highly accurate average tilt angle without being affected by, for example, processing errors. Consequently, a reflector having good reflection characteristics can be obtained. As to the formation of the column-shaped body, it should be noted that the photolithographic procedure is not the only option.

For example, other methods such as a mold may be used. In addition, the term "thin film portion" corresponds to a "residual film" in the invention as claimed in claim 4 that uses the photolithographic procedure.

A fourth invention is a method for manufacturing a reflector having a plurality of convex portions that are obtained by means of melt deformation of column-shaped bodys formed of a photosensitive resin material, characterized by comprising: the coating step of coating the photosensitive resin material on a substrate; the exposure step of irradiating light through a photomask to the film of the photosensitive resin material that is formed in the coating step, the photomask having a light-shielding element that is patterned to be a predetermined shape; the development step of developing the photosensitive resin film after being exposed to light to form a residual film and a plurality of column-shaped bodys; the heat treatment step of melt deforming the column-shaped bodys by means of a heat treatment of the substrate having the plurality of column-shaped bodys formed thereon to form a plurality of curved convex portions having a predetermined average tilt angle; and the step of forming a thin light reflecting film on the convex portions; the photosensitive resin material has aspect ratio vs. average tilt angle characteristics in which an average tilt angle reaches a maximum value through an incremental change process and then converges to a certain value through a decremental process when an aspect ratio is gradually increased from a value close to zero, the aspect ratio being represented as a ratio of two representative dimensions that define the shape of the column-shaped body, provided that the average tilt angle of the convex portion is an angle between a straight line that connects a predetermined point on the outer periphery of the bottom surface of the convex portion and an apex of the convex portion, and the bottom surface of the convex portion, a set value for the aspect ratio of the column-shaped body that is obtained in the development step is determined to be a larger aspect ratio than a starting point from which convergence to the certain value begins.

With the above-mentioned configuration, as in the third invention, a significantly larger manufacturing process margin can be achieved than those obtained conventionally. Therefore, it is possible to form convex portions having a highly accurate average tilt angle without being affected by, for example, processing errors. Consequently, a reflector having good reflection characteristics can be obtained.

In the conventional manufacturing method using the photolithographic procedure, a resin layer that covers the convex portions should be built up before the formation of the thin light reflecting film. On the contrary, the manufacturing method of the present invention eliminates the resin layer build-up step. Consequently, the manufacturing process is simplified and the tact can be improved, as compared with the prior art.

A fifth invention is, in the method for manufacturing a reflector according to the fourth invention, characterized in that the photosensitive resin material is a low γ resist material.

Using the low γ resist material as the photosensitive resin material as described above, a region having no residual film can be formed. In addition, the thickness of the residual film can be controlled in other regions.

A sixth invention is, in the method for manufacturing a reflector according to the fourth invention, characterized in that the aspect ratio vs. average tilt angle characteristics have the nature in which a convergence value of the average tilt angle changes to be a smaller value when a heating temperature to heat column-shaped body is increased and, on the other hand, the convergence value of the average tilt angle changes to be a larger value when the heating temperature is decreased, the heating temperature being a heating temperature that corresponds to the predetermined average tilt angle of the convex portion in the heat treatment step.

By controlling the heating temperature as described above, convex portions having a desired average tilt angle can be formed.

A seventh invention is, in the method for manufacturing a reflector according to the fourth invention, characterized in that the aspect ratio vs. average tilt angle characteristics have the nature in which a convergence value of the average tilt angle changes to be a smaller value when a thickness of the residual film is increased and, on the other hand, the convergence value of the average tilt angle changes to be a larger value when the thickness of the residual film is decreased, an exposure amount to the photosensitive resin in the exposure step is adjusted so that a thickness of the residual film obtained after the development step is a thickness of the residual film that corresponds to the predetermined average tilt angle of the convex portion.

By controlling the thickness of the residual film as described above, convex portions having a desired average tilt angle can be formed.

A eighth invention is, in the method for manufacturing a reflector according to the third invention, characterized in that the aspect ratio is within the range of at least 0.05 and not higher than 0.7.

A ninth invention is, in the method for manufacturing a reflector according to the fourth invention, characterized in that a film thickness of the photosensitive resin film in the coating step is within the range of at least 1 $\mu$m and not larger than 10 $\mu$m.

The film thickness of the photosensitive resin film is restricted for the following reason. When the photosensitive resin layer has a film thickness of smaller than 1 $\mu$m, differences in irregularities on the surface of the thin light reflecting film become too small. This increases the amount of light to be reflected in the direction of the regular reflection, which is not preferable. On the other hand, when the photosensitive resin layer has a film thickness of larger than 10 $\mu$m, the differences in irregularities become too large. For example, when the reflector is applied to a reflective liquid crystal display panel, nonuniformity of cell gaps becomes too large, deteriorating visual qualities such as uneven displays.

A tenth invention is, in the method for manufacturing a reflector according to the fourth invention, characterized by comprising the step of depositing, on the substrate, a photosensitive resin material formed of the same material as the photosensitive resin material, prior to the coating step of coating the photosensitive resin material on the substrate.

An eleventh invention is, in the method for manufacturing a reflector according to the fourth invention, characterized by comprising the step of depositing, on the substrate, a photosensitive resin material formed of a material that is different from the photosensitive resin material, prior to the coating step of coating the photosensitive resin material on the substrate.

As described above, the photosensitive resin layer formed on the substrate may comprise two or more layers. The photosensitive resin that serves as a lower base layer may be made of the same or different material as or from that of the upper photosensitive resin(s).

A twelfth invention is, in the method for manufacturing a reflector according to the third invention, characterized in that the aspect ratio is a ratio of the height of the column-shaped body with respect to the width thereof.

A thirteenth invention is a reflective liquid crystal display panel characterized by comprising a substrate provided on one side of a liquid crystal display layer and a reflector according to the claim 1 provided on the other side thereof.

The above-mentioned configuration provides a reflective liquid crystal display panel having good contrast characteristics and PAPER WHITE APPEARANCE.

A fourteenth invention is a method for manufacturing a reflective liquid crystal display panel comprising a reflector; a substrate that is provided so that the substrate is opposed to the reflector; and a liquid crystal display layer that is sandwiched between the reflector and the substrate, characterized in that: the reflector is manufactured by using a method according to the third invention.

The above-mentioned configuration makes it possible to manufacture a reflective liquid crystal display panel having good contrast characteristics and PAPER WHITE APPEARANCE.

A fifteenth invention is a diffraction grating type reflector, characterized by comprising: a substrate having a plurality of convex portions that are provided thereon concentrically or in parallel, the convex portions being obtained by means of melt deformation of column-shaped bodys formed of a photosensitive resin material, the column-shaped bodys being arranged concentrically or in parallel; and a thin light reflecting film that covers the convex portions; the diffraction grating type reflector having characteristics of dispersing an incident light by reflective diffraction, the photosensitive resin material has aspect ratio vs. average tilt angle characteristics in which an average tilt angle reaches a maximum value through an incremental change process and then converges to a certain value through a decremental process when an aspect ratio is gradually increased from a value close to zero, the aspect ratio being represented as a ratio of two representative dimensions that define the shape of the column-shaped body, provided that the average tilt angle of the convex portion is an angle between a straight line that connects a predetermined point on the outer periphery of the bottom surface of the convex portion and an apex of the convex portion, and the bottom surface of the convex portion, the average tilt angle of the a plurality of convex portions being the converged value in the aspect ratio vs. average tilt angle characteristics.

The above-mentioned configuration provides a diffraction grating type reflector with a wide color reproduction range.

A sixteenth invention is, in the diffraction grating type reflector according to the fifteenth invention, characterized in that the aspect ratio is a ratio of the height of the column-shaped body with respect to the width thereof.

A seventeenth invention is a reflective liquid crystal display panel comprising a substrate provided on one side of a liquid crystal display layer and a diffraction grating type reflector according to the fifteenth invention provided on the other side thereof.

The above-mentioned configuration provides a reflective liquid crystal display panel that comprises a diffraction grating type reflector with a wide color reproduction range.

An eighteenth invention is a method for manufacturing a diffraction grating type reflector having a plurality of convex portions that are obtained by means of melt deformation of column-shaped bodys formed of a photosensitive resin material, the diffraction grating type reflector having characteristics of dispersing an incident light by reflective diffraction, characterized by comprising: the coating step of coating the photosensitive resin material on a substrate; the exposure step of irradiating light through a photomask to the film of the photosensitive resin material that is formed by the coating step, the photomask having a light-shielding element that is patterned to be a predetermined shape; the development step of developing the photosensitive resin film after being exposed to light to form a residual film and a plurality of column-shaped bodys that are arranged concentrically or in parallel; the heat treatment step of melt deforming the column-shaped bodys by means of a heat treatment of the substrate having the plurality of column-shaped bodys formed thereon to form a plurality of convex portions that are arranged concentrically or in parallel, the convex portions having a predetermined average tilt angle; and the step of forming a thin light reflecting film on the convex portions; the photosensitive resin material has aspect ratio vs. average tilt angle characteristics in which an average tilt angle reaches a maximum value through an incremental change process and then converges to a certain value through a decremental process when an aspect ratio is gradually increased from a value close to zero, the aspect ratio being represented as a ratio of two representative dimensions that define the shape of the column-shaped body, provided that the average tilt angle of the convex portion is an angle between a straight line that connects a predetermined point on the outer periphery of the bottom surface of the convex portion and an apex of the convex portion, and the bottom surface of the convex portion, a set value for the aspect ratio of the column-shaped body that is obtained in the development step is determined to be a larger aspect ratio than a starting point from which convergence to the certain value begins.

The above-mentioned configuration makes it possible to manufacture a diffraction grating type reflector with a wide color reproduction range.

A nineteenth invention is, in the method for manufacturing a diffraction grating type reflector according to the eighteenth invention, characterized in that the aspect ratio is a ratio of the height of the column-shaped body with respect to the width thereof.

A twentieth invention is a method for manufacturing a reflective liquid crystal display panel comprising a reflector; a substrate that is provided so that the substrate is opposed to the reflector; and a liquid crystal display layer that is sandwiched between the reflector and the substrate, characterized in that: the reflector is manufactured by using a method according to the eighteenth invention.

The above-mentioned configuration makes it possible to manufacture a reflective liquid crystal display panel that comprises a diffraction grating type reflector with a wide color reproduction range.

BEST MODES FOR CARRYING OUT THE INVENTION

Figure 1:
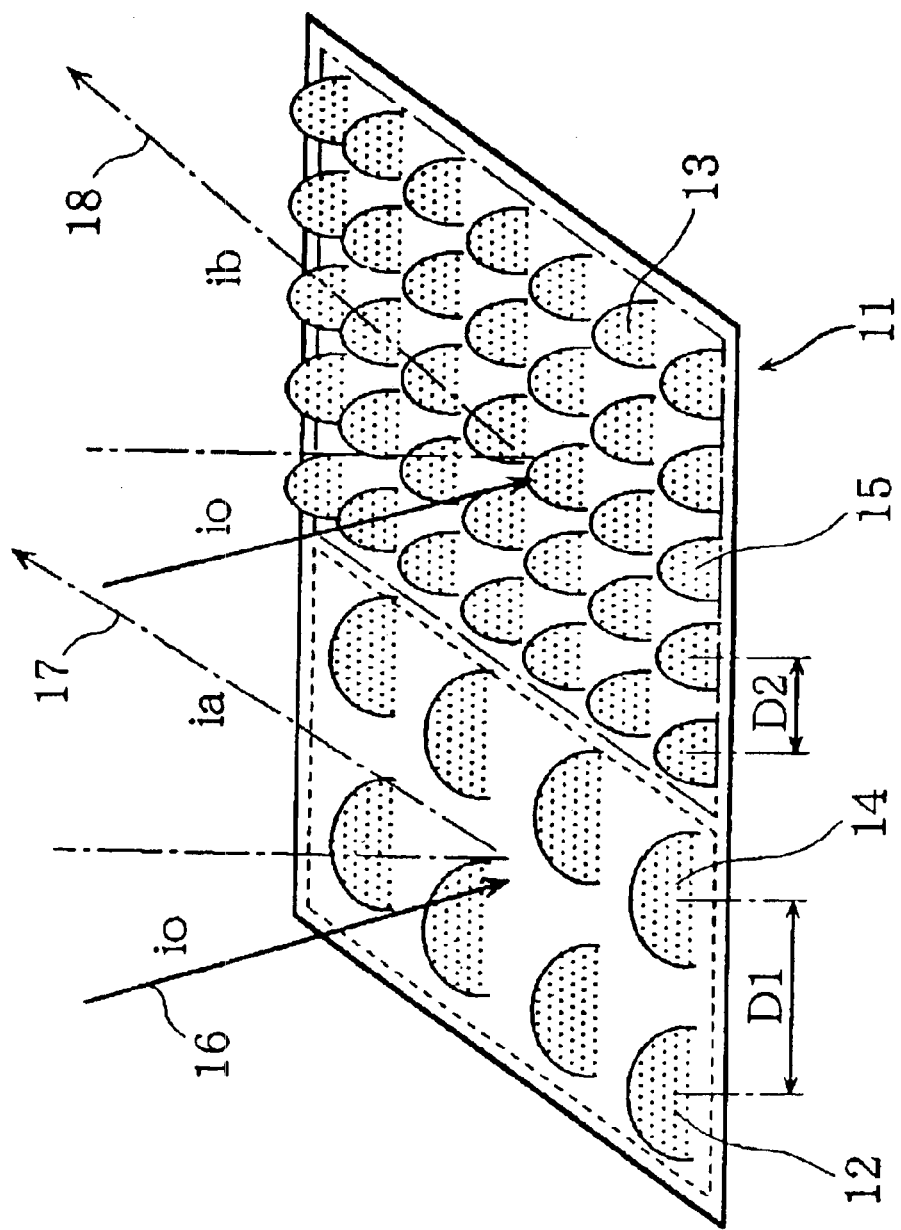
FIG. 1 is a perspective view of a reflector according to the embodiment 1-1.

Embodiments of the present invention are described below with reference to the drawings. The present invention is not limited to those embodiments.

First Group of Inventions

A first group of inventions are reflectors characterized by comprising two or more types of regions having different optical characteristics (for example, polarization characteristics and reflection characteristics), the regions including a plurality of diffusive or reflective small cells that are arranged thereon. The term "cell" as used herein refers to a means or a structure that produces diffusion or reflection. For example, it covers a convex portion and a concave portion, as well as means and structures that can change the direction of reflection of light, other than a concave/convex structure.

As specific examples of the first group of inventions, the embodiments 1-1 to 1-7 are illustrated below to describe the present invention more specifically.

(Embodiment 1-1)

The embodiment 1-1 is characterized in that a reflector has at least two or more regions formed thereon in which convex portions are arranged regularly or recurrently. This configuration provides an effect of making clouring be more invisible.

For the purpose of facilitating the understanding of the embodiment 1-1, a principle of the embodiment 1-1 is described prior to making description of a specific configuration of the embodiment 1-1.

[Description of Principle]

Adjacent convex portions or concave portions are formed so that they have recurrency, i.e., at a constant pitch, when concave/convex shapes are formed on a reflector. The pitch at this time is defined as d1 μm. It is assumed that a white beam is directed to such a reflector at an angle of incidence of $-i_0°$, relative to the axis on which the convex portions are formed, so that they have recurrency. It is observed so that a peak appears at a measured angle represented by:

$$i_1 = \sin^{-1}\left(\frac{m\lambda}{nd_1} \times 10^{-3} + \sin i_0\right)$$ Equation 1 wherein the direction of a diffracted light produced there be $i_1°$, the wavelength of the diffracted light be $\lambda$ μm, and the refractive index of a liquid crystal material layer be n, with the proviso that m represents an integer. Therefore, in the liquid crystal display panel using this reflector, clouring is observed when white display is produced. Likewise, when concave/convex shapes are formed, a white beam is directed at an angle of incidence of $-i_0°$ of the reflector on which the adjacent convex portions or concave portions are formed at a pitch d2. It is observed so that a peak appears at a measured angle represented by:

$$i_2 = \sin^{-1}\left(\frac{m\lambda}{nd_2} \times 10^{-3} + \sin i_0\right)$$ Equation 2 wherein the direction of a diffracted light produced there be $i_2°$, the wavelength of the diffracted light be $\lambda$ μm, and the refractive index of a liquid crystal material layer be n, with the proviso that m represents an integer. Therefore, in the liquid crystal display panel using this reflector, clouring is observed when white display is produced.

The equations 1 and 2 are a function of the wavelength $\lambda$ and the pitch which is a distance between adjacent convex portions or concave portions. Therefore, different pitches result in different positions where a peak of the diffracted light is observed.

Taken the above into consideration, both regions of the concave/convex shapes having the pitches d1 and d2 are formed on the reflector. Consequently, peaks are observed at the angles of $i_1°$ and $i_2°$. When the wavelength of the diffracted light at that time is, for example, the green wavelength, the green-colored angle is enlarged. On the other hand, the amount of the incident lights is constant. Eyes of a viewer are only sensitive to a more pale green.

Considering the white light, the white light is basically a combination of the three primary colors, R, G, and B, i.e., the R light (red light), the G light (green light), and the B light (blue light). It is necessary to divide the components of R, G, and B. When there is a place where the diffracted lights from the regions having the pitches d1 and d2 on the above-mentioned reflector are overlapped with each other, the overlapped portion is enlarged for all of R, G, and B. The intensity of each color is reduced. This in turn reduces the clouring. The resulting clouring is hardly visible by the viewer.

[Specific Configuration of Embodiment 1-1]

Based on the above-mentioned principle, the reflector according to the embodiment 1-1 was prepared. Now, the reflector according to the embodiment 1-1 is described. It should be noted that convex portions are used as the "cells" in the reflector according to the embodiment 1-1.

FIG. 1 is a perspective view of the reflector according to the embodiment 1-1. A reflector 11 in this embodiment has two different regions, an A region 12 and a B region 13 that are formed thereon with different pitches of the adjacent convex portions. Convex portions 14 are formed on the surface of the reflector in the A region 12 at a pitch D1=9 μm. Likewise, convex portions 15 are formed on the surface of the reflector in the B region 13 at a pitch D2=7 μm.

Figure 2:
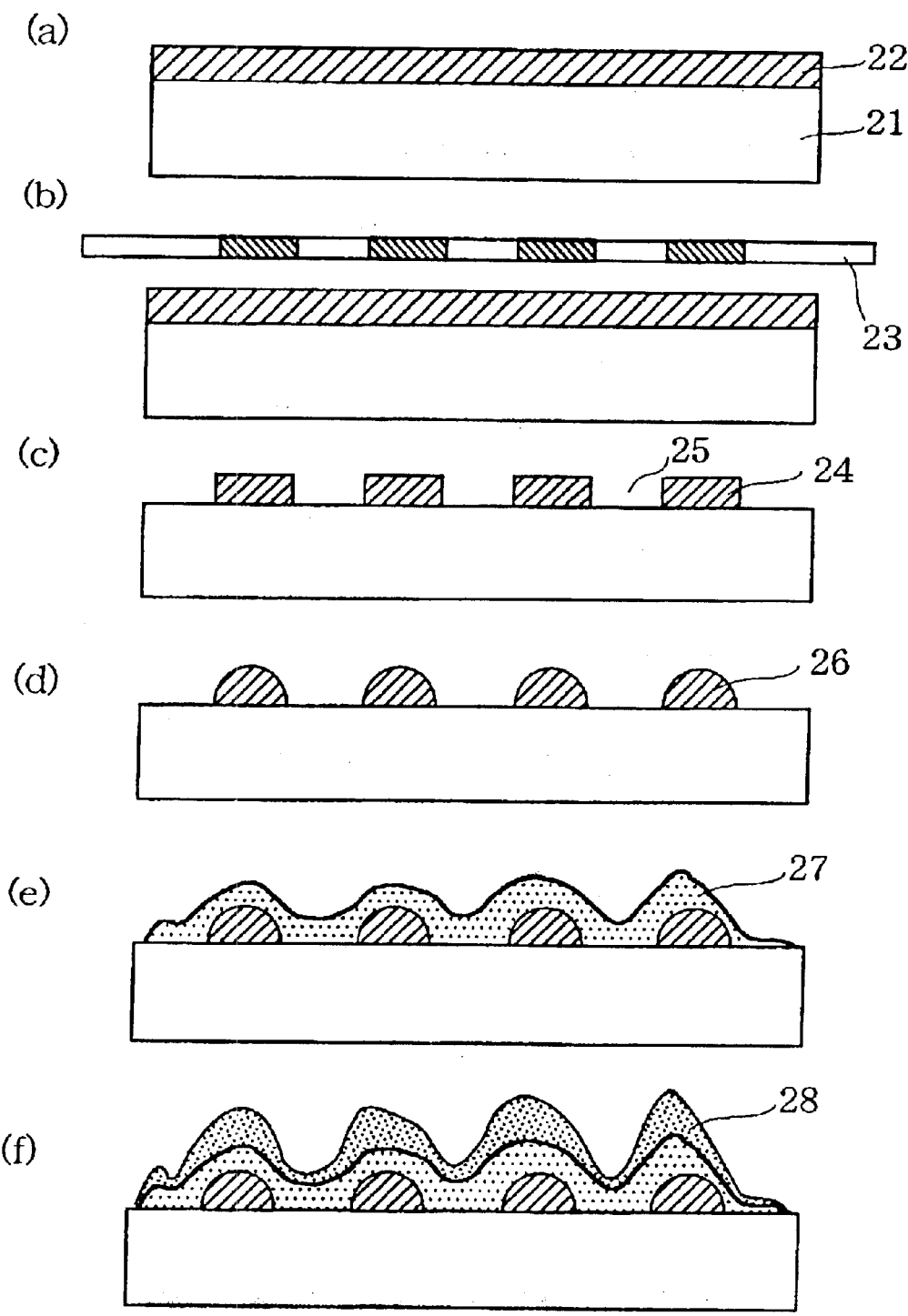
FIG. 2 is a view that is used to describe steps of manufacturing the reflector shown in FIG. 1.

A method for manufacturing this reflector is described with reference to FIG. 2. First, as shown in FIG. 2(a), a positive resist PC403 available from JSR is deposited by spin coating as a resist 22 on one surface of a glass substrate 21 (trade name: Corning 1737) having a thickness of 0.7 mm, to form a film of 1.5 μm thick. Next, it was pre-baked for about 120 seconds at 90° C. on, for example, a hot plate. After the pre-baking, as shown in FIG. 2(b), a photomask 23 on which a predetermined pattern is formed is placed to make exposure. The shape of the irregularities on the surface of the reflector can be controlled depending on the thickness of the resist, the shape of a transmitting or light-shielding elements of the photomask 23, or the density. In this embodiment, the photomask 23 used has a pattern of circular light-shielding elements each having a diameter of 7 μm and a pitch of 9 μm for the portion corresponding to the A region, and circular light-shielding elements each having a diameter of 5 μm and a pitch of 7 μm for the portion corresponding to the B region. It is preferable that the circle has a diameter of from 2 μm to 15 μm, more preferably, from 3 μm to 10 μm. The pitch is preferably from 3 μm to 20 μm, and more preferably from 5 μm to 12 μm. The exposure amount was 60 mJ/cm².

After the exposure, as a developing solution, NMD-3 available from Tokyo Ohka Kogyo Co., Ltd. was diluted for use to contain 0.4% of TMAH (trimethyl ammonium hydroxide). Consequently, convex portions 24 and concave portions 25 as shown in FIG. 2(c) are formed.

Thereafter, the substrate is heated preferably at 80° C. to 220° C. for 3 to 120 minutes. In this embodiment, it was heated at 150° C. for 5 minutes. As a result, convex portions 26 as shown in FIG. 2(d) are formed each of which has a smooth convex shape obtained by chamfering the corners of the convex portions 24.

Next, as shown in FIG. 2(e), a resist 27 was coated over the convex portion 26. The resist 27 is made of the same material as that of the convex portion 26 (24). The resist 27 was coated by spin coating to have a thickness of 0.3 μm. Furthermore, heating of this at 220° C. for 60 minutes results in thermal deformation of the resist 27, producing smooth irregularities.

Then, as shown in FIG. 2(f), a metal film 28 is deposited that serves as a light reflective layer. As a material for the metal film 28, Al, AlTa, Ag, and AgPdCu are suitable. In this embodiment, Al was deposited into 2000.

Figure 3:
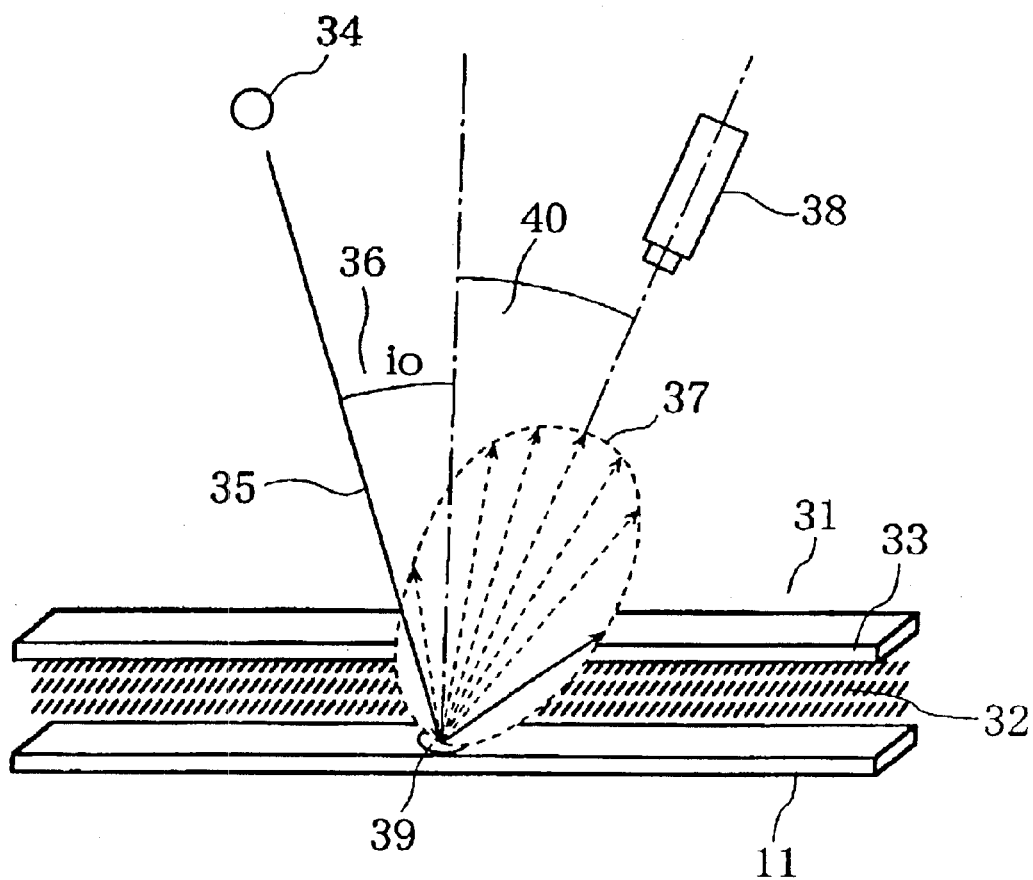
FIG. 3 is a view that is used to describe measurement of diffusion characteristics.
Figure 4:
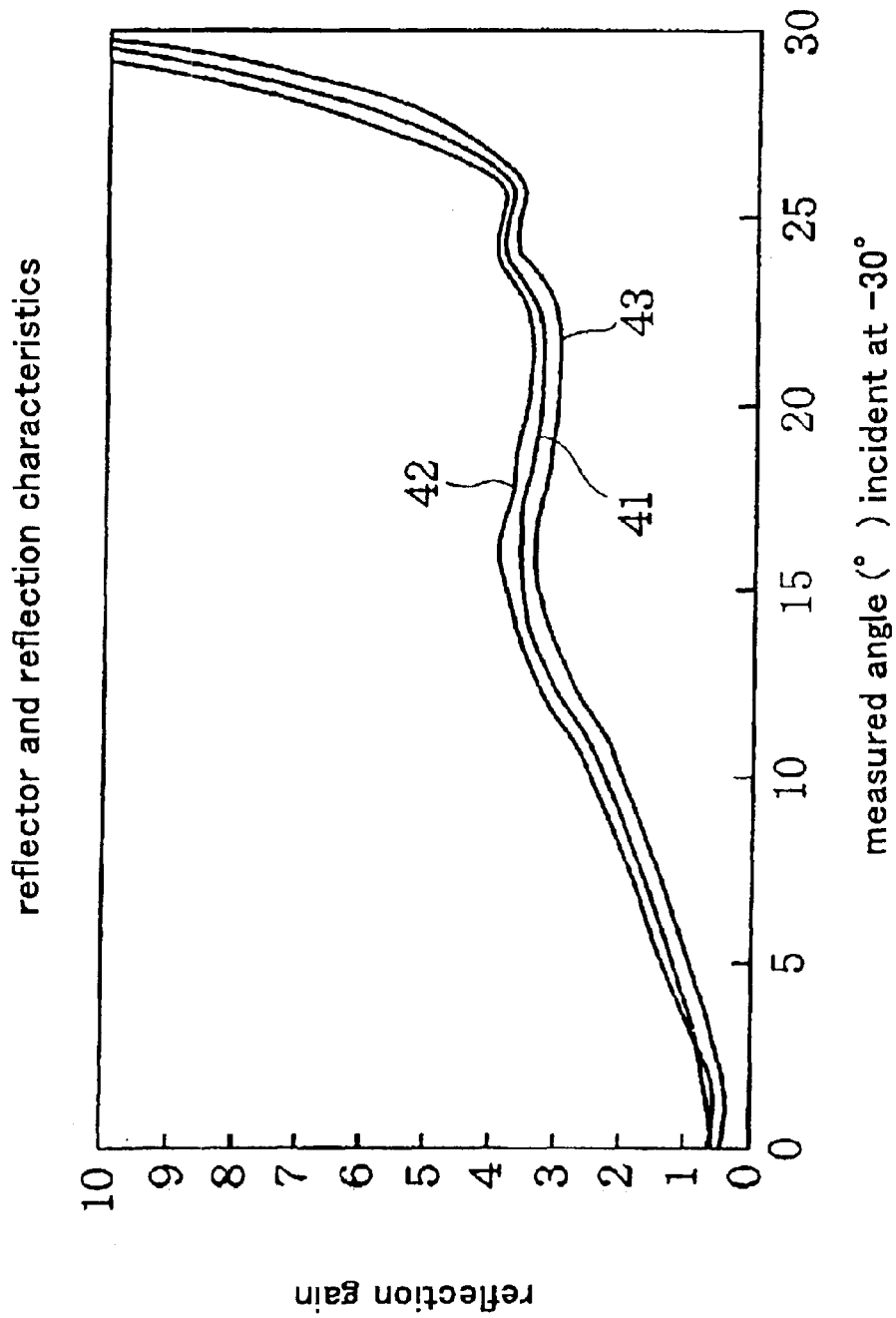
FIG. 4 is a view illustrating diffusion characteristics of the reflector shown in FIG. 1.

The following experiments were made on the reflector 11 obtained through the above-mentioned steps. It is assumed that white incident lights are directed to the reflector 11 at $i_0°$ in the direction of the polar angle with respect to the horizontal surface of the reflector. Diffusion characteristics thereof were measured using a device as shown in FIG. 3. In FIG. 3, the reflector 11 is placed with respect to a pseudo panel 31, which is made of a substance having a generally identical refractive index to that of the liquid crystal material such as ethylene glycol 32 and an opposing substrate 33, so that an incident light 35 from a light source 34 is directed at an angle of incidence 36 of $i_0$. The incident light 35 incident to the pseudo panel 31 is reflected from the reflector 11. The luminance of a reflected light 37 at this time is measured using a luminance meter 38. In this event, the luminance meter 38 measured the luminance while rotating over a range of a measured angle 40 on a measured point 39 of the reflector. As a result, characteristics as shown in FIG. 4 were obtained. FIG. 4 shows diffusion characteristics that were obtained through the measurement using the luminance meter by directing the incident light to the pseudo panel 11 from the direction of 30° and directing a white beam from the light source to the reflector. Furthermore, in a measurement system shown in FIG. 3, green and red filters were inserted in front of the light source 34. The luminance was measured in a similar way with the green or red light. As a result, the diffusion characteristics with white 41, green 42, and red 43 were generally overlapped as apparent from FIG. 4. This indicates that the configuration of the reflector according to this embodiment has almost no clouring. In addition, almost no clouring was observed when a white light was directed to the reflector and a reflected image thereof was extension projected to a screen.

COMPARATIVE EXAMPLE 1

Figure 5:
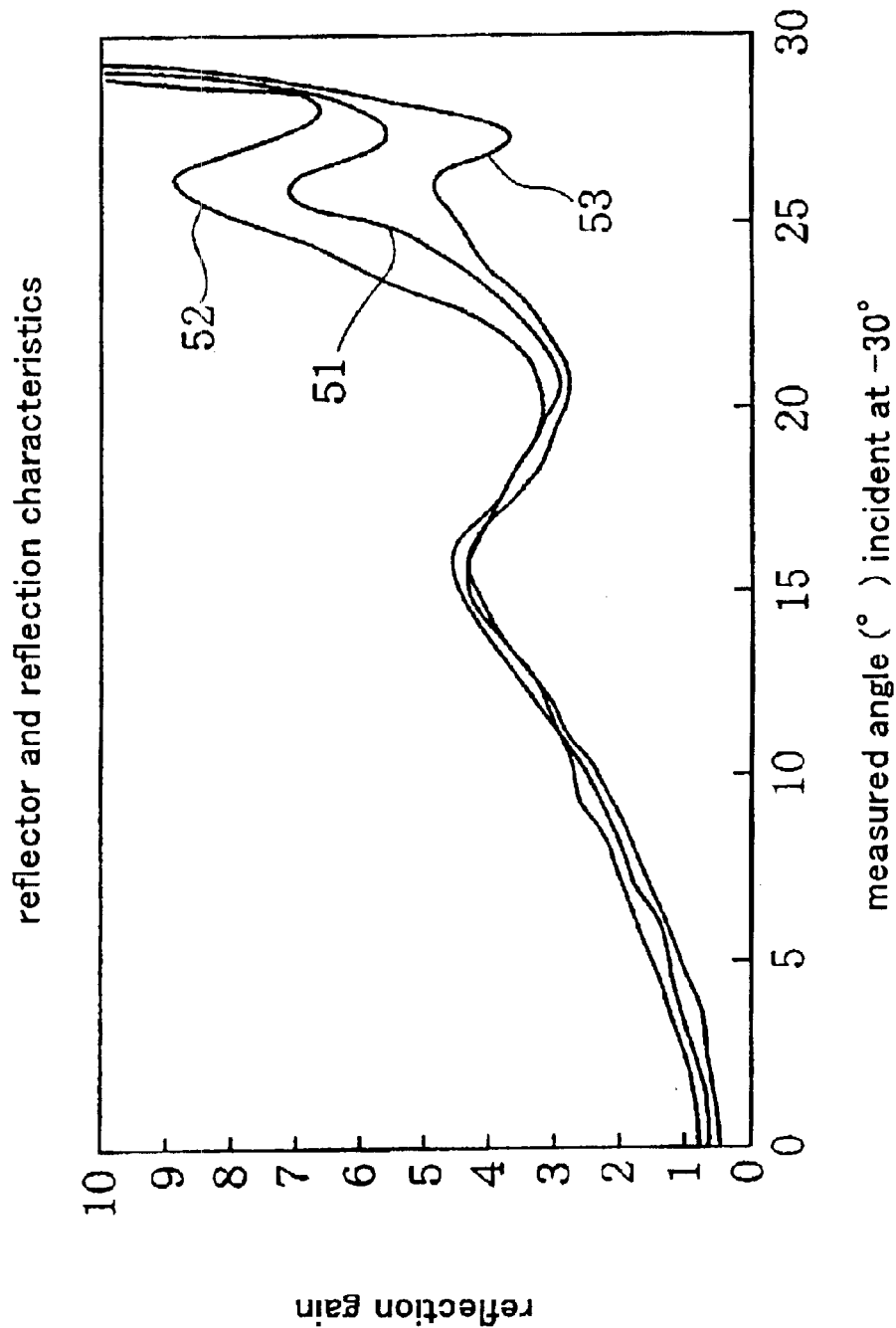
FIG. 5 is a view illustrating diffusion characteristics of a reflector according to the comparative example 1.

For a reflector on which only the A region is formed, diffusion characteristics were measured in a similar manner using the device shown in FIG. 3. As a result, the diffusion characteristics shown in FIG. 5 were obtained. As in the case of FIG. 4, characteristics were measured with white, green, and red lights directed at an incident angle of 30°. Peaks were obtained around the direction of the regular reflection of white 51, green 52, and red 53. Peak angles of them were slightly different from each other. The peak was observed for green at a position shifted by about 2.7° from the direction of the regular reflection, i.e., around 27.8°, while the peak was observed for red at a position shifted by about 3.1°, i.e., around 26.9°. In addition, red, green, and blue rings were observed from the direction of the regular reflection when a white light was directed to the reflector and a reflected image thereof was projected to a screen.

Next, similar measurements were made for a reflector on which only the B region is formed. Peaks were obtained in the diffusion characteristics around the direction of the regular reflection with white, green, and red. Peak angles of them were slightly different from each other. The peak was observed for green at a position shifted by about 3.5° from the direction of the regular reflection, i.e., around 26.5°, while the peak was observed for red at a position shifted by about 4°, i.e., a shifted position around 26°. In addition, red, green, and blue rings were observed from the direction of the regular reflection when a white light was directed to the reflector and a reflected image thereof was projected to a screen.

As apparent from the above, the clouring was observed in the reflectors where either the A region or the B region was formed independently. No clouring was observed in the reflectors where both the A and B regions were formed. Taking a particular note of the green light, the diffraction peaks were observed at measured angles away from the direction of the regular reflection by 2.7° and 3.1°, i.e., around 27.3° and around 26.9°, respectively, in the reflectors having only the A region or only the B region. On the contrary, the peaks were divided into two points of 2.7° and 3.5° when both the A and B regions were formed. The amount of light is distributed according to a ratio of an area where these regions are formed. Consequently, the peaks are enlarged and the luminance is reduced to restrict the clouring. The same applies to the blue and red lights.

(Embodiment 1-2)

Figure 6:
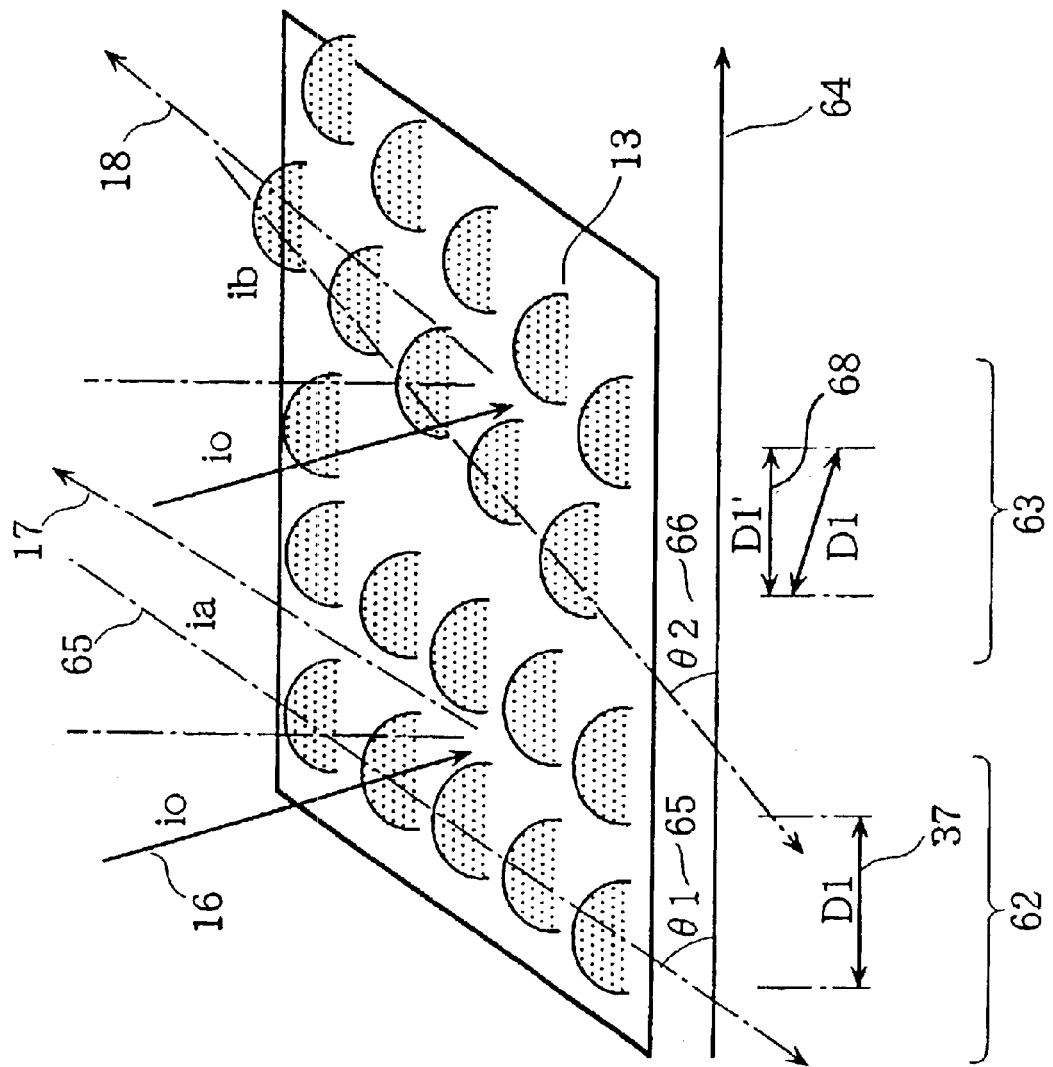
FIG. 6 is a perspective view of a reflector according to the embodiment 1-2.
Figure 7:
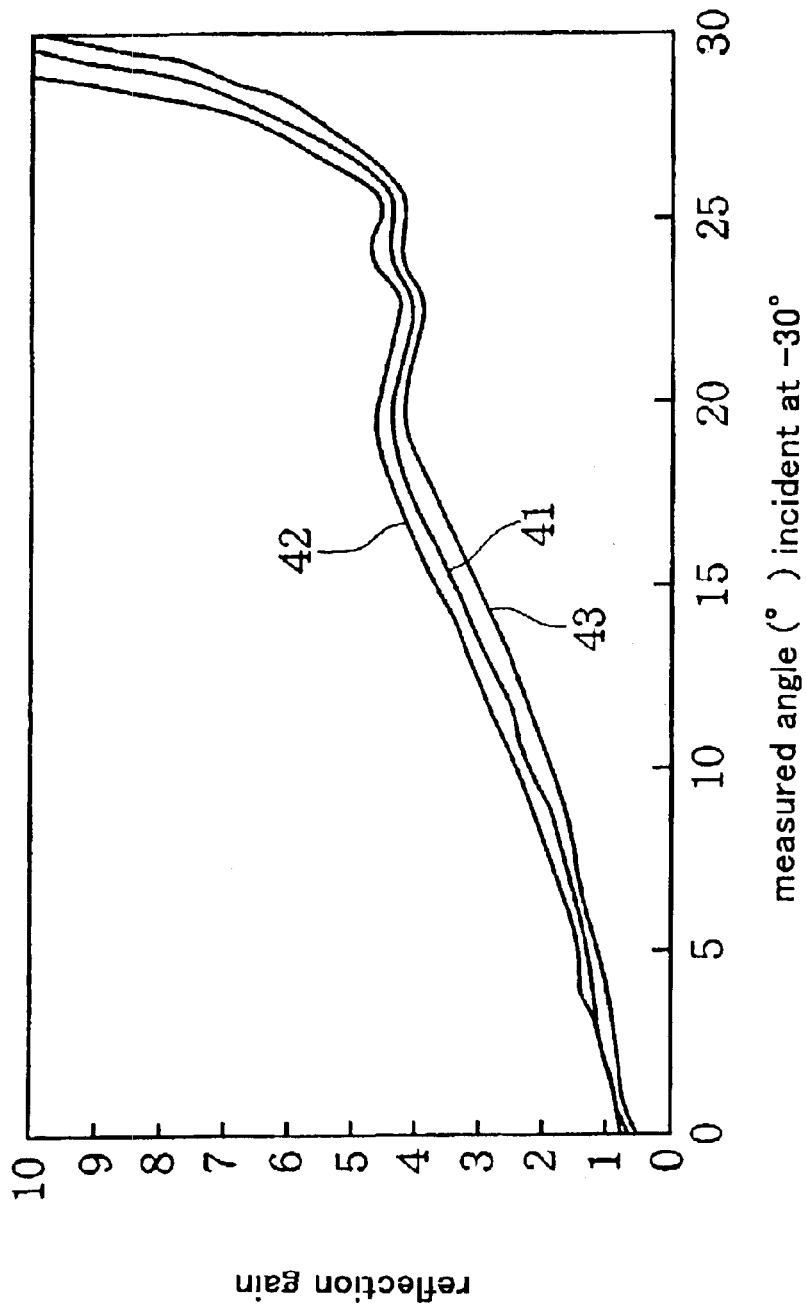
FIG. 7 is a view illustrating diffusion characteristics of the reflector shown in FIG. 6.

FIG. 6 is a perspective view of the reflector according to the embodiment 1-2. A reflector 61 in this embodiment has two different regions, an A region 62 and a B region 63 that are formed thereon with the same pitches of the adjacent convex portions arranged in different directions. The convex portions 14 are formed on the surface of the reflector in the A region 62 at a pitch D1=9 µm. A coordinate axis 64 shown in FIG. 6 is determined so that an angle 66 is 90° between the axis and a straight line 65 corresponding to the direction of arrangement of the convex portions. On the other hand, an azimuth θ2 was 30° in this embodiment. The B region has an arrangement corresponding to the arrangement of the convex portions of the A region rotated. Reflection characteristics of the reflector having the above-mentioned configuration were measured, while rotating the measurement device shown in FIG. 3 at right angles to the straight line 65. As a result, characteristics as shown in FIG. 7 were obtained. FIG. 7 shows diffusion characteristics that were obtained through the measurement using the luminance meter by directing the incident light to the pseudo panel 11 from the direction of 30° and directing a white beam from the light source to the reflector. Furthermore, in a measurement system shown in FIG. 3, green and red filters were inserted in front of the light source 34. The luminance was measured in a similar way with the green or red light. As a result, the diffusion characteristics with white 71, green 72, and red 73 were generally overlapped as apparent from FIG. 7. This indicates that the configuration of the reflector according to this embodiment has almost no clouring. In addition, almost no clouring was observed when a white light was directed to the reflector and a reflected image thereof was extension projected to a screen.

COMPARATIVE EXAMPLE 2

Figure 8:
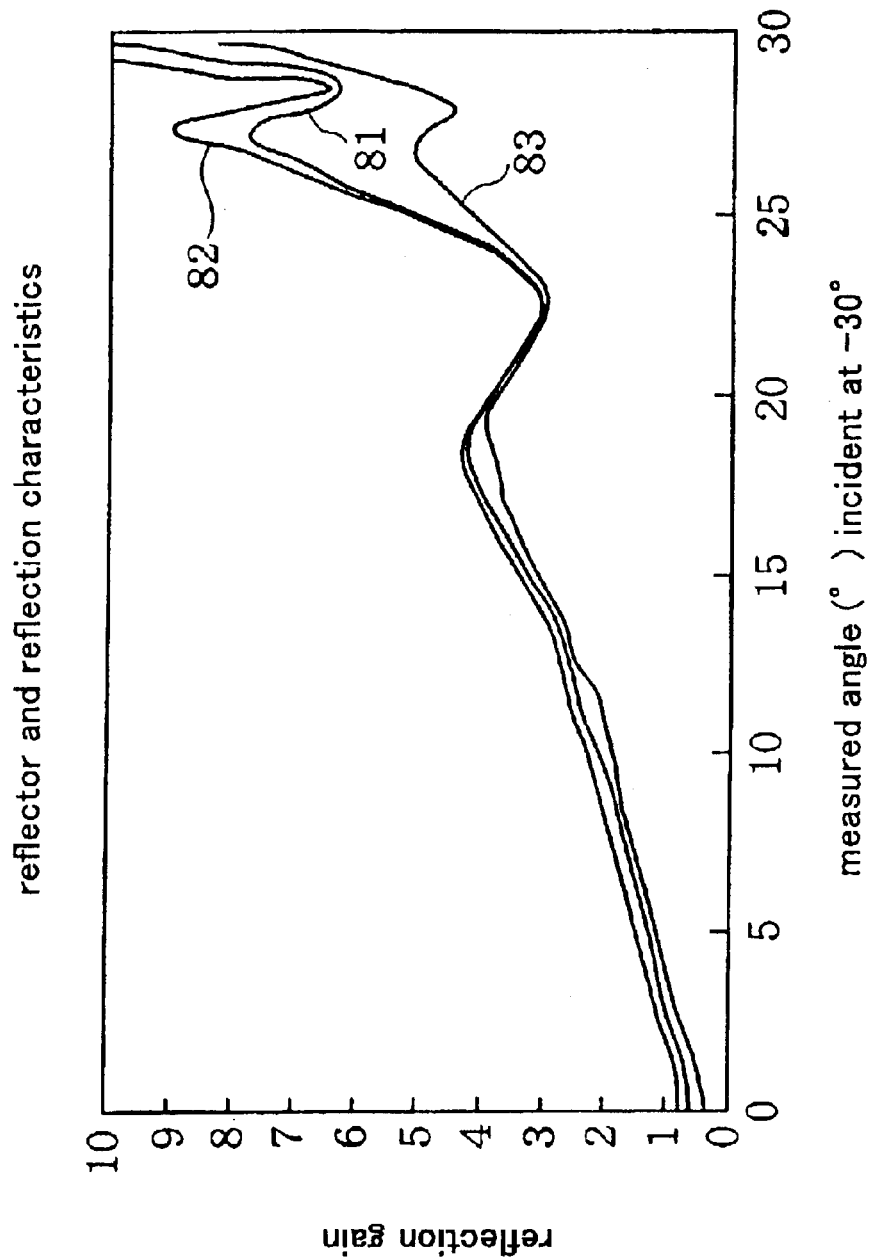
FIG. 8 is a view illustrating diffusion characteristics of a reflector according to the comparative example 2.

For a reflector on which only the A region is formed, diffusion characteristics were measured in a similar manner using the device shown in FIG. 3. As a result, the diffusion characteristics shown in FIG. 8 were obtained. As in the case of FIG. 7, characteristics were measured with white, green, and red lights directed at an incident angle of 30°. Peaks were obtained around the direction of the regular reflection of white 81, green 82, and red 83. Peak angles of them were slightly different from each other. The peak was observed for green at a position shifted by about 2.7° from the direction of the regular reflection while the peak was observed for red at a position shifted by about 3.1° therefrom. In addition, red, green, and blue rings were observed from the direction of the regular reflection when a white light was directed to the reflector and a reflected image thereof was projected to a screen.

For a reflector on which only the B region is formed, peaks were obtained in the diffusion characteristics around the direction of the regular reflection with white, green, and red. Peak angles of them were slightly different from each other. The peak was observed for green at a position shifted by about 3.5° from the direction of the regular reflection while the peak was observed for red at a position shifted by about 4°.

This, in FIG. 6, in a region rotated by 30° with respect to the straight line 65, a product of a cosine of the azimuth, 90°−30°=60°, relative to the coordinate axis 64 multiplied by a pitch of the A, 67D1=9 µm is a pitch of the region B, 68D1'=4.5 µm. A diffracted light based on this pitch is produced as a peak.

In addition, red, green, and blue rings were observed from the direction of the regular reflection when a white light was directed to the reflector and a reflected image thereof was projected to a screen.

As apparent from the above, the clouring was observed in the reflectors where either the A region or the B region was formed independently. No clouring was observed in the reflectors where both the A and B regions were formed. Taking a particular note of the green light, the diffraction peaks were observed at a position shifted by 2.7° from the direction of the regular reflection, i.e., around 27.8° and at a measured angle of about 3.1°, i.e., around 26.9°, in the reflectors having only the A region or only the B region. On the contrary, the peaks were divided into two points of 2.7°, i.e., 27.3° and 3.5°, i.e., 26.5° when both the A and B regions were formed. The amount of light is distributed according to a ratio of an area where these regions are formed. Consequently, the peaks are enlarged and the luminance is reduced to restrict the clouring. The same applies to the blue and red lights.

(Embodiment 1-3)

Figure 9:
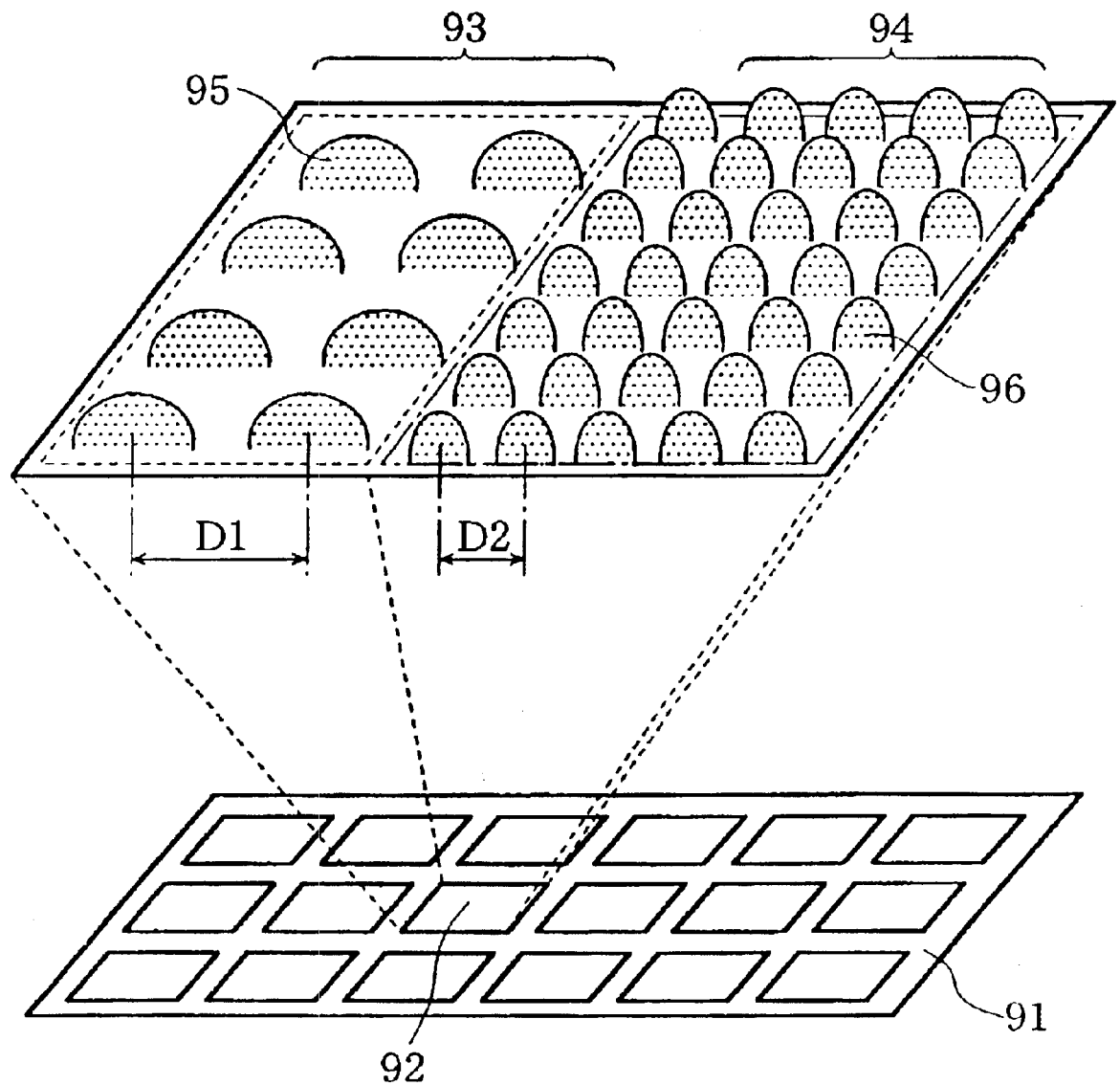
FIG. 9 is a perspective view of a reflector according to the embodiment 1-3.

FIG. 9 is a perspective view of a reflector according to the embodiment 1-3. A reflector 91 that is used in this embodiment comprises convex portions arranged thereon so that recurrency is achieved for each pixel 92. More specifically, the reflector 91 has two different regions, an A region 93 and a B region 94 that are formed thereon with different pitches of the adjacent convex portions. Convex portions 95 formed on the A region 93 are arranged with a pitch D1 of 9 µm between the adjacent convex portions. Convex portions 96 formed on the B region 94 are arranged with a pitch D2 of 7 µm between the adjacent convex portions. The regions A and B are formed for each pixel.

For the reflector having the above-mentioned configurations, reflection characteristics were assessed, according to similar conditions to those used in the above-mentioned embodiment 1-1, on the reflector having such configurations using the measurement device shown in the above-indicated FIG. 3. Reflection characteristics with no clouring, i.e., good characteristics of high uniformity could be obtained for all sites.

(Embodiment 1-4)

The embodiment 1-4 is a reflector having regions on which cells are arranged regularly, the regions being different from each other for the corresponding colors of color filters, characterized in that at least two or more of the regions are formed. This configuration provides an effect of making clouring be more invisible.

For the purpose of facilitating the understanding of the embodiment 1-4, a principle of the embodiment 1-4 is described prior to making description of a specific configuration of the embodiment 1-4.

[Description of Principle]

Adjacent convex portions or concave portions are formed at a constant pitch, when concave/convex shapes are formed on a reflector. The pitch at this time is defined as d1 µm. A white beam is directed to such a reflector at an angle of incidence of $-i_0°$. In this event, the color filters transmit only a certain range of wavelengths. It is assumed that a green section of the color filters transmit only light having a wavelength of $\lambda_G$ nm. Let the pitch between the convex portions or concave portions that are adjacent to this green-corresponding section be $d_G$ µm, then it is observed so that a peak appears at a measured angle represented by:

$$i_3 = \sin^{-1}\left(\frac{m\lambda_G}{nd_G} \times 10^{-3} + \sin i_0\right) \qquad \text{Equation 3}$$

wherein the direction of a diffracted light that exit out of this region be $i_3°$, with the proviso that m represents an integer.

Of the above-mentioned color filters, it is assumed that the section that is adjacent to the green is a red region. It is assumed that only light having a wavelength of $\lambda_R$ nm of the white beam is transmitted. The pitch $d_R$ µm of the adjacent convex portions or concave portions is determined so that the peak appears in this section corresponding to red at the same diffraction angle, $i_3°$, as green. The pitch $d_R$ is determined so that it satisfies:

$$d_R = \frac{\lambda_G}{\lambda_R} d_G \qquad \text{Equation 4}$$

Likewise, when a blue region of the color filters transmits only the white beam through a wavelength of $\lambda_B$, the pitch $d_B$ µm of the adjacent convex portions or concave portions is determined so that the peak appears at the same diffraction angle, $i_3°$, as green. The pitch $d_B$ is determined so that it satisfies:

$$d_B = \frac{\lambda_G}{\lambda_B} d_G \qquad \text{Equation 5}$$

As described above, let the pitch between the concave portions or convex portions adjacent to the regions corresponding to R, G, and B of the color filters be $d_R$, $d_G$, and $d_B$ µm, respectively, the diffracted lights at the respective wavelengths have a peak at the same measured angle. Consequently, the diffracted lights from the respective regions overlap to make white. This reduces the clouring.

When white display is produced in the reflective liquid crystal display panel using the above-mentioned reflector, the clouring is hardly visible.

[Specific Configuration of Embodiment 1-4]

Based on the above-mentioned principle, the reflector according to the embodiment 1-4 was prepared. Now, the reflector according to the embodiment 1-4 is described.

Figure 10:
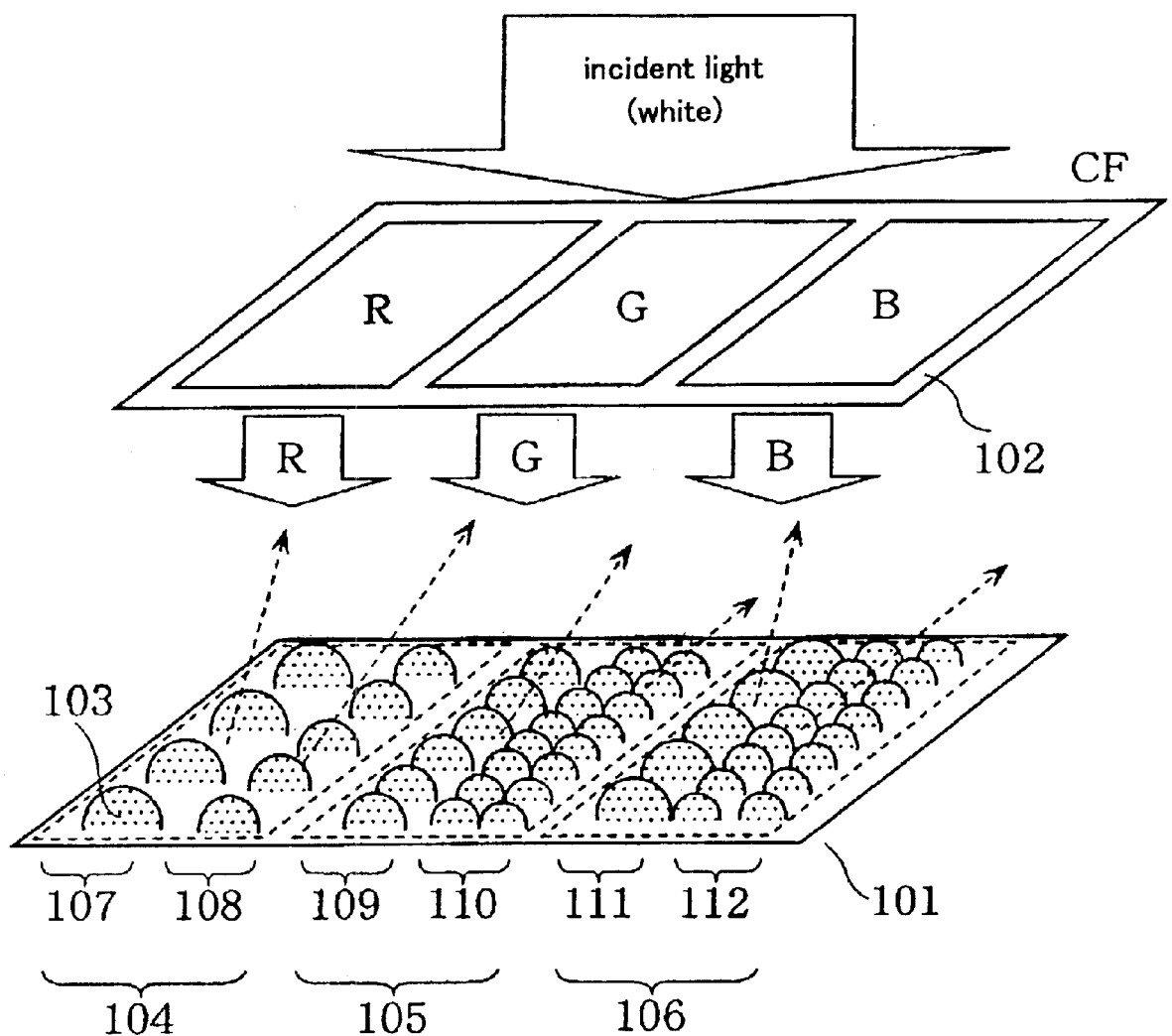
FIG. 10 is a perspective view of a reflector according to the embodiment 1-4.

FIG. 10 is a perspective view of the reflector used in the embodiment 1-4. A reflector 101 in this embodiment has two different regions, A regions and B regions that are formed thereon with different pitches of adjacent convex portions 103 for respective pixels 104, 105, and 106 corresponding to color filters 102 on which R, G, and B are formed, respectively. More specifically, an A region 107 and a B region 108 are formed on the pixel 104. An A region 109 and a B region 110 are formed on the pixel 105. An A region 111 and a B region 112 are formed on the pixel 106.

Next, operations of such configurations are described.

First, taking a particular note of the green light, the peak is observed at a larger angle in the reflector having the adjacent convex portions or concave portions formed thereon at different pitches for each pixel. The clouring with the green light is reduced. The same applies to the blue and red lights. Therefore, for the entire color filters, a particular clouring is hardly produced at a certain fixed angle. An area of white is enlarged.

Next, a relation between the pitch of the convex portions and the control of the clouring is examined. Adjacent convex portions are formed at a constant pitch, when concave/convex shapes are formed on a reflector. The pitch at this time is defined as d1 µm. A white beam is directed to such a reflector at an angle of incidence of −30°. In this event, the color filters transmit only a certain range of wavelengths. It is assumed that a green section of the color filters transmit only light having a wavelength of $\lambda_G$ nm. Let the pitch between the convex portions that are adjacent to this green-corresponding section be $d_G$ µm, then it is observed so that a peak appears at a measured angle represented by the equation 3 wherein the direction of a diffracted light that exit out of this region be $i_3°$, with the proviso that m represents an integer.

Of the above-mentioned color filters, it is assumed that the section that is adjacent to the green is a red region. It is assumed that only light having a wavelength of $\lambda_R$ nm of the white beam is transmitted. The pitch $d_R$ μm of the adjacent convex portions or concave portions is determined so that the peak appears in this section corresponding to red at the same diffraction angle, $i_3°$, as green. The pitch $d_R$ is determined so that it satisfies the equation 4.

Likewise, when a blue region of the color filters transmits only the white beam through a wavelength of $\lambda_B$, the pitch $d_B$ μm of the adjacent convex portions is determined so that the peak appears at the same diffraction angle, $i_3°$, as green. The pitch $d_B$ is determined so that it satisfies the equation 5.

Figure 11:
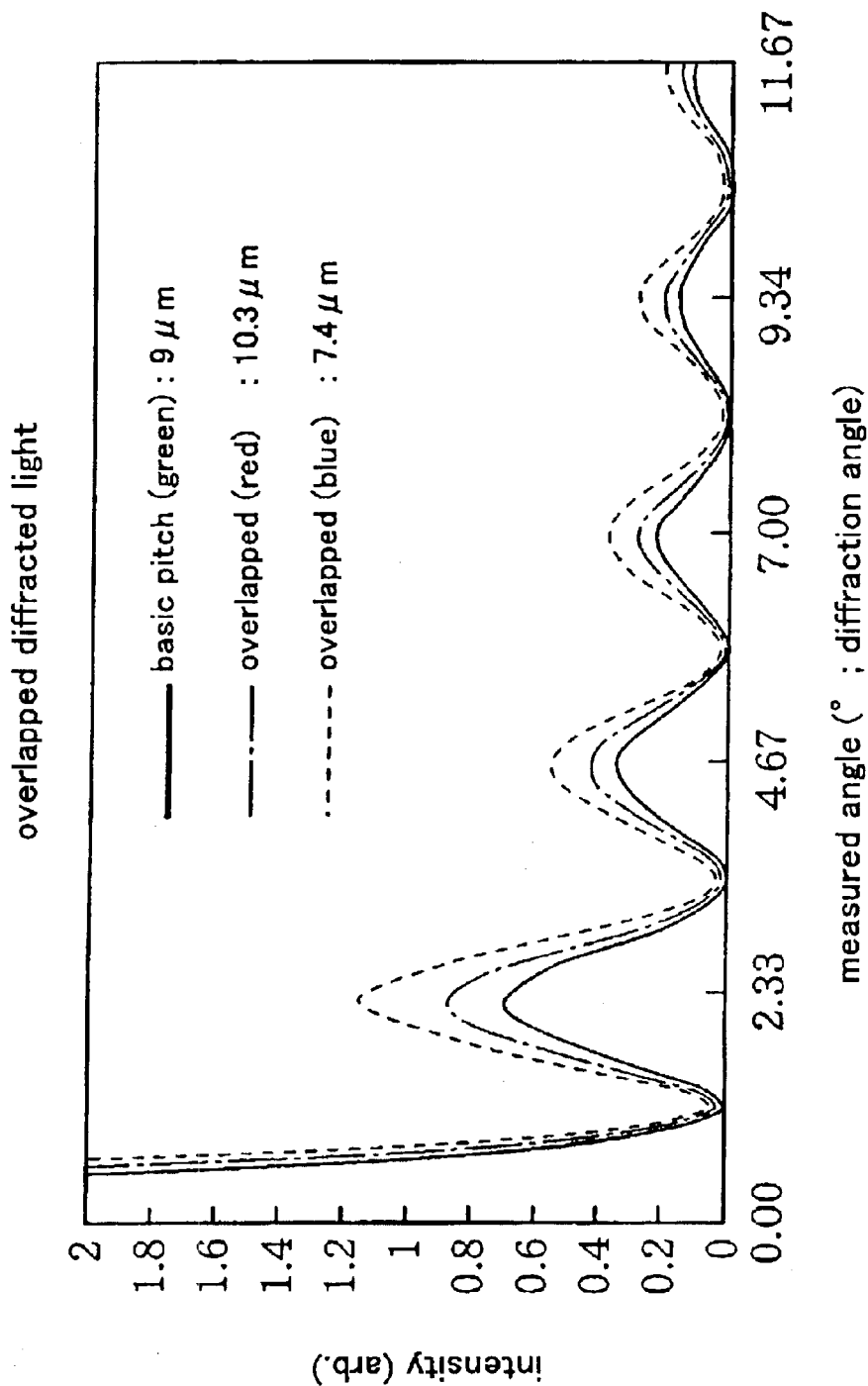
FIG. 11 is a view that is used to describe an example where $d_R$, $d_G$, and $d_B$ are defined in order to satisfy equations 3, 4, and 5.

With this respect, a reflector was prepared with $d_R$, $d_G$, and $d_B$ determined to satisfy the equations 3, 4, and 5. An example of measured characteristics thereof is shown in FIG. 11. FIG. 11 shows characteristics obtained with $d_R$=10.3 μm, $d_G$=9.0 μm, and $d_B$=7.4 μm. As apparent from FIG. 11, it is found that white is produced in a certain direction of each pixel of RGB and clouring in a certain direction is restricted.

As described above, let the pitch between the convex portions adjacent to the regions corresponding to R, G, and B of the color filters be $d_R$, $d_G$, and $d_B$ μm, respectively, the diffracted lights at the respective wavelengths have a peak at the same measured angle. Consequently, the diffracted lights from the respective regions overlap to make white. This reduces the clouring.

(Embodiment 1-5)

Figure 12:
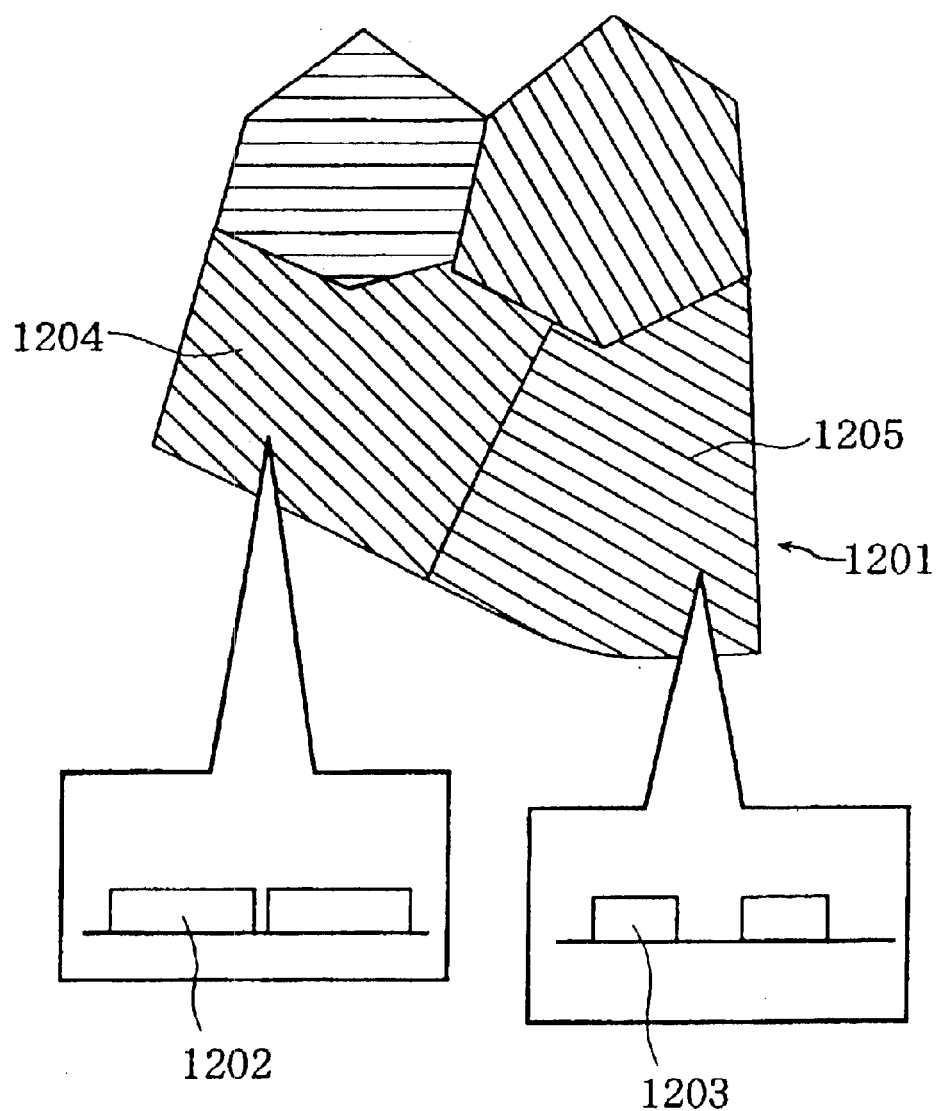
FIG. 12 is a perspective view of a reflector according to the embodiment 1-5.

FIG. 12 is a perspective view of a reflector 1201 according to the embodiment 1-5. The reflector 1201 comprises two regions 1204 and 1205 on which rectangular column members 1202 and 1203 that are different in size are formed. In addition, the rectangular column members 1202 and 1203 are formed in different directions from each other. The height of each of the rectangular column members 1202 and 1203 is 0.3 μm. The width of the rectangular column member 1202 is 7 μm, the width of the rectangular column member 1203 is 9 μm. The pitch for arrangement of the rectangular column members 1202 and 1203 is 2 μm for each.

Reflectors were observed on which only the region 1204 or 1205 was formed. As a result, the clouring was observed. However, little clouring was observed in the reflector 1201.

(Embodiment 1-6)

Figure 13:
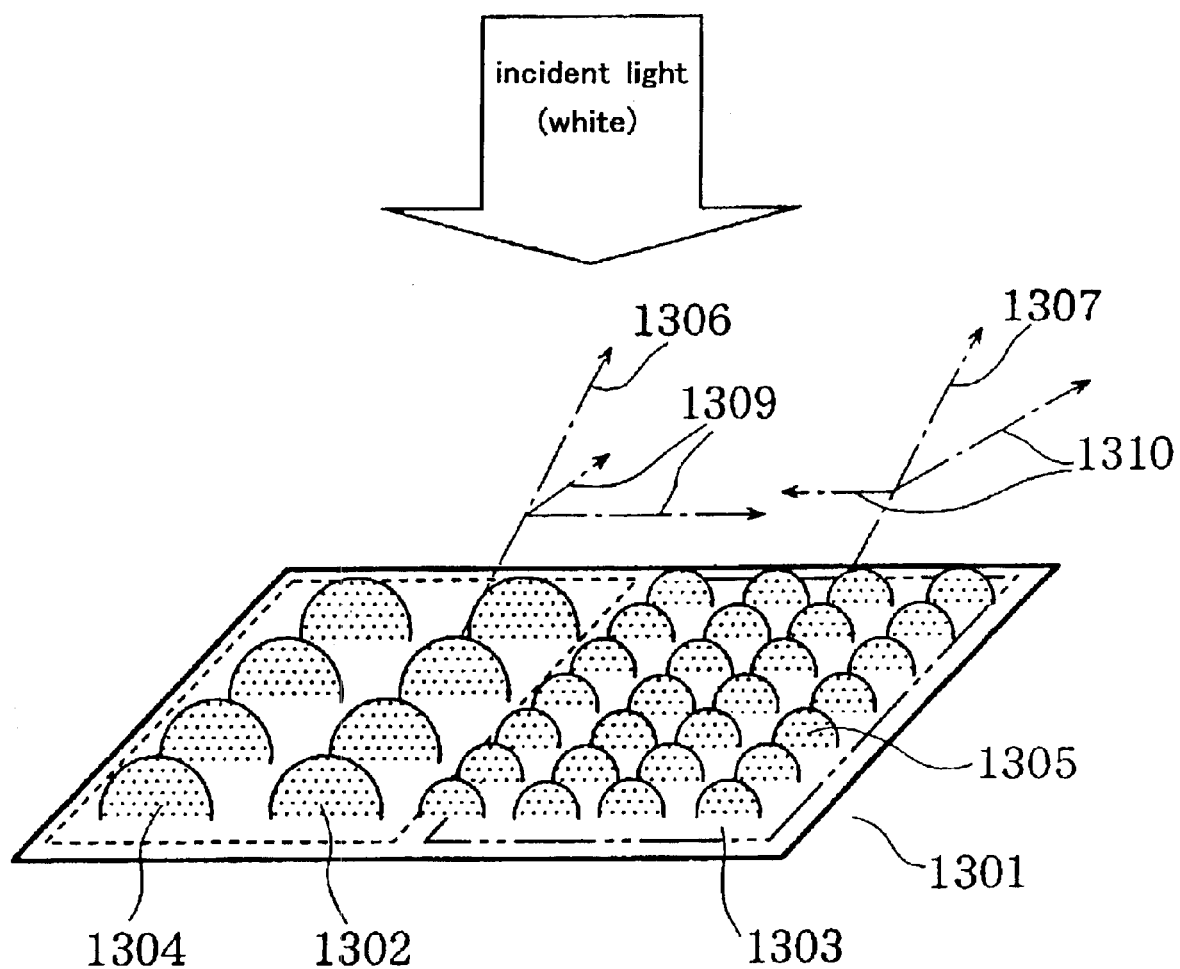
FIG. 13 is a perspective view of a reflector according to the embodiment 1-6.

FIG. 13 is a perspective view of a reflector according to the embodiment 1-6. Two regions 1302 and 1303 are formed on the reflector 1301 that have different polarization properties for reflected lights. The region 1302 has cells 1304 formed thereon and the region 1303 has cells 1305 formed thereon. Based on a difference in arrangement or shape of these cells, a diffracted light 1306 from a reflected light on the region 1302 and a diffracted light 1307 from a reflected light on the region 1303 are different in polarization properties. More specifically, when the diffracted lights 1306 and 1307 are divided into polarization components, these polarization components are different from each other. In FIG. 13, the reference numeral 1309 represents a polarization component of the diffracted light 1306 while the reference numeral 1310 represents a polarization component of the diffracted light 1307.

With the above-mentioned configuration, the clouring is produced in a direction of a certain angle of visibility. The intensity can be restricted in the direction of the angle of visibility in question by making the use of the difference in polarization properties. Consequently, the clouring can be restricted for white display.

(Embodiment 1-7)

When white display was produced in a reflective liquid crystal display panel that uses a reflector according to the present invention, good display was obtained with little clouring.

Furthermore, when white display was produced in a reflective liquid crystal display device that uses a liquid crystal display panel according to the present invention, good display was obtained with little clouring.

When white display was produced in a reflective/transmissive liquid crystal display panel that uses a reflector according to the present invention, good display was obtained with little clouring.

Furthermore, when white display was produced in a reflective/transmissive liquid crystal display device that uses a liquid crystal display panel according to the present invention, good display was obtained with little clouring.

The configuration of the above-mentioned reflective transmissive liquid crystal display device can be achieved in a similar manner through the formation of the reflector cells with 1) a frontlight and a reflective liquid crystal display panel, 2) a reflective liquid crystal display panel in which a reflector has both a reflective region and a transparent region, and a backlight, 3) a reflective liquid crystal display panel having a transflective reflector, and a backlight.

(Other Considerations)

(1) In the above-mentioned embodiments, the reflectors described are all prepared through a photolithography process. However, the present invention is not limited thereto. For example, a reflector according to the present invention may equally be prepared through printing using a print plate as well as inkjet printing.

(2) In the above-mentioned embodiments, the "cells" are formed of the convex portions. However, the concave portions may equally be used. In addition, the "cells" may be something other than the concave/convex structure, as long as they can change the direction of reflecting light.

(3) In the above-mentioned embodiments, the examples illustrated are for the cases where the different regions are formed in the same ratio of area. However, the ratio of area may be determined arbitrarily without any problems in the effects of the present invention. It can equally be achieved.

[Second Group of Inventions]

The second group of inventions are associated with inventions of a concave/convex shape structure having concave/convex structure portions on a substrate. It is mainly characterized by forming a concave/convex shape of the concave/convex structure portion by means of making a back exposure treatment and a development treatment of a photosensitive polymer that contains a light absorbing substance.

As specific examples of the second group of inventions, the embodiments 2-1 to 2-9 are illustrated below to describe the second group of inventions. In the following embodiments, a reflector of a liquid crystal display panel is described as an example of the concave/convex shape structure.

(Embodiment 2-1)

Figure 14:
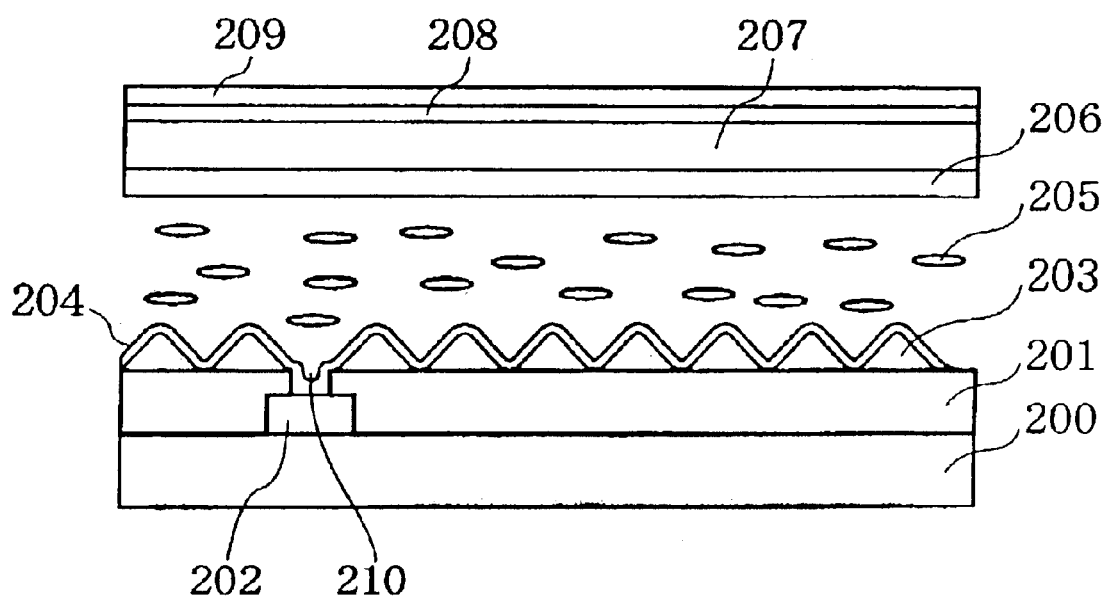
FIG. 14 is a cross-sectional view of a liquid crystal display panel according to the embodiment 2-1.

FIG. 14 is a cross-sectional view of a liquid crystal display panel according to the embodiment 2-1.

Figure 15:
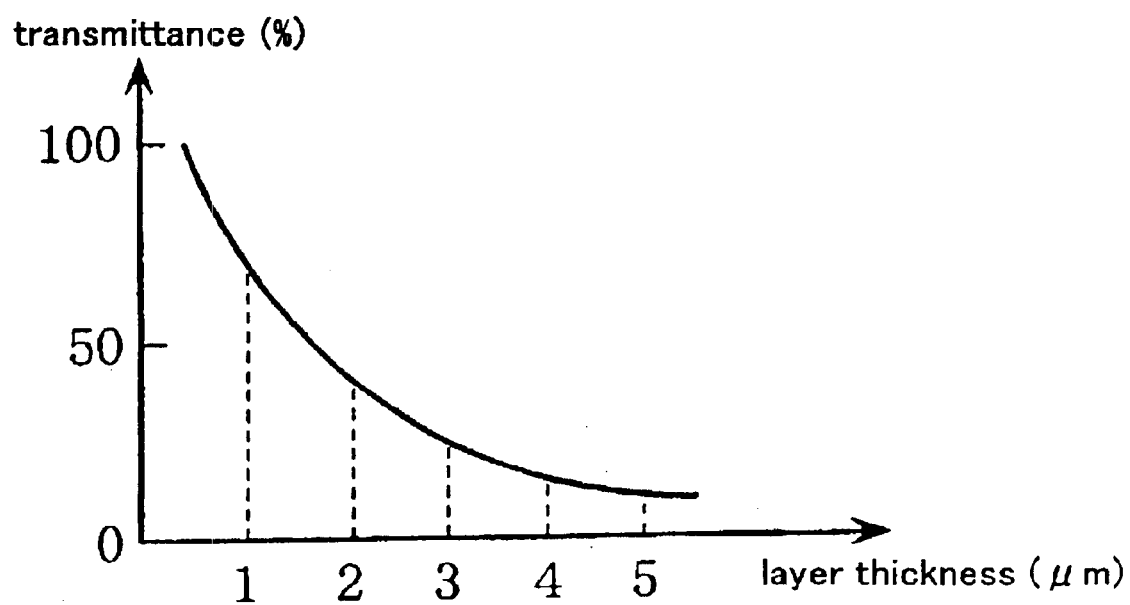
FIG. 15 is a graphical representation of the film thickness of a resist containing a pigment as a function of the transmittance.

In this embodiment, a TFT cell 202 as a pixel switching cell is formed on an array substrate 200, on which a flattening layer 201 is laminated. A feature of this embodiment is the formation of a single-layered concave/convex structure of a photosensitive polymer 203 on the flattening layer 201. A negative type is used for the photosensitive polymer 203, and it is preferable that the negative photosensitive polymer (hereinafter, referred to as a resist) contains a light absorption substance such as a pigment. Light is absorbed in direction of the thickness of the layer in the resist containing a pigment, as shown in FIG. 15. Therefore, the transmittance varies depending on the film thickness.

Figure 16:
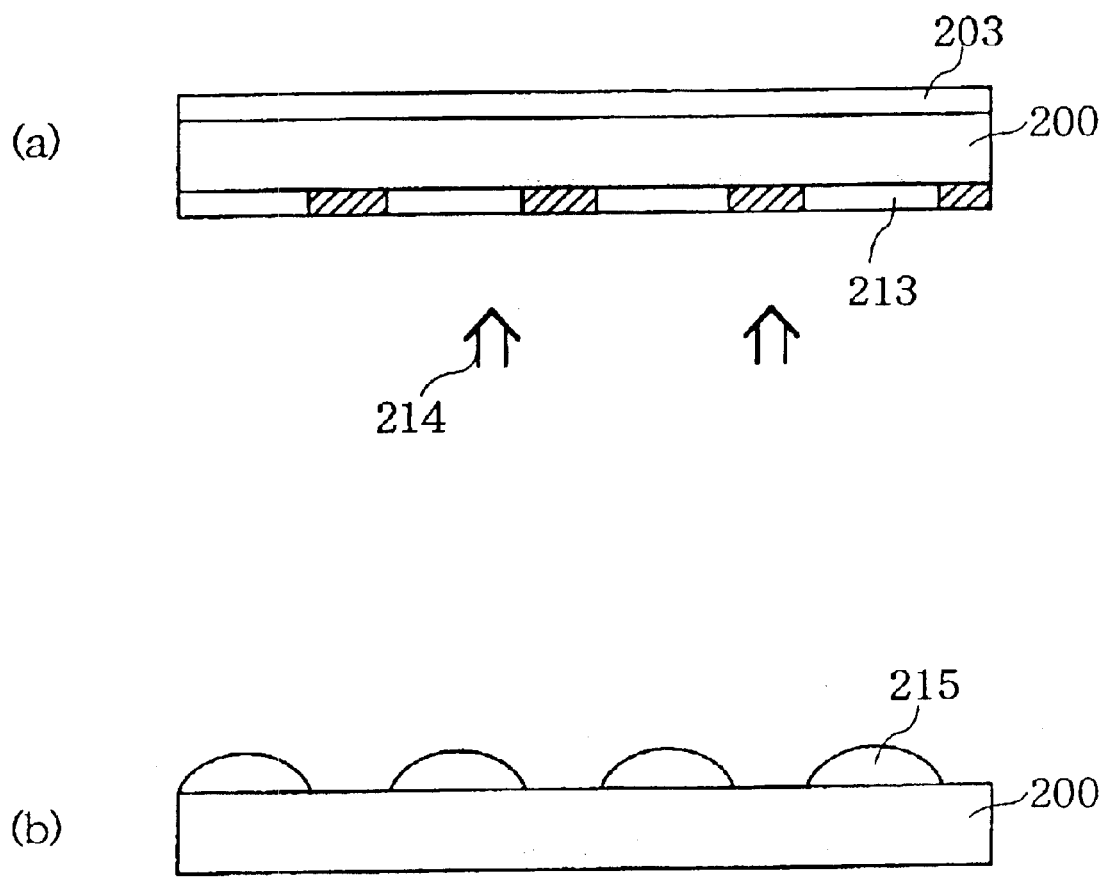
FIG. 16 is a principle view illustrating a method for manufacturing a concave/convex structure portion in the embodiment 2-1.

During exposure, an illuminated side of the layer receives a larger exposure amount. The exposure amount decreases as being closer to the opposite side. The negative resist remains on the surface wherever it is exposed. When it is exposed from backside, a larger portions of the negative resist remain as being closer to the substrate, as shown in FIG. 16. A concave/convex structure is thus formed that includes a convex sloped surface thereon after the development treatment.

Conventionally, two or more layers of the resists are laminated to form a concave/convex structure. On the contrary, the above-mentioned procedure allows easy formation of the concave/convex structure having a sloped surface only with a single layer of the resist.

The reflective layer 204 is formed by using an electrically conductive material such as a metal on the concave/convex structure obtained in the manner described above to form a reflective electrode. The reflective electrode is connected to the TFT cell 202 through a contact hole 210 formed in the flattening layer 201. An image signal is supplied to the reflective electrode using this TFT cell. Optical characteristics of a liquid crystal 205 sandwiched between the reflective electrode and a common electrode (not shown) that is formed on an opposing substrate 207 are controlled according to the image signal. A change in optical characteristics of the liquid crystal layer 205 is converted into a change in transmittance by a polarizer 209 and a retardation plate 208 that are disposed outside the opposing substrate, and an image is thus displayed. In this embodiment, an active matrix type with TFT cells is used as an example. However, a similar reflective electrode may be applied to a simple matrix type without TFT. The role of the reflective electrode and the operations of the liquid crystal display panel as described above are similar to those in the following embodiments.

[Method for Manufacturing Concave/Convex Structure Portion on Substrate]

First, a principle of a method for manufacturing a concave/convex structure portion is described. Then, a specific manufacturing method is described.

(1) Principle of Method for Manufacturing Concave/Convex Structure Portion

FIG. 16 is a principle view illustrating the method for manufacturing the concave/convex structure portion in this embodiment. As shown in FIG. 16(a), the negative photosensitive polymer 203 is applied to the substrate 200. Then, exposure is made from the backside of the substrate with an ultraviolet ray 214 using a mask 213 to form convex portions 215 (see FIG. 16(b)). With the photosensitive polymer 203 that contains a pigment, the ultraviolet ray 214 is absorbed in the direction of the thickness of the layer. An etching rate during the development differs in the direction of the thickness of the layer. Consequently, a concave/convex structure having a sloped surface is formed after the development. By varying the etching rate in the direction of the thickness of the layer, it becomes possible to form a sloped surface on the concave/convex structure after the development. Thus, the single-layered concave/convex structure can be formed. The back exposure produces a convex configuration thereon. The etching rate is determined depending on the layer thickness and the content of a pigment, and may be determined arbitrarily based on the tilt angle of the concave/convex structure. Furthermore, the etching rate varies much layers with a larger layer thickness and a larger absorption by the pigment. The convex portion becomes precipitous upward.

(2) Specific Example of Method for Manufacturing Concave/Convex Structure Portion Based on the above-mentioned principle, a specific method for manufacturing the concave/convex structure portion of this embodiment is described. A negative photosensitive polymer 203 (OMR-83, available from Tokyo Ohka Kogyo Co., Ltd.) was applied to the array substrate 200 to provide a film thickness of 2 μm. The photosensitive polymer 203 contained a pigment so that light absorptance of 80% is achieved at a wavelength of 405 nm for the film thickness of 2 μm.

Next, projection exposure was made from the backside of the substrate with an ultraviolet ray having the wavelength of 405 nm using a mask in which a number of circles each having a diameter of 10 μm are arranged as apertures. Thereafter, the development treatment was made using an OMR developing solution and a rinse solution (both of which are available from Tokyo Ohka Kogyo Co., Ltd.).

Figure 17:
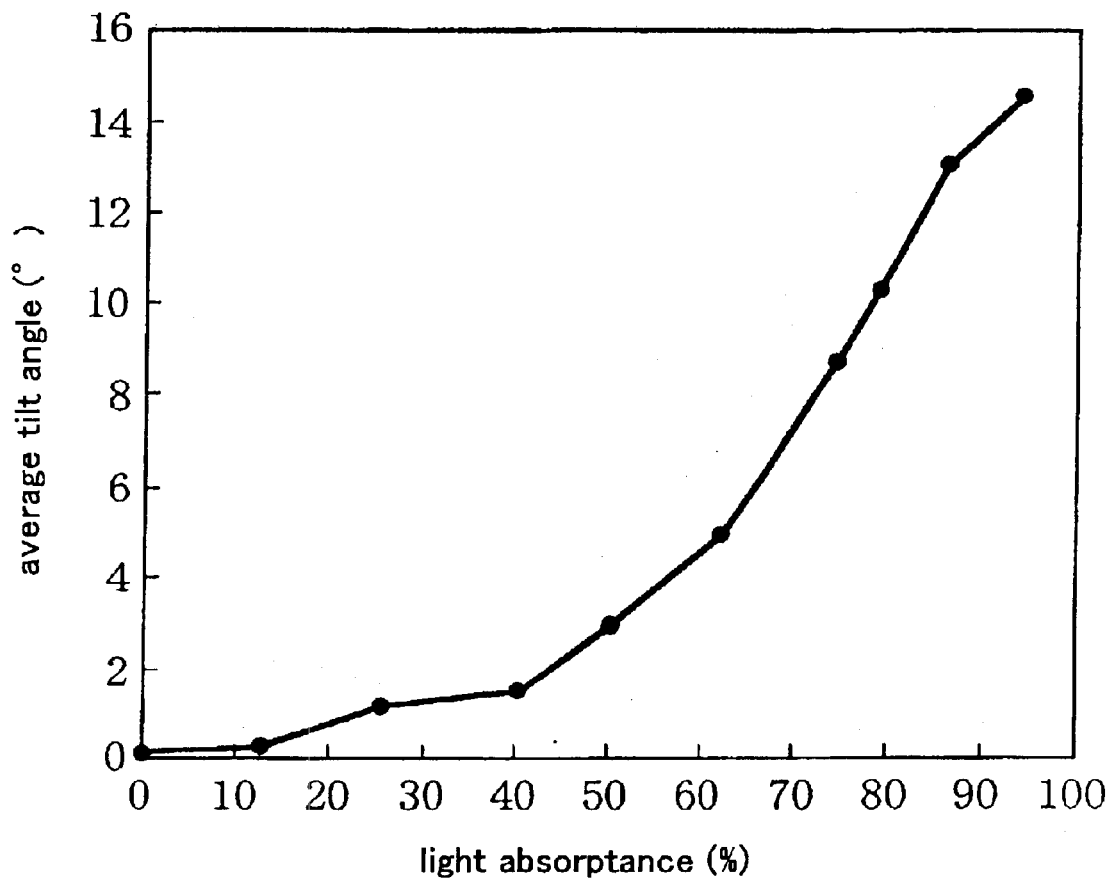
FIG. 17 is a view illustrating the light absorptance of a photosensitive polymer as a function of the average tilt angle.

Observation of the substrate through a laser microscope revealed that gentle concave/convex structure portions having an average tilt angle of 10° were formed on the surface. Similar processing was made with different light absorptances for the film thickness of 2 μm that is achieved by changing the contents of the pigment and the average tilt angle of the concave/convex structure was measured. The results thereof are given in FIG. 17. The average tilt angle exhibited an exponential increase as the light absorptance increased. This is because the etching rate in the direction of the thickness of the layer is correlated with the light absorptance. With the light absorptance of not higher than 50%, a difference in etching rate is small. The average tilt angle is as small as 1 to 2° accordingly. As to the reflection characteristics, good reflective display was not obtained in a mirror-like state.

With a light absorptance of not lower than 50%, an average tilt angle was at least 3°. This resulted in diffusive performance. An average tilt angle of 8° to 15°, which produces good reflective display, was achieved with the light absorptance of 70% or higher. It is desirable from a productivity viewpoint that the light absorptance does not exceed 95% because an excessively high light absorptance requires a longer exposure time.

Conventionally, two or more layers of the resists are laminated to form a concave/convex structure. On the contrary, the above-mentioned procedure allowed easy formation of the concave/convex structure having a sloped surface only with a single layer of the resist.

The photosensitive polymer is not limited to the one described above, as long as it is a negative type. The film thickness and the content of the pigment may be determined arbitrarily with the light absorptance being used as an index. It is, however, desirable that the film thickness is at least 1 μm and not larger than 5 μm by the practical considerations. The film thickness of not larger than 1 μm has a possibility of separation during the development. The film thickness of at least 5 μm results in scratches in the upper surface of the layer during the development. This produces unstable shape of the concave/convex structures. Accordingly, there is a challenge associated with productivity.

The resist may be any other negative resist other than the one described above.

(Embodiment 2-2)

The embodiment 2-2 is characterized in that, in a similar configuration to that of FIG. 14, the photosensitive polymer 203 is formed of a negative resist with which the shape of the concave/convex structure hardly varies during thermal annealing after the development. When the concave/convex structures are formed in a similar manner to that described in conjunction with the embodiment 2-1, the portions of the resist that remain depend on the direction of the thickness of the layer. Thus, concave/convex structures having convex sloped surface thereon are formed. By preventing thermal deformation of the concave/convex structures that are formed using the resist, the concave/convex structures are not deformed in a hot process such as to cure an alignment film in preparing a panel and a sealing, and good reflection characteristics are obtained.

Conventionally, the sloped surface is formed by means of melting the upper resist during the thermal annealing treatment, and it is difficult to control the shape. On the contrary, this configuration eliminates the necessity for the heat treatment step. The concave/convex shape can be controlled more accurately, which increases productivity. The elimination of the heat treatment makes it possible to use a plastic substrate or others having a lower heat resistance than glass.

[Method for Manufacturing Concave/Convex Structure Portion on Substrate]

The manufacturing method in this embodiment is basically similar to that described in conjunction with the embodiment 2-1. It should be noted that a difference from the embodiment 2-1 lies in the use of a negative resist (OMR-85, available from Tokyo Ohka Kogyo Co., Ltd.) for the photosensitive polymer 203 with which the shape of the concave/convex structure hardly varies during the thermal annealing after the development.

Using such a negative resist, the procedure in the embodiment 2-1 was repeated to prepare a substrate. The substrate thus obtained was subjected to an annealing treatment under 200° C./30 minutes (alignment film curing) and 160° C./120 minutes (seal curing), which is corresponding to the heat treatment step for the preparation of the panel. Change in shape of the concave/convex structure was observed through a laser microscope. As a result, the change in average tilt angle before and after the annealing was as small as about 1°, from 10.5° before the annealing to 9.4° after the annealing. This change is not higher than 10%. The reflection characteristics were also similar.

When the change in average tilt angle before and after the annealing is not higher than 20%, it can be applied to a small panel of not larger than 2 inches, even with variations of distribution of the tilt angles. With the change of not higher than 10%, it can be applied to a medium or larger panel (3 inches or larger).

As apparent from the above, the concave/convex structure having a sloped surface formed using a resist whose shape does not change in the heat treatment can reduce variations of tilt angles due to the annealing treatment and improve productivity.

(Embodiment 2-3)

Figure 18:
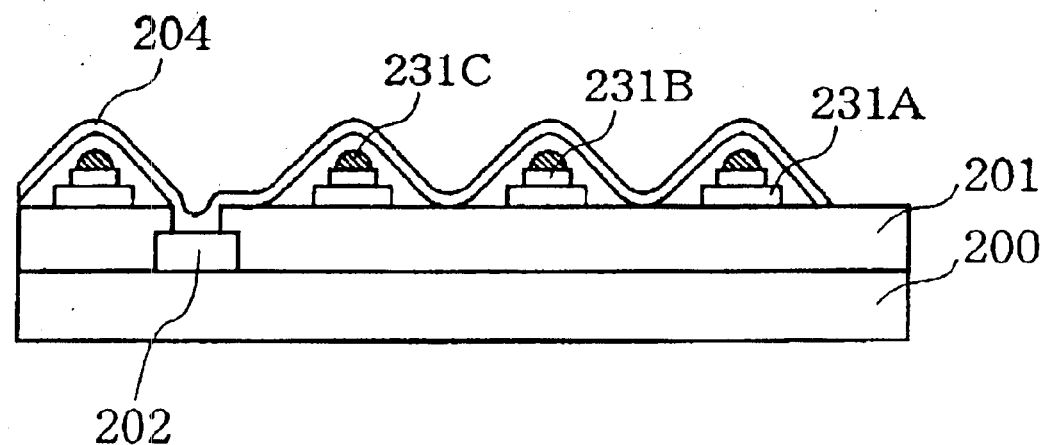
FIG. 18 is a cross-sectional view of a liquid crystal display panel according to the embodiment 2-3.

FIG. 18 is a cross-sectional view of a liquid crystal display panel according to the embodiment 2-3. It is characterized in that at least one layer is a negative photosensitive polymer when a concave/convex structure is formed on the array substrate 200, in which the concave/convex structure has a plurality of photosensitive polymers (photosensitive polymers 231A, 231B, and 231C) laminated on top of each other. Here, back exposure of a negative resist produces a concave/convex structure having a sloped surface, because of the above-mentioned reasons. Control of the height of the concave/convex structure and the angle of the sloped surface becomes easier when the photosensitive polymer layer has a multi-layered configuration. With the layer of the negative resist used on the topmost surface, the apexes of the convex portion are smoothened. This results in reduction of the regular reflection sections and improvement of visibility.

[Method for Manufacturing Concave/Convex Structure Portion on Substrate]

Positive photosensitive polymers 231A and 231B (both of which are OFPR5000, available from Tokyo Ohka Kogyo Co., Ltd.) were formed on the array substrate 200 to a diameter of 12 μm and a thickness of 0.5 μm and a diameter of 8 μm and a thickness of 0.6 μm, respectively. A negative photosensitive polymer C231C (OMR-83, available from Tokyo Ohka Kogyo Co., Ltd.) was coated to a film thickness of 2 μm. Back exposure was made to process it into a convex motif having a diameter of 4 μm and a thickness of 1.0 μm. A concave/convex structure was obtained in which the total difference in lifts of the above-mentioned three layers was 2.3 μm. The concave/convex structure is covered with a resin, on which the reflective layer 204 was formed using aluminum. The average tilt angle of the convex portion of the reflective layer was 9°. The reflection characteristics obtained were good with high luminance.

The configuration of the photosensitive polymer layer may be determined arbitrarily by the height of the concave/convex structure and the angle of the sloped surface, without being limited to the above-mentioned example. An inorganic material may be used in place of the photosensitive polymer layer. For example, Si, $SiO_2$, or SiNx may be used to form differences in lifts. With the layer of the negative resist used on the topmost surface, the apexes of the convex portion are smoothened. This results in reduction of the regular reflection sections and improvement of visibility. However, it is not necessarily the topmost layer. The sloped surface can be obtained even in a lower portion, with an upper layer laminated along the contour of the apexes of the convex portion. However, control of the shape becomes slightly difficult because the upper layer serves as a planar layer.

(Embodiment 2-4)

In a similar configuration to that of FIG. 18, a photosensitive polymer 231C is formed of a negative resist in which the shape of the concave/convex structure hardly varies during thermal annealing after the development. The negative resist with which the shape of the concave/convex structure does not change during the thermal annealing allows easy formation of the concave/convex structure and improvement of productivity because of the reasons described in conjunction with the above-mentioned embodiment 2-2.

[Method for Manufacturing Concave/Convex Structure Portion on Substrate]

In a similar configuration to that described in embodiment 2-3, the photosensitive polymer 231C was formed of a negative resist (OMR-85, available from Tokyo Ohka Kogyo Co., Ltd.) with which the shape of the concave/convex structure hardly varies during the thermal annealing after the development. The shape of the concave/convex structure does not vary in the heat treatment step during the preparation of a panel because of the reasons described in conjunction with the above-mentioned embodiment 2-2. Consequently, the liquid crystal display panel thus obtained exhibited good reflection characteristics.

(Embodiment 2-5)

Figure 19:
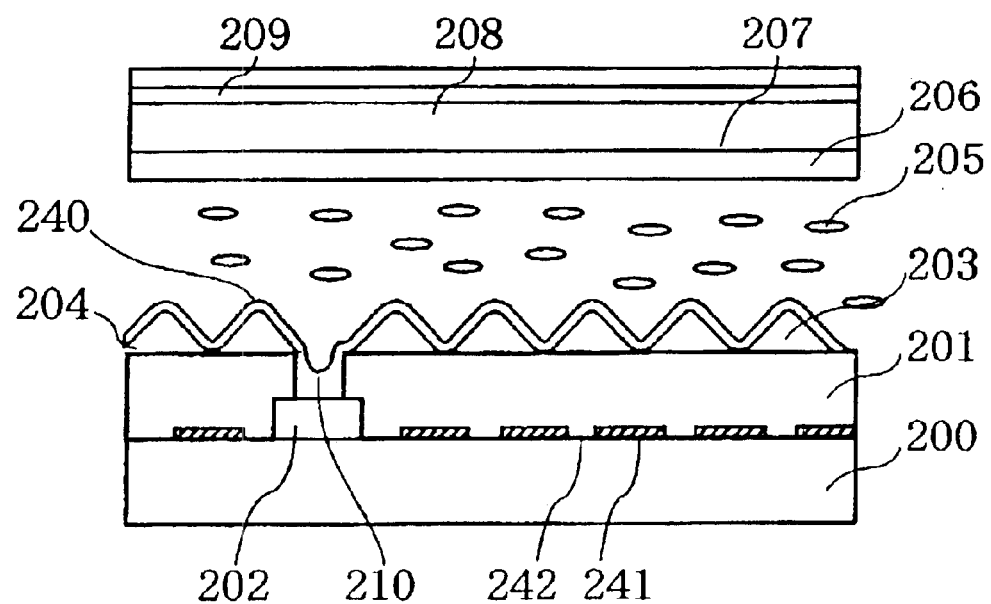
FIG. 19 is a cross-sectional view of a liquid crystal display panel according to the embodiment 2-5.

FIG. 19 is a cross-sectional view of a liquid crystal display panel according to the embodiment 2-5. The embodiment 2-5 is similar to the embodiment 2-1, and similar components and parts are depicted by like reference numerals. The embodiment 2-5 is characterized in that, when, for example, a light-shielding layer 241 having apertures 242 formed therein and the flattening layer 201 are formed on the array substrate 200 the apexes 240 of the concave/convex structures formed of the photosensitive polymer 203 are provided above the apertures 242 in the light-shielding layer 241.

Back exposure using the light-shielding layer 241 as a mask produces concave/convex structures on the negative photosensitive polymer 203. In this event, the apexes 240 are formed above the apertures 242.

Inside mounting of the light-shielding layer eliminates the necessity for any external mask and improves the accuracy of alignment, which facilitates to control the shape of the concave/convex structure. In addition, it becomes possible to form a storage capacitor between the light-shielding layer 241 and the reflective layer 204. This improves productivity.

[Method for Manufacturing Concave/Convex Structure Portion on Substrate]

First, a principle of a method for manufacturing a concave/convex structure portion is described. Then, a specific manufacturing method is described.

(1) Principle of Method for Manufacturing Concave/Convex Structure Portion

Figure 20:
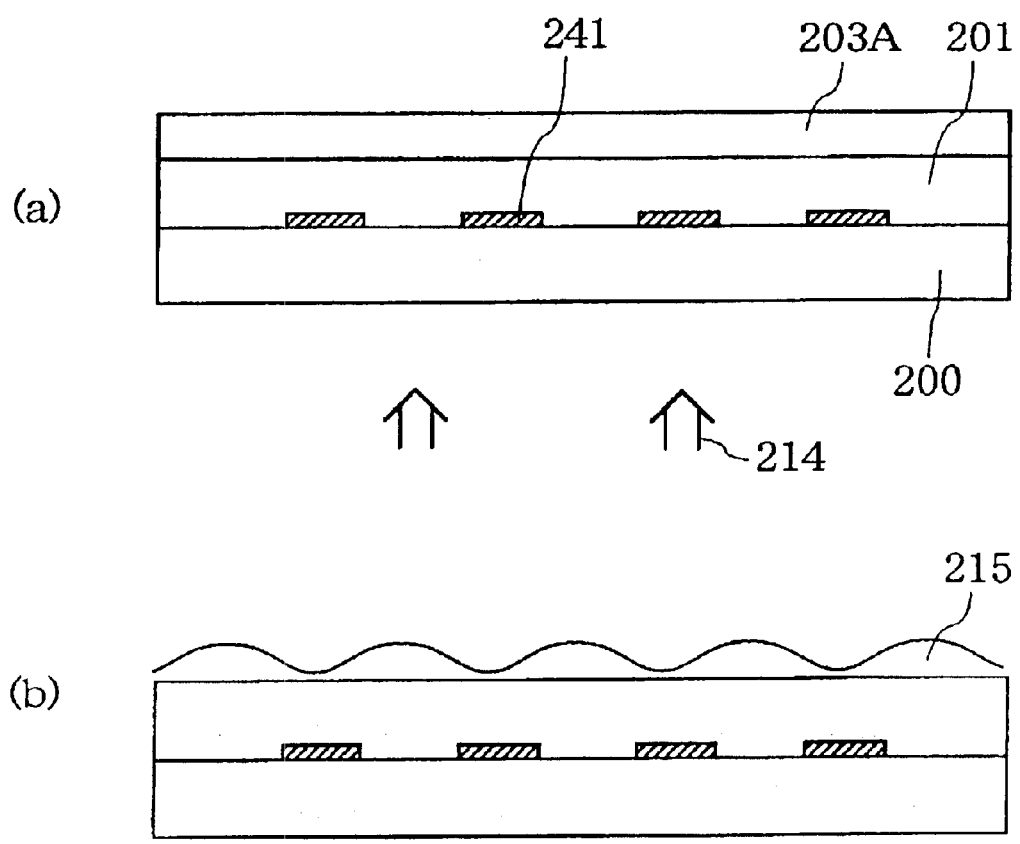
FIG. 20 is a principle view illustrating a method for manufacturing a concave/convex structure portion in the embodiment 2-5.

FIG. 20 is a principle view illustrating the method for manufacturing the concave/convex structure portion in this embodiment. As shown in FIG. 20(a), the light-shielding layer 241 having apertures formed therein and the flattening layer 201 are formed on the substrate 200. Subsequently, the negative photosensitive polymer containing, for example, pigments is applied to form a photosensitive polymer resin layer 203A. Next, exposure is made from the backside of the substrate using an ultraviolet ray 214. The light-shielding layer 241 serves as a mask. Formed are the convex portions 215 each having the apex in the region of the aperture in the light-shielding layer (see FIG. 20(b)).

Inside mounting of the light-shielding layer 241 onto the substrate advantageously eliminates the necessity for the mask and improves patterning accuracy.

Figure 21:
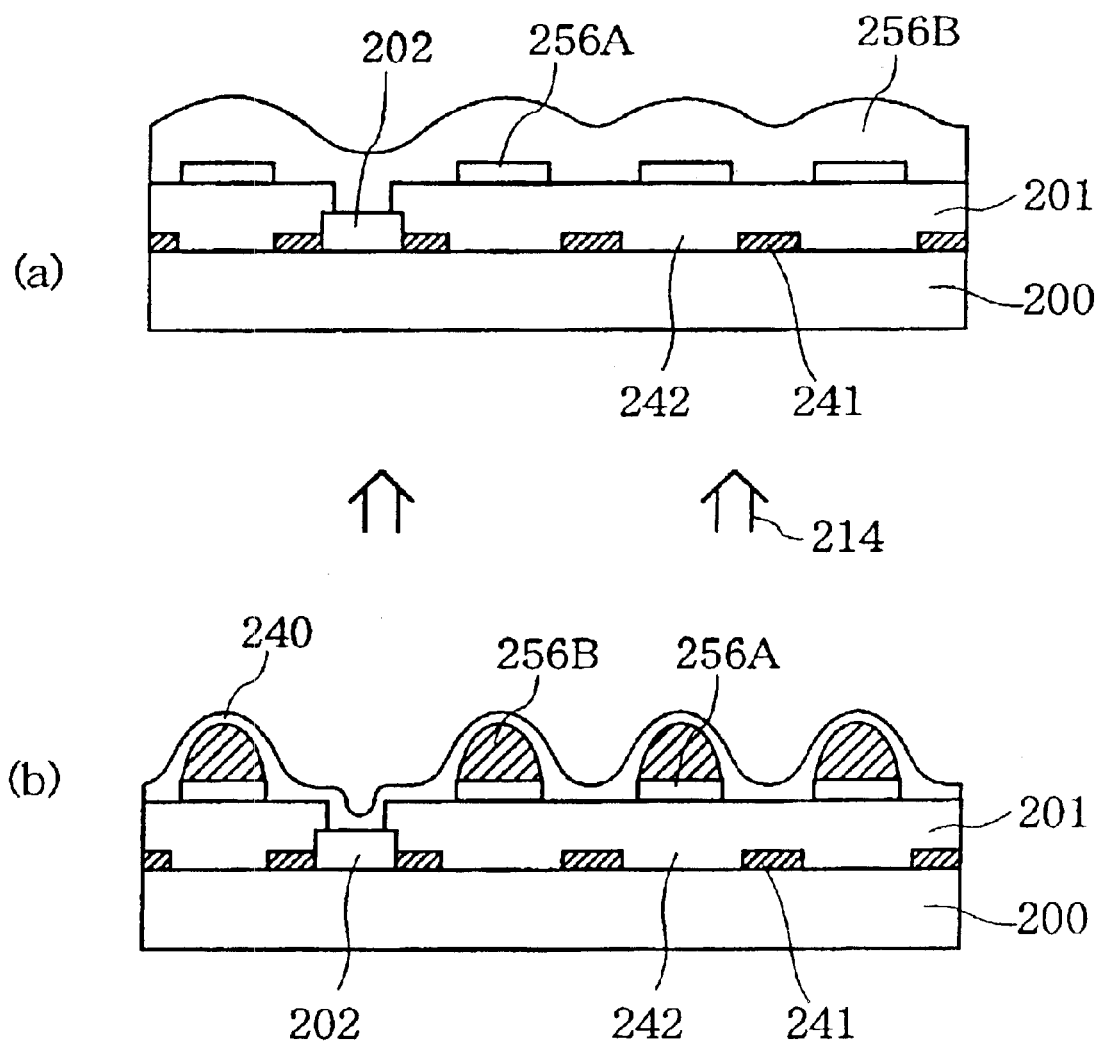
FIG. 21 is a cross-sectional view of a multi-layered configuration such as a two-layered configuration formed of photosensitive polymers 256A and 256B.

The photosensitive polymer layer may have a multi-layered configuration such as a two-layered configuration formed of photosensitive polymers 256A and 256B shown in FIG. 21, other than the single-layered configuration shown in FIG. 20.

(2) Specific Example of Method for Manufacturing Concave/Convex Structure Portion The aluminum light-shielding layer 241 having the circular apertures 242 formed therein each of which is 10 μm in diameter, and the flattening layer 201 (SiO$_2$ layer of 1 μm thick) were formed on the array substrate 200.

Next, the negative photosensitive polymer 203 (OMR-83, available from Tokyo Ohka Kogyo Co., Ltd.) was applied to provide a film thickness of 2 μm. The light-shielding layer 241 was used as the mask for an exposure treatment from the backside of the substrate. Development and rinsing treatments were performed after the exposure. Thus, the concave/convex structure having the apex 240 above the aperture 242 in the light-shielding layer 241 was formed. The average tilt angle at this time was 8°.

The back exposure using the light-shielding layer 241 as the mask produced the concave/convex structure on the negative photosensitive polymer 203. Inside mounting of the light-shielding layer eliminates the necessity for any external mask and improves the accuracy of alignment, which facilitates to control the shape of the concave/convex structure. In addition, it becomes possible to use a place between the light-shielding layer 241 and the reflective layer 204 as a storage capacitor. This improves productivity.

The aperture 242 may have any configuration depending on the shape of the concave/convex structure.

(Embodiment 2-6)

Figure 22:
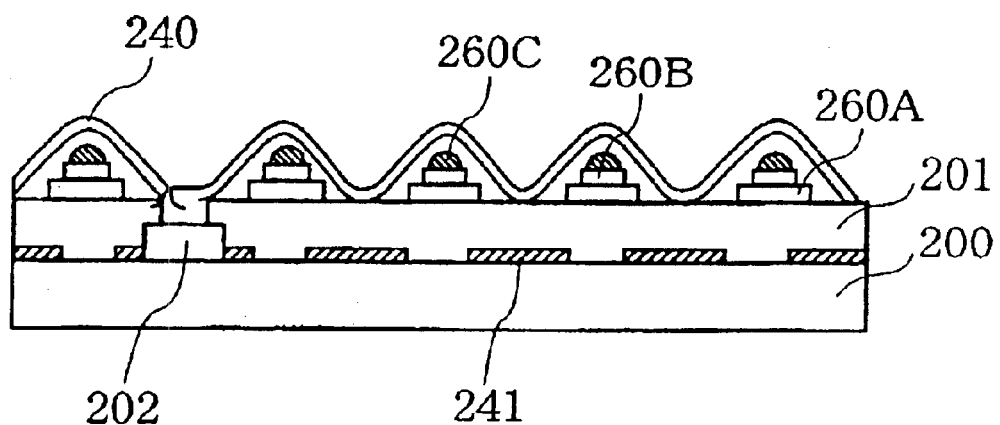
FIG. 22 is a configuration view of an array substrate in a liquid crystal display panel according to the embodiment 2-6.

FIG. 22 is a configuration view of an array substrate in a liquid crystal display panel according to the embodiment 2-6. It comprises a similar configuration to that in the embodiment 2-5, which is characterized in that the light-shielding layer 241 is formed on the array substrate 200 and the concave/convex structure is formed of a plurality of photosensitive polymers (260A, 260B, and 260C). The plurality of photosensitive polymers facilitate the control of the shape of the concave/convex structure. Inside mounting of the light-shielding layer 241 eliminates the necessity for any external mask.

[Method for Manufacturing Concave/Convex Structure Portion on Substrate]

The light-shielding layer 241 was made of aluminum on the array substrate 200 in a similar way to the embodiment 2-5. The concave/convex structure was formed from a plurality of photosensitive polymers (260A, 260B, and 260C) in a similar way to the above-mentioned embodiment 2-3. In this event, the topmost layer, i.e., the photosensitive polymer 260C was formed through the back exposure of the negative resist.

The plurality of photosensitive polymers facilitate the control of the shape of the concave/convex structure. Inside mounting of the light-shielding layer 241 eliminates the necessity for any external mask.

(Embodiment 2-7)

Figure 23:
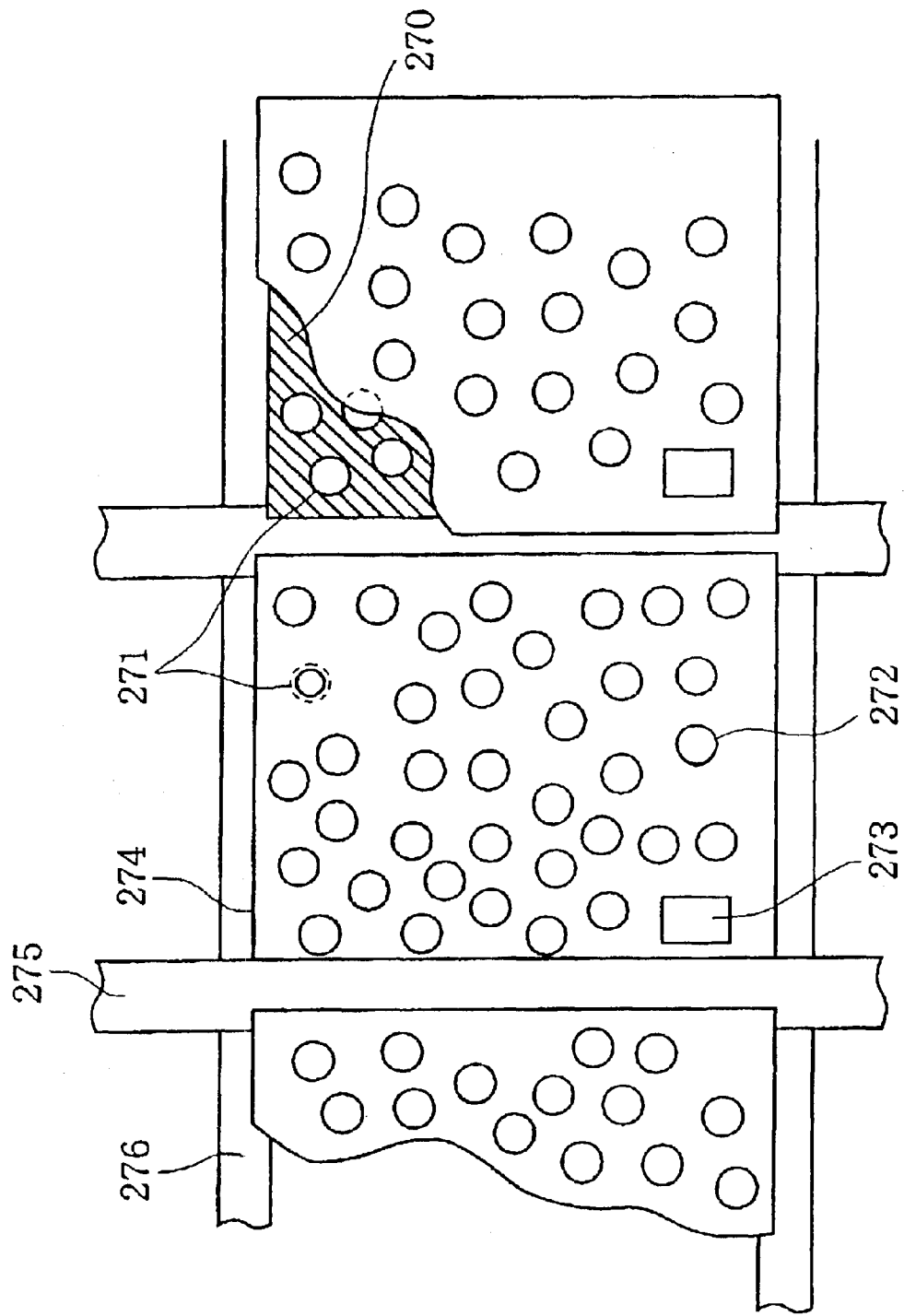
FIG. 23 shows a pixel configuration of a liquid crystal display panel according to the embodiment 2-7.

FIG. 23 shows a pixel configuration of a liquid crystal display panel according to the embodiment 2-7. In a generally identical configuration to that of the embodiment 2-5 in FIG. 19, it is characterized in that apertures 271 in a light-shielding layer 270 are formed in contour with apertures in the diffraction grating. In this event, the aperture 271 includes the apex of a convex portion 272. In addition, the negative resist does not necessarily contain, for example, pigments. In FIG. 23, the reference numeral 273 represents a contact hole, the reference numeral 274 represents a reflective electrode, the reference numeral 275 represents a source line, and the reference numeral 276 represents a gate line.

Figure 24:
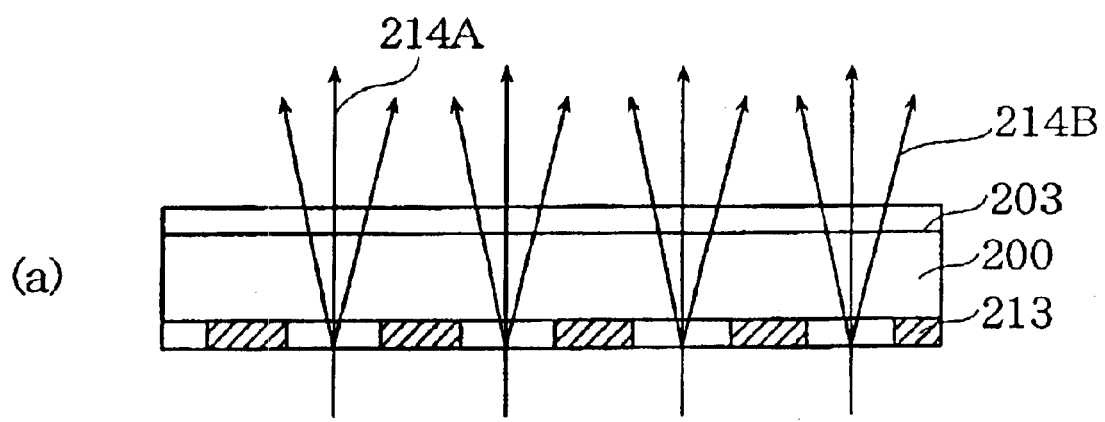
FIG. 24 is a view illustrating a photosensitive resist illuminated with exposure light serving as a diffracted light.
Figure 24:
Figure 24:
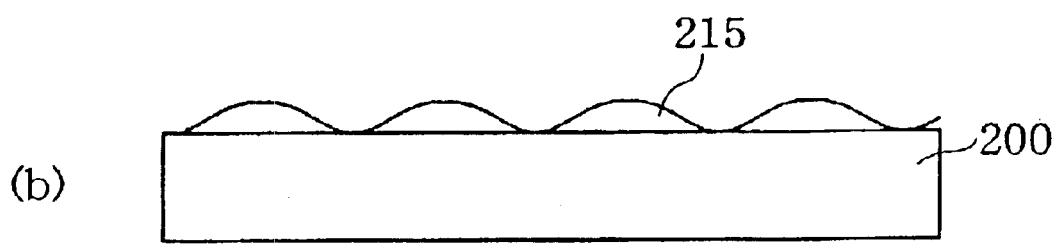

Making back exposure with the light-shielding layer having the shape of a diffraction grating causes exposed light 214 to be divided into diffracted lights and directed to the photosensitive resist, as shown in FIG. 24(a). The zero order of the diffracted light propagates straight as a straight light 214A. Diffracted lights 214B of the first and higher orders are directed at an oblique angle to the resist. Consequently, the concave/convex shape after the development is a concave/convex structure having a sloped surface (see FIG. 24(a)). As described above, the exposure using the diffracted lights allows production of the concave/convex structure having the sloped surface, without the use of any multi-layered configuration. In addition, the resist does not required to contain, for example, pigments.

In the above-mentioned description of the principle, the exposure performed using a mask is described as an example. However, similar things apply to the exposure without a mask that is performed by forming a light-shielding layer having apertures formed therein.

[Method for Manufacturing Concave/Convex Structure Portion on Substrate]

First, a principle of a method for manufacturing a concave/convex structure portion is described. Then, a specific manufacturing method is described.

(1) Principle of Method for Manufacturing Concave/Convex Structure Portion

Figure 25:
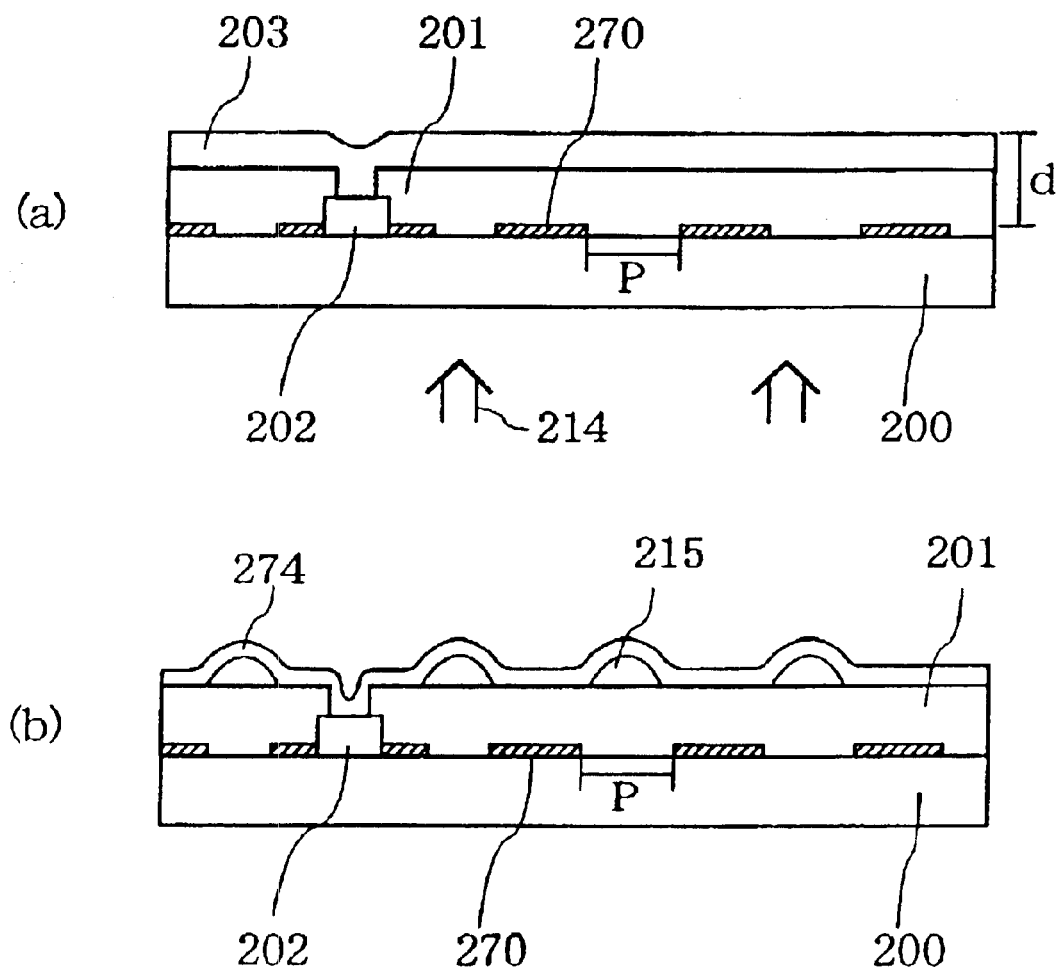
FIG. 25 is a principle view illustrating a method for manufacturing a concave/convex structure portion in the embodiment 2-7.

FIG. 25 is a principle view illustrating the method for manufacturing the concave/convex structure portion in this embodiment. In a generally similar configuration to that described in the embodiment 2-5, it is characterized in that the light-shielding layer 270 is formed to have a shape that exhibits diffraction performance. When the exposure is made using the diffracted lights, the photosensitive polymer is exposed with the light incident at an oblique angle as well, and the concave/convex structure having the sloped surface is formed, for the above-mentioned reasons. The use of the diffracted lights eliminates the necessity of containing, for example, pigments in the negative resist. This advantageously reduces the costs.

The diffracted lights (interfered lights) have nodes and loops at a short pitch when the equation P>d is satisfied, wherein P represents the pitch of the apertures in the light-shielding layer 270 and d represents the distance between the light-shielding layer 270 and the apex of the convex portion of the concave/convex structure. Consequently, the concave/convex structures can be formed densely.

The concave/convex structures can be varied using the shape of the apertures in the light-shielding layer 270. For example, a circle produces a dot-shaped concave/convex structure while a stripe produces a stripe concave/convex structure.

(2) Specific Example of Method for Manufacturing Concave/Convex Structure Portion Based on the above-mentioned principle, a specific method for manufacturing the concave/convex structure portion of this embodiment is described. In a generally similar configuration to that described in the embodiment 2-5, the light-shielding layer 270 was formed to have a shape of a diffraction grating including dots. In this event, the aperture 271 in the diffraction grating was shaped to be a circle having a diameter of 10 $\mu$m. A negative photosensitive polymer (OMR-83, available from Tokyo Ohka Kogyo Co., Ltd.) was applied to provide a film thickness of 2 $\mu$m. The photosensitive polymer used does not contain, for example, pigments and the light absorptance thereof is 5%.

Back exposure was made using the light-shielding layer having a shape of the diffraction grating. The diffracted lights were directed to the photosensitive resist accordingly. In this event, the zero order of the diffracted light propagates straight. Diffracted lights of the first and higher orders were directed at an oblique angle to the resist. The average tilt angle at that time was 7°.

As described above, the exposure using the diffracted lights allows production of the concave/convex structure having the sloped surface, without the use of any multi-layered configuration. In addition, the resist does not required to contain, for example, pigments, reducing the costs therefor.

(Embodiment 2-8)

The embodiment 2-8 is characterized in that a concave/convex structure portion is formed on a substrate by means of directing an exposure light at an oblique angle to the substrate when a photosensitive polymer is exposed on the substrate.

More specifically, the following manufacturing equipment is used for the preparation of the concave/convex structure portion.

Figure 26:
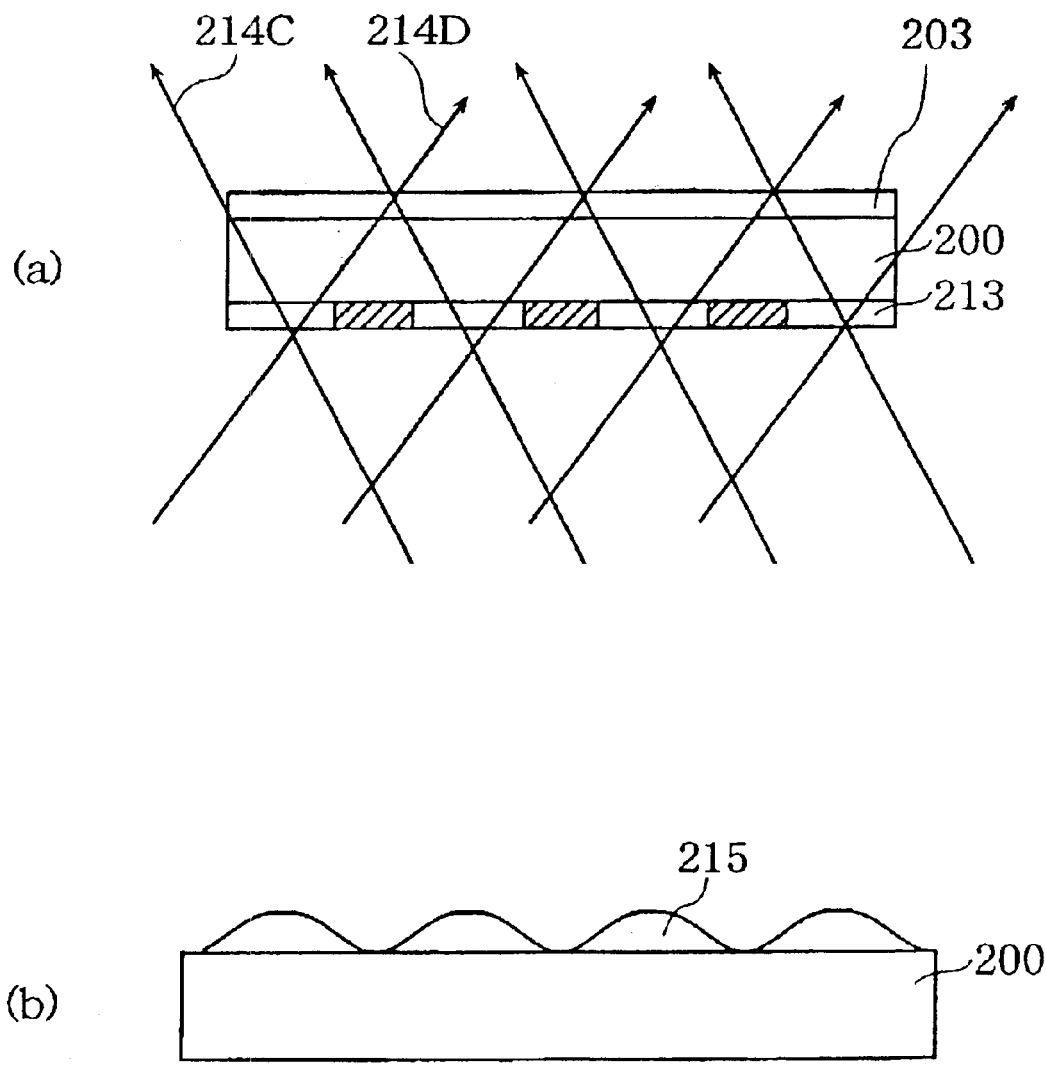
FIG. 26 is a principle view of a manufacturing equipment for a substrate of the present invention.

FIG. 26 is a principle view of a manufacturing equipment for a substrate of the present invention. As shown in FIG. 26(*a*), it is characterized in that the convex portions 215 (see FIG. 26(*b*)) are formed on the substrate 200 by providing means (mechanism) that applies the photosensitive polymer 203 to the substrate 200 and then irradiates exposing lights from some directions (an ultraviolet ray 214C and an ultraviolet ray 214D) through the mask 213. Radiation from some directions varies the etching rate for the photosensitive polymer 203 in the direction of the thickness of the layer. As a result, a concave/convex structure having a sloped surface is formed. It is desirable that the incident direction at this time is within a polar angle 60°. It is desirable that the solid angle of the exposure light is at least 0.5° and not larger than 15°.

A concave/convex structure having an asymmetric shape can be prepared easily by using a manufacturing equipment that comprises a mechanism capable of varying the angle of incidence of ultraviolet rays when they are directed from some orientations. In this event, the reflection characteristics exhibit an asymmetric curve. For example, the reflected lights can be focused toward a viewer when the substrate is inclined to thereby enhance the luminance.

Using the ultraviolet rays 214C and 241D having different phases from each other, the degree of interference can be adjusted. In this event, the etching rage in the direction of the thickness of the layer may advantageously be adjusted. Accordingly, this equipment for manufacturing the substrate may be provided with a transphasor suitable for the ultraviolet rays.

(Embodiment 2-9)

This embodiment is characterized by manufacturing a substrate having a concave/convex structure by exposure that uses a so-called two-beam interference.

Figure 27:
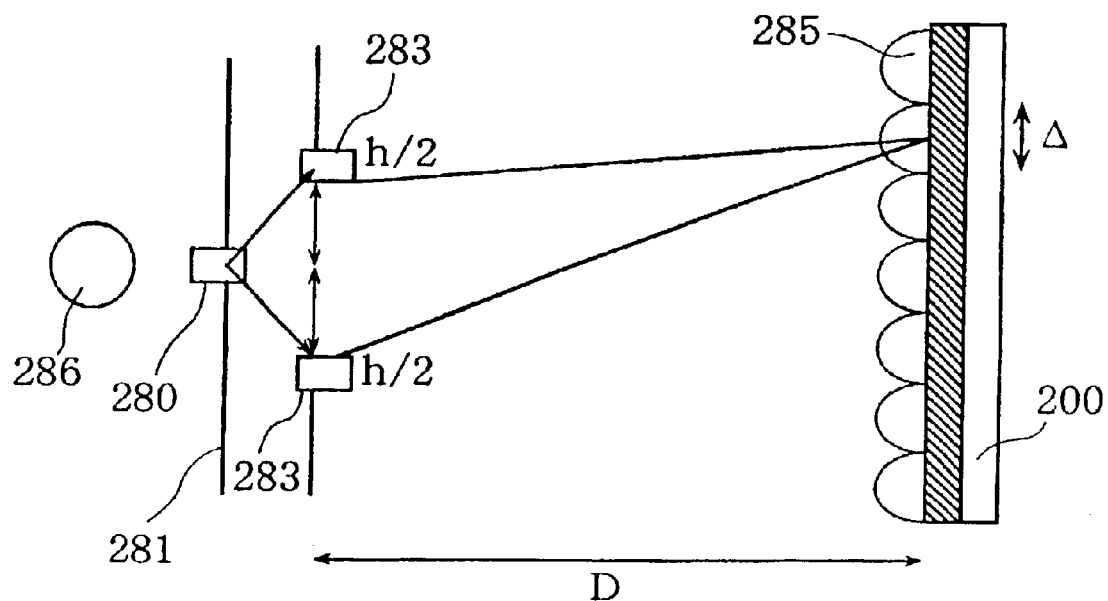
FIG. 27 is a principle view of an aligner that is used in the embodiment 2-9.

An aligner used in this embodiment irradiates exposure lights to the substrate 200 where a photosensitive resin 285 is applied, through a mask 281 having pinholes 280 formed therein each of which is 5 $\mu$m in diameter, and two or more slits 283, as shown in FIG. 27. In this event, an ultra-high pressure mercury-vapor lamp was used as a light source for the exposure lights. A resin that exhibits photosensitive properties at i line (365 nm) was used as the photosensitive resin 285. Furthermore, the distance between the slits, i.e., h (=50 $\mu$m), was set to be at equal distances from the pinholes. A pinhole having a diameter of 5 $\mu$m was used as the slit. The photosensitive resin was irradiated by the exposure lights with the distance between the slit and the substrate being set to D (=3.42 mm) for the development. As a result, a convex shape was formed with a pitch Δ (=25 $\mu$m). A shape structure having a tilt angle of about 10° was obtained by defining the thickness of the resin of from 2 to 3 $\mu$m.

In this embodiment, the single light source, pinholes and two slits were used to apparently provide exposure lights of two spherical waves having the same phase. However, two or more lasers may be used for similar implementation.

In addition, the equation:

$$\Delta = 1000 \times \lambda D/h$$

wherein Δ $\mu$m represents the pitch of the concave/convex shape, h $\mu$m represents the distance between the slits, D $\mu$m represents the distance between the slit and the photosensitive resin, and λ nm represents the wavelength of the exposure lights.

In addition, the following equation:

$$2d/\Delta = \tan\theta$$

wherein θ° represents the tilt angle, and d represents the maximum film thickness of the resin after the development.

Any concave/convex shape may be prepared by appropriately determining the terms Δ, h, D, λ, d, and θ to satisfy the above-indicated equations.

(Other Considerations)

(1) It is possible to implement a liquid crystal display device that exhibits good display performance, the costs for which can be reduced because of the simplified process of manufacture, by means of providing, for example, a backlight or a housing to the liquid crystal display panel described in the above-mentioned embodiments.

(2) In the above-mentioned embodiments, the description is made in conjunction with the reflector in the liquid crystal display panel. However, the present invention is not limited thereto. Instead, it may be applied widely to optical elements such as lenses, or concave/convex shape structures that are used in other technical fields.

(3) In the above-mentioned embodiments, the photosensitive polymer contains a light absorption substance such as a pigment. However, in place of this light absorption substance, a light diffusion substance such as metal particles may be contained in the photosensitive polymer. The light diffusion substance contained makes it possible to change the absorptance of the ultraviolet ray in the direction of the film thickness during the exposure, as in the case where the light absorption substance is contained. Accordingly, the concave/convex structure can be produced.

(4) While the negative photosensitive polymer is used in the above-mentioned embodiments, a positive photosensitive polymer may be applied instead. When the positive photosensitive polymer is used, such a mask may be used that comprises inverted configuration of the light-shielding elements and the apertures with respect to the configuration used in combination with the negative photosensitive polymer.

[Third Group of Inventions]

The third group of inventions are inventions of a reflector having a plurality of convex portions provided thereon, the convex portions being obtained by means of melt deformation of column-shaped bodys formed of a photosensitive resin material, characterized in that: the photosensitive resin material has aspect ratio vs. average tilt angle characteristics in which an average tilt angle reaches a maximum value through an incremental change process and then converges to a certain value through a decremental process when an aspect ratio is gradually increased from a value close to zero, the aspect ratio being represented as a ratio of two representative dimensions that define the shape of the column-shaped body, provided that the average tilt angle of the convex portion is an angle between a straight line that connects a predetermined point on the outer periphery of the bottom surface of the convex portion and an apex of the convex portion, and the bottom surface of the convex portion, the average tilt angle of the a plurality of convex portions being the converged value in the aspect ratio vs. average tilt angle characteristics.

As specific examples of the third group of inventions, the embodiments 3-1 to 3-3 are illustrated below to describe the third group of inventions.

(Embodiment 3-1)

Figure 28:
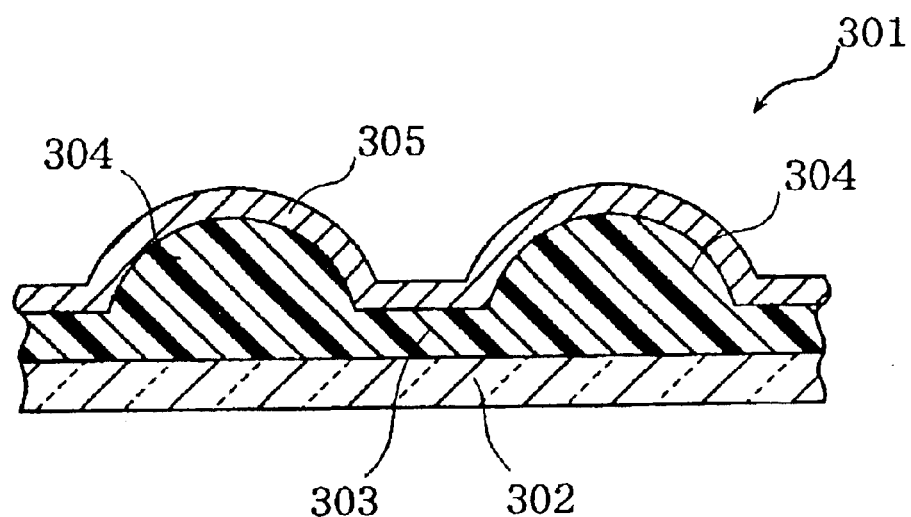
FIG. 28 is a cross-sectional view of essential parts of a reflector according to the embodiment 3-1.
Figure 29:
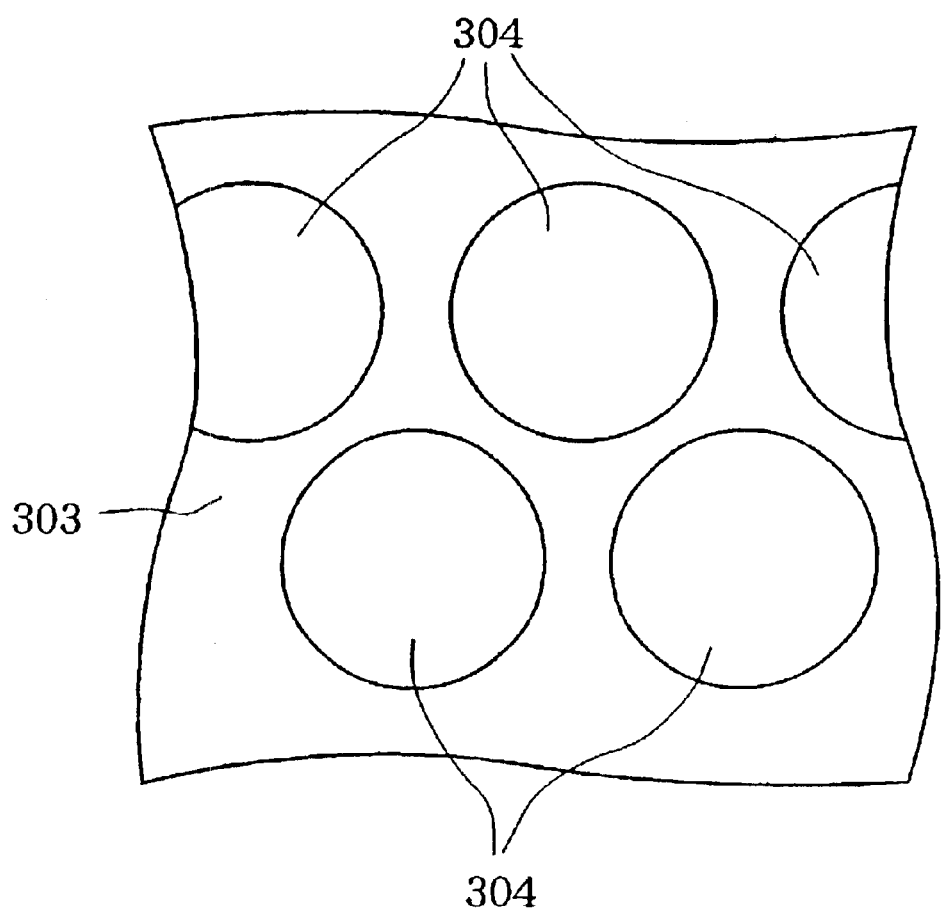
FIG. 29 is a plan view of a reflector according to the embodiment 3-1.

FIG. 28 is a cross-sectional view of essential parts of a reflector according to the embodiment 3-1. FIG. 29 is a plan view thereof. FIG. 29 shows a plan view of the reflector before the deposition of a thin light reflecting film. A reflector 301 comprises a substrate 302, a residual film 303, a plurality of convex portions 304 that are integrally formed with the residual film 303, and a thin light reflecting film 305 which covers the plurality of convex portions 304 and which has a surface (upper surface in FIG. 28) including irregularities. The residual film means portions of the film that remain without being developed in the development step in a photolithographic process which is described later. Therefore, according to the definition of the residual film, only the portions of the residual film 303 located between the convex portions 304 correspond to the residual film. The portions of the residual film 303 that are located below the convex portions 304 are not the residual film in a strict sense. However, for the convenience of description, the portions of the residual film 303 located below the convex portions 304 are also referred to as the residual film. The substrate 302 is an insulating substrate such as glass (trade name: 1737, available from Corning Incorporated). The thickness thereof may be, for example, 1.1 mm. In addition, the thin light reflecting film 305 is formed of a thin metal film such as aluminum (Al).

The residual film 303 and the convex portions 304 are formed of a photosensitive resin. Examples of the photosensitive resin include positive resists and electron beam resists. In this embodiment, a low γ positive resist (trade name: PC409, available from JSR) as the positive resist is used.

Figure 30:
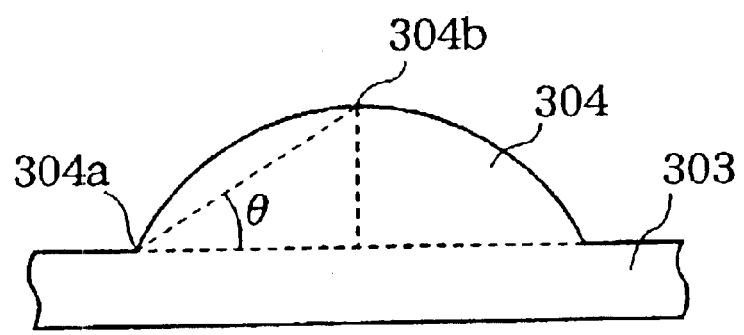
FIG. 30 is an enlarged cross-sectional view of a convex portion 304.
Figure 31:
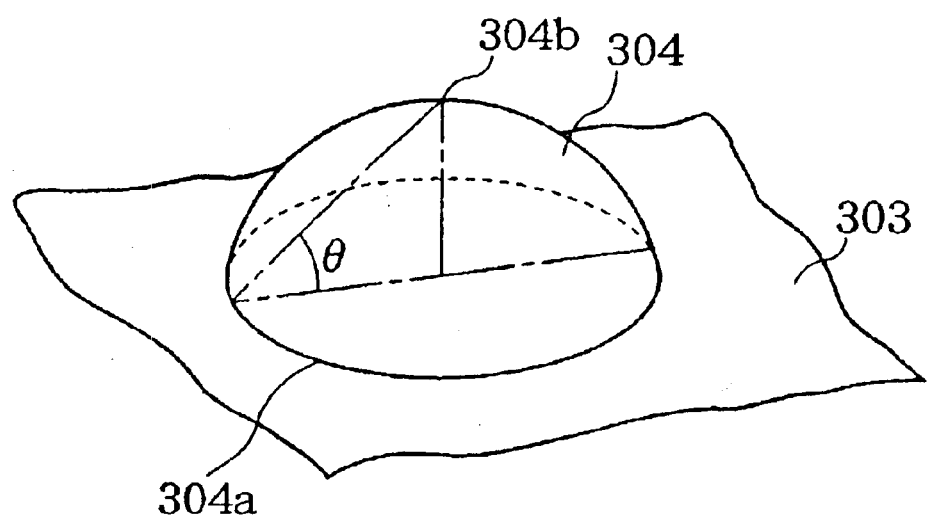
FIG. 31 is an enlarged perspective view of the convex portion 304.

The convex portion 304 is circular in cross section taken along the line in parallel with the substrate 302. The surface thereof has a gently curved shape. In this event, an angle formed between a straight line that connects a predetermined point on the outer periphery 304a of the bottom surface of the convex portion 304 (in this embodiment, since the bottom surface of the convex portion 304 is circular, the average tilt angle θ is identical for any points on the outer periphery 304a of the bottom surface, and therefore the above-mentioned predetermined point means any point on the outer periphery 304a of the bottom surface in this embodiment) and an apex 304b of a convex portion 304, and the bottom surface of the convex portion 304, is defined as the average tilt angle θ (see FIG. 30 and FIG. 31) of the convex portion, then the average tilt angles θ are almost identical for all convex portions 304. What should be noted is that almost no error is present in the average tilt angle θ with respect to a set value obtained in a design stage. Thus, features thereof are: the accuracy of the concave/convex shape is high for the thin light reflecting film 305 and the accuracy is extremely high on the reflection characteristics of the reflector. The reason lies in the fact that the thin light reflecting film 305 covers the convex portions 304 and the irregularities on the thin light reflecting film 305 reflects the contour of the surfaces of the convex portions 304. The predetermined point on the outer periphery 304a of the bottom surface of the above-mentioned convex portion means a predetermined point such as, for example, a point where the outer periphery 304a traverses across the major axis, or alternatively, a point where the outer periphery 304a traverses across the minor axis, when the bottom surface of the convex portion 304 is elliptical. Therefore, the average tilt angle θ is uniquely defined on the basis of the predetermined point. Reasons why the convex portions 304 having an average tilt angle θ can be prepared with high accuracy are described in detail in conjunction with the description of the manufacturing method below.

As applications of the reflectors according to the present invention, it can be applied to a reflector in a reflective liquid crystal display panel. The reflector according to the present invention is not limited thereto. Instead, it can be applied widely to other technical fields, such as reflectors for optical equipment.

Figure 32:
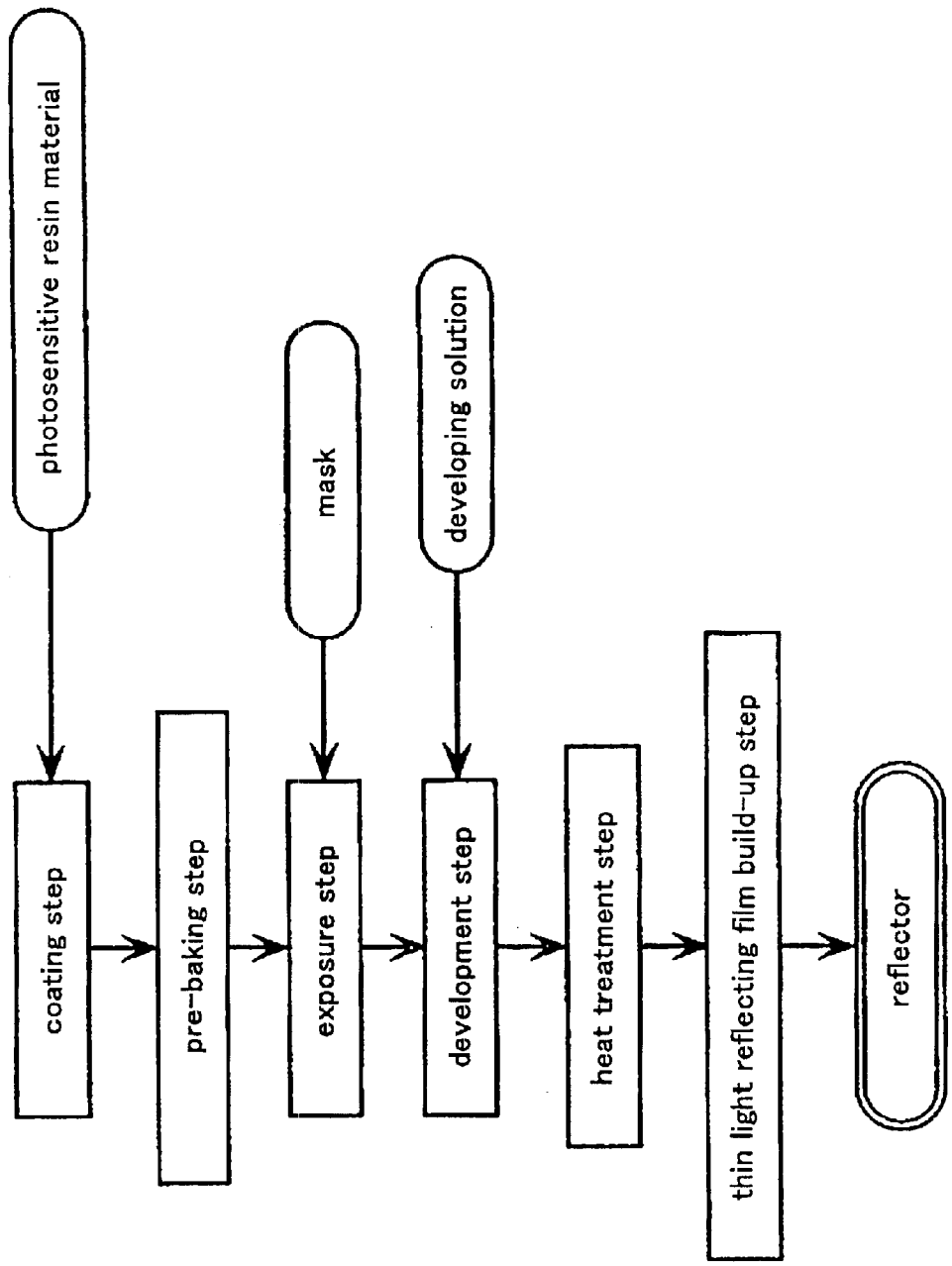
FIG. 32 is a flow chart illustrating steps of manufacturing the reflector according to the embodiment 3-1.
Figure 33:
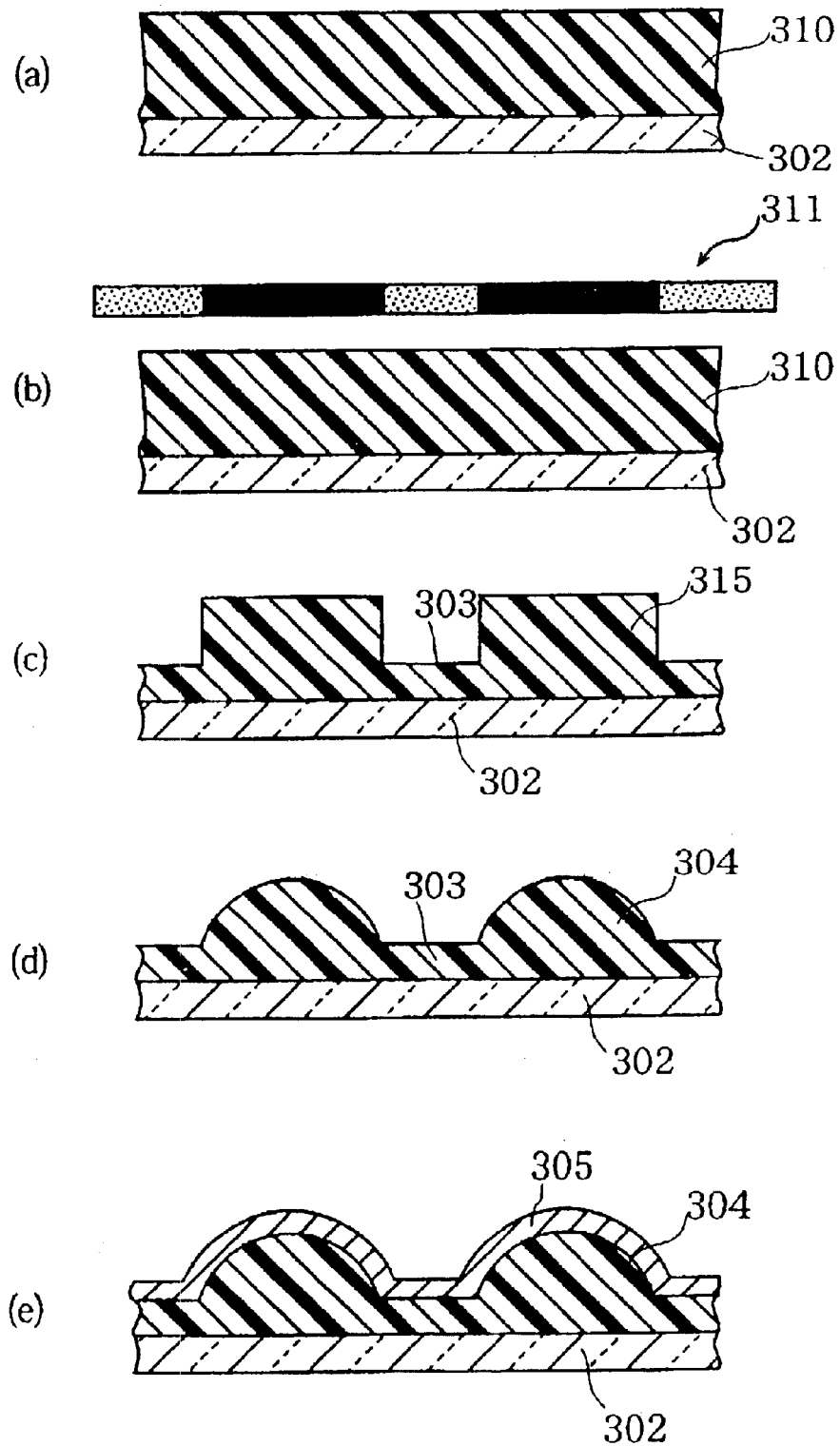
FIG. 33 is a cross-sectional view illustrating steps of manufacturing the reflector according to the embodiment 3-1.

FIG. 32 is a flow chart illustrating steps of manufacturing a reflector. FIG. 33 is a cross-sectional view illustrating steps of manufacturing a reflector. First, referring to FIG. 32 and FIG. 33, a method for manufacturing the reflector having the above-mentioned configuration is described schematically, following which the major feature(s) of the present invention, that is, a detailed method for manufacturing the convex portions 304 having generally constant average tilt angle θ, and reasons why the convex portions 4 having generally constant average tilt angle θ can be obtained by using this manufacturing method, is/are described.

A method for manufacturing a reflector is outlined below. The reflector is prepared basically through six steps: a coating step, a pre-baking step, an exposure step, a development step, a heat treatment step, and a thin light reflecting film build-up step. These steps are described briefly below.

First, the photosensitive resin 310 is applied to the substrate 302 (coating step: see FIG. 33(*a*)). Subsequently, the substrate 302 on which the photosensitive resin 310 is applied is pre-baked (pre-baking step). Then, the photomask 311 having a predetermined pattern is placed above the substrate 302, and ultraviolet light is directed to the photosensitive resin 310 through the photomask 311 (exposure step: see FIG. 33(*b*)). Next, the photosensitive resin 310 is developed using a developing solution. This produces the residual film 303 having a predetermined thickness and the column-shaped body 315 having a predetermined shape (a circular column-shaped body in this embodiment) are formed (development step: see FIG. 33(*c*)). Subsequently, the column-shaped body 315 is molten by a heating treatment. As a result, the convex portion 304 having an average tilt angle of θ is formed (heat treatment step: see FIG. 33(*d*)). Next, a plurality of convex portions 304 are covered, a thin metal film of, for example, aluminum (Al) is deposited to form the thin light reflecting film 305 (thin light reflecting film build-up step: see FIG. 33(*e*)). Thus, the reflector 1 shown in FIG. 28 is prepared.

In the manufacturing method described above, the fact that the average tilt angle θ of the convex portions 304 can be produced with high accuracy is the major feature of the present invention. More specifically, it can be achieved by (1) setting the aspect ratio γ of the column-shaped body 315 to the value as described below; and (2) controlling the thickness of the residual film 303 and the heating temperature. Reasons therefor are described below.

Figure 34:
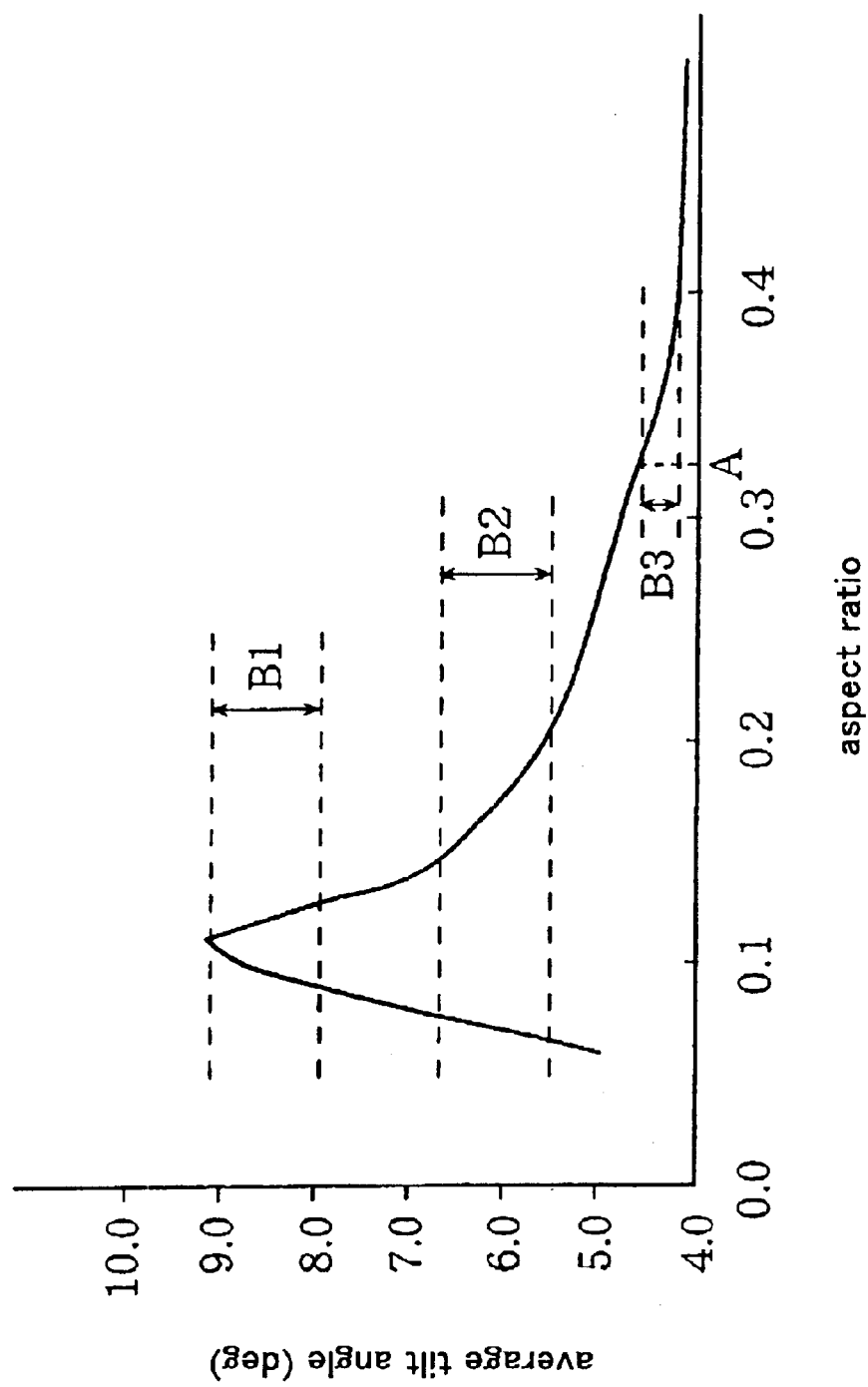
FIG. 34 is a graphical representation of the aspect ratio γ vs. average tilt angle θ characteristics.

In melt deformation of the column-shaped body 315 to form the convex portions 304, the average tilt angle θ of the convex portion 304 and the aspect ratio γ of the column-shaped body 315 exhibit the characteristic curve as shown in FIG. 34. Here, the aspect ratio γ of the column-shaped body 315 means a ratio H/D between the diameter D of the cross section of the column-shaped body 315 and the height H thereof. The height H of the column-shaped body 315 is a height from the residual film 303. Therefore, by controlling the thickness of the residual film 303, the height H of the column-shaped body 315 can be varied. In addition, as the aspect ratio γ, the cross-sectional area S of the column-shaped body 315 may be used in place of the diameter D, to produce a ratio H/S between the cross-sectional area S and the height H. It is preferable to use the ratio H/S for the aspect ratio γ particularly when the cross section is elliptic, polygonal, or has any other irregular shape.

The aspect ratio γ vs. average tilt angle θ characteristics, which indicate the change in average tilt angle θ as a function of the change in aspect ratio γ was found by the present inventors according to results of experiments. As apparent from FIG. 34, the aspect ratio γ vs. average tilt angle θ characteristics are found to have characteristics in which, when the aspect ratio γ is gradually increased from a value close to zero, the average tilt angle θ reaches a maximum value through an incremental change process and then converges to a certain value through a decremental process. FIG. 34 illustrates the relation between the aspect ratio γ and the average tilt angle θ, obtained by measuring the average tilt angle θ of the convex portions 304 after the melt deformation, when the diameter D of the cross-section of the column-shaped body 315 is changed with the heating temperature and heating time kept constant and the height H of the column-shaped body 315 fixed. While the change in aspect ratio γ is such that the height H is fixed and the diameter D is changed in FIG. 34, the present inventors have found that similar characteristics can be obtained with a fixed diameter D and a varied height H. It has also been found that a similar relation is established between the above-mentioned aspect ratio γ and the average tilt angle θ regardless of the type of the photosensitive resin.

The characteristics shown in FIG. 34 are considered to be obtained because of the following reasons. The column-shaped body 315 begins to melt from the tip thereof when it is subjected to heating. Thermal deformation gradually proceeds. During this time, the convex portion 304 lifts up due to coagulating force at the portion of the softened photosensitive resin. The degree of lifting up increases as the aspect ratio γ increases. Therefore, the average tilt angle θ increases along with the increase in aspect ratio γ. When a load that is caused by the lifted-up convex portion 304 exceeds the coagulating force at the portion of the softened photosensitive resin, the softened portion is shifted from being lifted up to being widened. As a result, the height of the convex portion 304 has the maximum value at this critical point. Then, the degree of spreading of the softened portion increases as the aspect ratio γ increases. The average tilt angle θ of the convex portion 304 becomes smaller and smaller accordingly. It approaches the convergence value as the aspect ratio γ increases. This can be expected that, when the volume of the softened portion exceeds a certain limit, it approaches a contact angle that is determined mainly depending on an inherent wettability of the photosensitive resin that forms the convex portion 304.

In the characteristics shown in FIG. 34, variation in average tilt angle is smaller than variation in aspect ratio under conditions where the aspect ratio is significantly high, as compared with, for example, conditions where the average tilt angle reaches the maximum, when effects of the average tilt angle θ on the variation of the aspect ratio γ is taken into consideration. In other words, the equation B1, B2>>B3 holds wherein B1 represents a varied region for the average tilt angle with respect to the variation in aspect ratio near the maximum value, B2 represents a varied region for the average tilt angle with respect to the variation in aspect ratio during the incremental process or near the decremental process, and B3 represents a varied region of the average tilt angle with respect to the variation in aspect ratio in the region where the average tilt angle converges to a certain value. This means that the aspect ratio, when being set to have a value that is not smaller than a convergence starting point A of the average tilt angle θ, hardly affects an average tilt angle θ that is obtained eventually even when the aspect ratio varies significantly, and that an average tilt angle that is almost equal to a desired average tilt angle θ can be obtained. Accordingly, a larger margin for the manufacturing process can be provided with the aspect ratio γ being set to have a value not smaller than the convergence starting point A. Consequently, the average tilt angle can be produced with high accuracy for the actually manufactured things, without being affected by, for example, processing errors during the manufacture.

As described above, when the aspect ratio γ is set to have a value not smaller than the convergence starting point A, a larger margin can be provided for the manufacturing process. However, this is not sufficient to produce a reflector having desired reflection characteristics. This is because to control the average tilt angle θ to a desired angle is essential to manufacture the reflector having the desired reflection characteristics.

With this respect, in order to control the average tilt angle θ, it was found that it can be achieved by changing various parameters, such as residual film thickness, heating temperature, and shape of the column-shaped body. Now, description is made with reference to FIG. 35.

Figure 35:
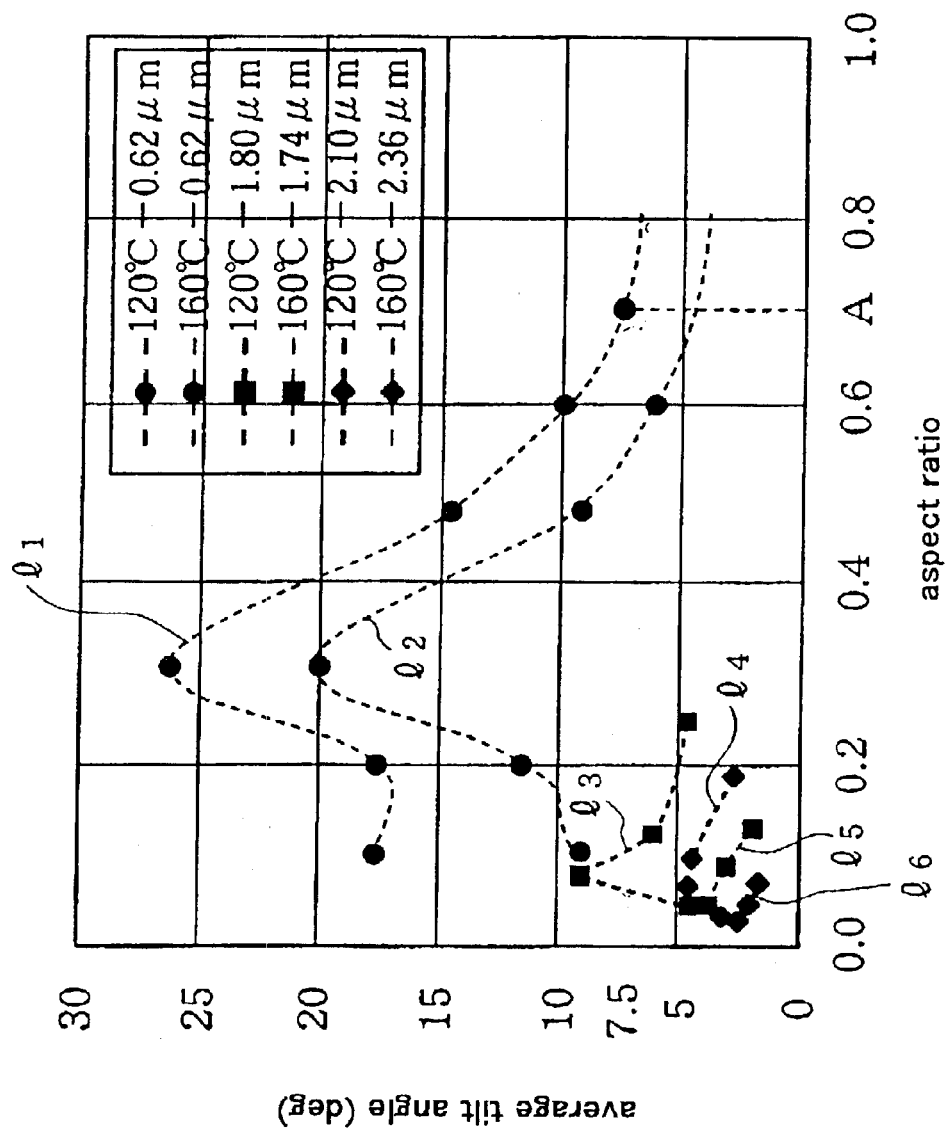
FIG. 35 is a graphical representation of the aspect ratio γ vs. average tilt angle θ characteristics depending on the change in thickness of a residual film and heating temperature.

FIG. 35 is a graphical representation of the aspect ratio γ vs. average tilt angle θ characteristics depending on the change in thickness of a residual film and heating temperature. In FIG. 35, the line L1 represents a case where the heating temperature is 120° C. and the thickness of the residual film is 0.62 μm. The line L2 represents a case where the heating temperature is 160° C. and the thickness of the residual film is 0.62 μm. The line L3 represents a case where the heating temperature is 120° C. and the thickness of the residual film is 1.80 μm. The line L4 represents a case where the heating temperature is 160° C. and the thickness of the residual film is 1.74 μm. The line L5 represents a case where the heating temperature is 120° C. and the thickness of the residual film is 2.10 μm. The line L6 represents a case where the heating temperature is 160° C. and the thickness of the residual film thickness is 2.36 μm. It should be noted that the heating time and other conditions are same for all cases. From the lines L1 and L2 in FIG. 35, it is demonstrated that the average tilt angle converges to a small value with a high heating temperature and the average tilt angle converges to a large value with a low heating temperature, when the thickness of the residual film is identical. Likewise, from the lines L1, L3, and L5 or the lines L2, L4, and L6 in FIG. 35, it is demonstrated that the average tilt angle converges to a small value with a large thickness of the residual film and the average tilt angle converges to a large value with a small thickness of the residual film, when the heating temperature is identical.

As apparent from the above, the convergence value of the average tilt angle θ can be varied by changing the heating temperature or the thickness of the residual film, even for the same aspect ratio. In other words, it is understood that the average tilt angle can be controlled by changing the heating temperature or the thickness of the residual film. The present inventors have found that the average tilt angle converges to a small value when a photosensitive resin used is high in wettability, while the average tilt angle converges to a large value when a photosensitive resin used is low in wettability. Thus, the choice of the photosensitive resin materials also determines the average tilt angle. Furthermore, the average tilt angle is expected to be controlled depending on the shape of the column-shaped body, the viscosity of the photosensitive resin material, or atmospheres during manufacture.

Next, in accordance with the above-mentioned outline about the manufacturing method, and based on the characteristics shown in FIG. 34 and FIG. 35, a method for manufacturing the reflectors according to the present invention is described in detail.

(1) Determination of Aspect Ratio γ

First, prior to practical manufacture of the reflectors, the aspect ratio γ is determined. To determine the aspect ratio γ, various aspect ratio γ vs. average tilt angle θ characteristics are previously obtained through experiments with different thickness of the residual films at different heating temperatures, using a photosensitive resin when it is already determined which one of the photosensitive resin material is to be used. In the case where a reflector having an average tilt angle θ=θp is manufactured, aspect ratio vs. average tilt angle characteristics should be found where the average tilt angle θp becomes equal to the convergence value. Then, one of the values, which is not smaller than the convergence starting point A of the aspect ratio vs. average tilt angle characteristics, is determined as the aspect ratio γ.

For example, it is assumed that the average tilt angle θp=7.5. First, the aspect ratio vs. average tilt angle characteristics is found where the convergence value of the average tilt angle becomes equal to 7.5. In this case, the reference numeral 11 in FIG. 35 corresponds to the aspect ratio vs. average tilt angle characteristics where the convergence value becomes equal to 7.5. Thus, a value not smaller than the convergence starting point A, for example, the aspect ratio γ=0.8 is determined. The thickness of the residual film is 0.62 μm, and the heating temperature is 120° C. Under such conditions, the reflector is manufactured using the method that is already described in conjunction with FIG. 31 and FIG. 32.

(2) Coating Step

First, as shown in FIG. 33(*a*), a photosensitive resin material is applied by spin coating to the substrate 302 (trade name: 1737, available from Corning Incorporated). As coating conditions, for example, spin coating is made at a rotation speed of 700 rpm for 30 seconds to achieve the film thickness of the coated film of 3.6 μm.

(3) Pre-Baking Step

Next, the substrate 302 on which the photosensitive resin material is coated is subjected to pre-baking at 105° C. for 90 seconds to evaporate any solvents in the coated film, thereby to form the photosensitive resin layer 310.

(4) Exposure Step

Subsequently, as shown in FIG. 33(*b*), the photomask 314 is placed above the photosensitive resin layer 310. The ultraviolet ray is irradiated and exposed through the photomask 311 (exposure step). In this event, a pattern of the light-shielding element of the photomask 311 (diameter of a circular pattern), the exposure amount, the exposure time, and the development time in the development step which is described below, are previously determined so that a predetermined thickness of the residual film and a predetermined aspect ratio γ (the thickness of the residual film is 0.62 μm and the aspect ratio γ is 0.8 when the average tilt angle θp=7.5) are obtained.

(5) Development Step

Next, an aqueous solution containing 0.4% NMD-3 (trade name) available from Tokyo Ohka Co., Ltd. is used as a developing solution for development to remove unnecessary portions (development step). This step produces the residual film 303 and a plurality of column-shaped bodys 315 on the substrate 302 as shown in FIG. 33(*c*). It is desirable that the width (diameter) of the column-shaped body that is manufactured in the present invention is not smaller than 1 μm. When it is smaller than 1 μm, it becomes difficult to form a column-shaped body having such dimensions because an exposure limit is exceeded. When the reflector is applied to a reflective liquid crystal display panel, it is desirable that the height of the column-shaped body is not larger than 30 μm. When the height is larger than 30 μm, differences in irregularities are caused in a larger area. Consequently, nonuniformity of cell gaps becomes too large, deteriorating visual qualities such as uneven displays.

It is desirable that the film thickness of the photosensitive resin layer 310 is not smaller than 1 μm. When it is smaller than 1 μm, differences in irregularities on the surface of the thin light reflecting film 305 become too small. This increases the amount of light to be reflected in the direction of the regular reflection, which is not preferable. When the reflector is applied to a reflective liquid crystal display panel, it is desirable that the photosensitive resin layer 310 has a film thickness of not larger than 10 μm. When it is larger than 10 μm, differences in irregularities become too large. Consequently, nonuniformity of cell gaps becomes too large, deteriorating visual qualities such as uneven displays.

(6) Heat Treatment Step

Next, as shown in FIG. 33(d), the substrate 302 is heated at 120° C. for 5 minutes to make a heat treatment. This produces the residual film 303 and a plurality of convex portions 304. In this event, the aspect ratio γ of the column-shaped body 315 is set to have the above-mentioned value, so that larger manufacturing margins are available. Consequently, almost all convex portions 304 have generally identical average tilt angles. In other words, the convex portions can be formed that have an average tilt angle corresponding to a set value, without being affected by processing errors, if any, in the manufacturing steps.

There are all sorts of devices and approaches in methods for manufacturing a reflector according to prior arts in order to produce the average tilt angle of the convex portions with high accuracy. However, these are merely theoretical that work in a design stage. A manufacturing margin is small. On the other hand, processing errors or others occur when reflectors are manufactured in practice. Even when the average tilt angle can theoretically be obtained with high accuracy, the actual convex portions that are manufactured in practice using the method in question have significant variations in average tilt angles thereof.

Figure 36:
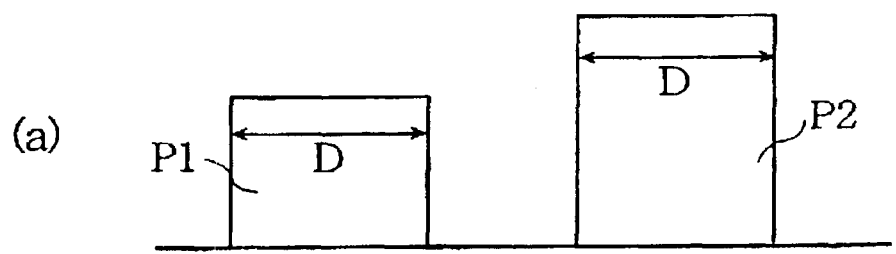
FIG. 36 is a view that is used to describe a difference of effects of processing errors between a prior art and the present invention.
Figure 36:
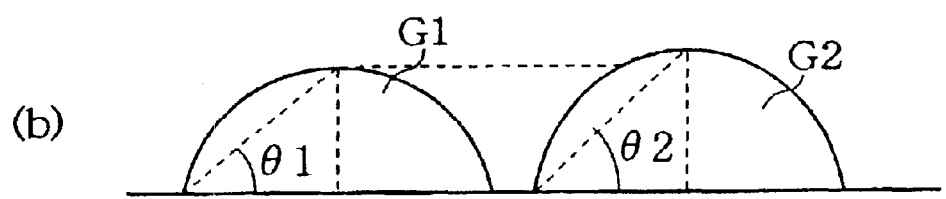
Figure 36:
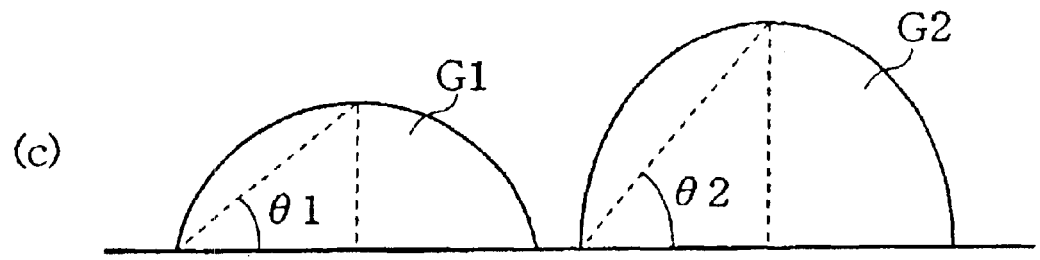

With this respect, referring to FIG. 36, comparison is made between the prior art and the present invention for the purpose of description. As shown in FIG. 36(a), it is assumed that column-shaped bodys P1 and P2 are formed that are same in diameter D but are different in height due to processing errors. In this event, in the prior art, an average tilt angle θ1 of a manufactured convex portion G1 is different from an average tilt angle θ2 of a convex portion G2, as shown in FIG. 36(c). On the contrary, in the present invention, the manufactured convex portions G1 and G2 have close similarity with each other, and the average tilt angle θ1 is thus generally equal to the average tilt angle θ2, as shown in FIG. 36(b).

In addition, in the manufacturing method according to the present invention, a plurality of curved convex portions 4 can be formed without covering an additional resin layer on the convex portions which is necessary for the prior arts. Therefore, a step of covering the resin layer can be eliminated from the prior arts, which allows reduction of costs and time for the manufacture.

(7) Thin Light Reflecting Film Build-Up Step

Subsequently, a plurality of convex portions 304 are coated and a thin metal film of, for example, aluminum (Al) is deposited to form the thin light reflecting film 305. The reflector as shown in FIG. 28 is prepared in this manner. The reflector 301 has the average tilt angle of the convex portions which is generally equal to the set value. Therefore, irregularities of the thin light reflecting film 305 that is formed on the convex portions 304 almost follows the settings. A reflector having desired reflection characteristics and be obtained accordingly.

Figure 37:
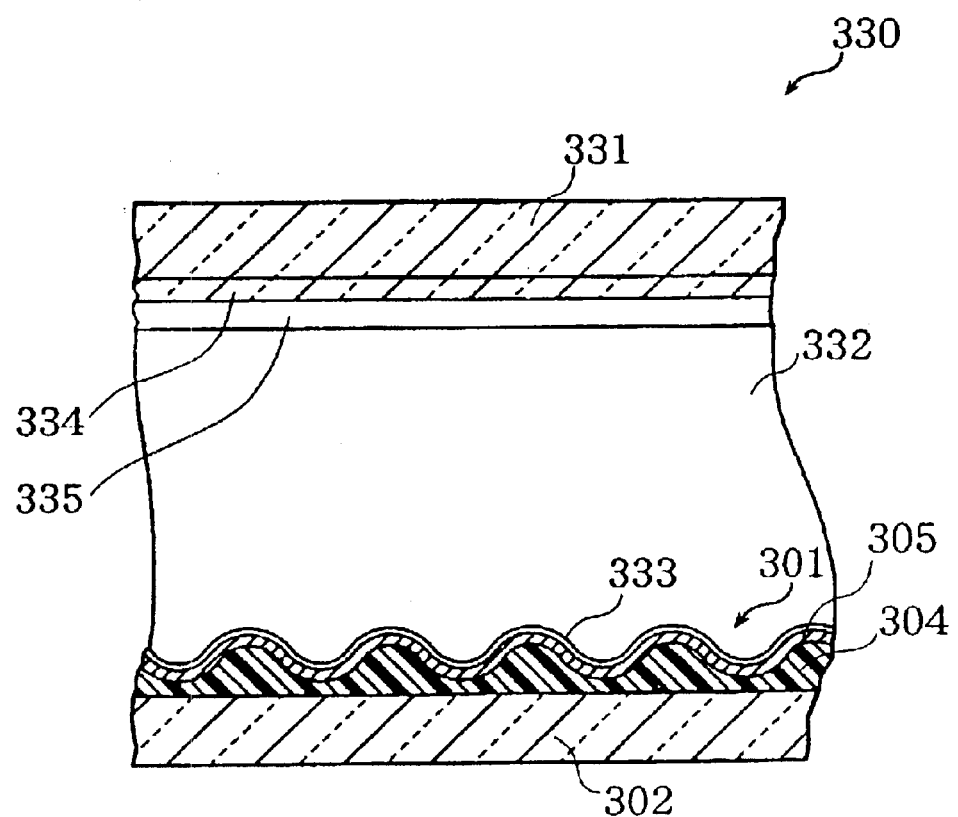
FIG. 37 is a cross-sectional view of essential parts of a reflective liquid crystal display panel that uses the reflector of the embodiment 3-1.

Next, description is made in conjunction with a case where the reflector having the above-mentioned configuration is applied to a reflector in a reflective liquid crystal display panel. FIG. 37 is a cross-sectional view of essential parts of the reflective liquid crystal display panel in question. A reflective liquid crystal display panel 330 comprises the reflector 301, an opposing substrate 331 (on the side of the top surface), and a liquid crystal layer 332 that is disposed between the reflector 301 and the opposing substrate 331. An alignment film 333 is formed on the thin light reflecting film 305 of the reflector 301. It should be noted that the thin light reflecting film 305 serves as a pixel electrode.

The above-mentioned opposing substrate 331 is a light-transmissive substrate such as, for example, a glass substrate. A transparent electrode 334 of indium tin oxide (ITO) is formed on the opposing substrate 331. Furthermore, an alignment film 335 is formed on the transparent electrode 334. The above-mentioned liquid crystal layer 332 is configured along with a guest-host liquid crystal where black dichroic pigments are dissolved. The above-mentioned alignment films 333 and 335 are made of, for example, a polyimide resin. Their alignment direction is opposed to each other. The alignments of the liquid crystal molecules are over the full 360 degrees of rotation between the substrates.

Examination of display states achieved by the reflective liquid crystal display devices having the above-mentioned configuration indicated that visual qualities are obtained that is remarkably bright over a wide range, exhibits good PAPER WHITE APPEARANCE, and provide good contrast.

For the reference purpose, there are some prior arts that use an aspect ratio of, for example, about 0.43 which is a value used in, for example, the above-mentioned embodiment. However, even when the aspect ratio has the same value, the significance of the aspect ratio differs between the prior arts and the present invention. More specifically, in the prior arts, it is not the aspect ratio within the region where the average tilt angle θ converges. On the contrary, in the present invention, the aspect ratio used is that within the region where the average tilt angle θ converges. Accordingly, in the prior arts, the average tilt angles of the convex portions manufactured are varied, and the reflection characteristics of the reflector are not those desirable. On the other hand, in the present invention, the aspect ratio within the region where the average tilt angle θ converges is used as described above. This allows a larger manufacturing margin. It is possible to form convex portions having a desired average tilt angle without being affected by processing errors, if any.

(Embodiment 3-2)

Figure 38:
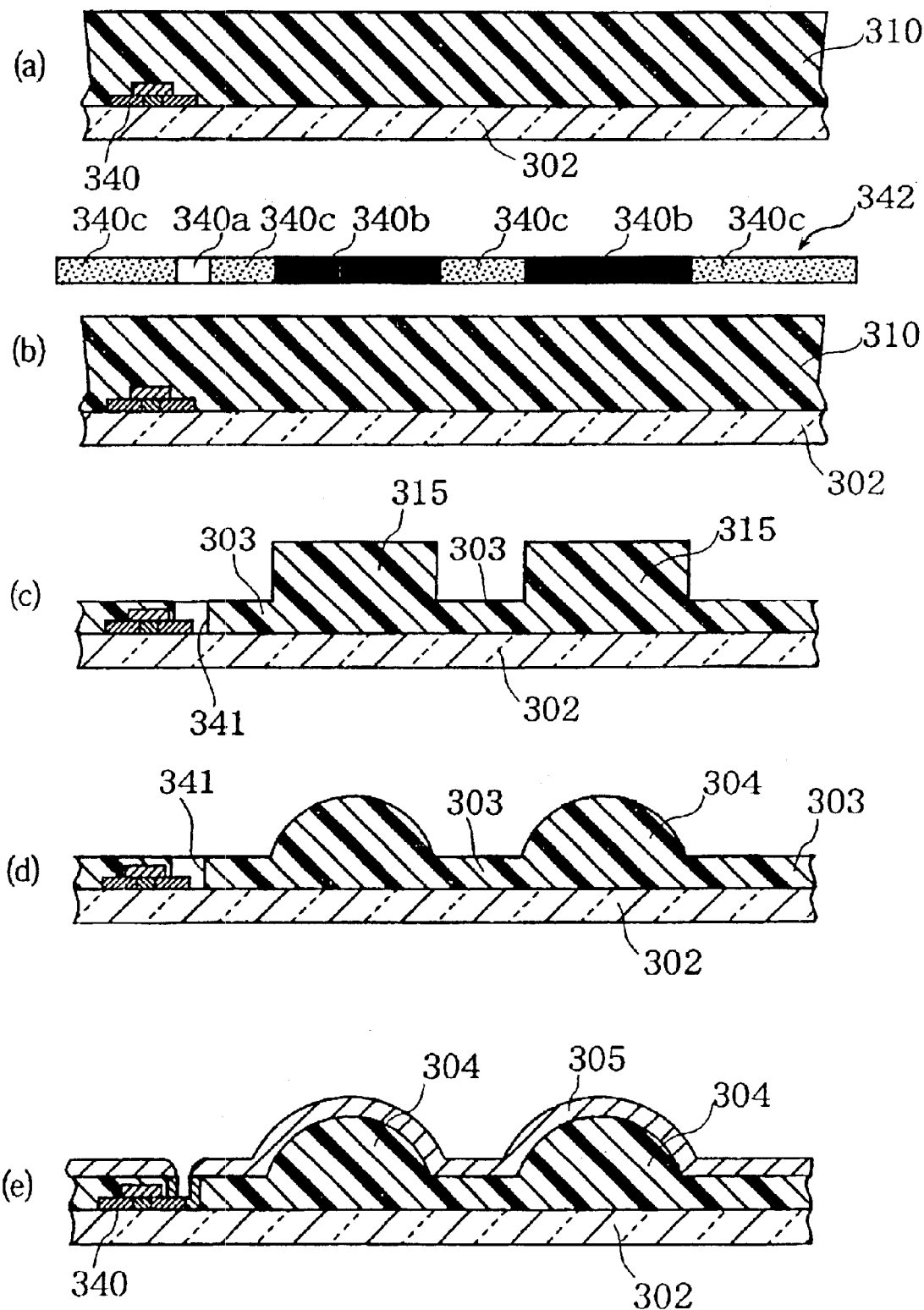
FIG. 38 is a cross-sectional view illustrating steps of manufacturing a reflector according to the embodiment 3-2.

FIG. 38 is a cross-sectional view illustrating steps of manufacturing a reflector according to the embodiment 3-2. The reflector according to this embodiment is a reflector that is used in active matrix type reflective liquid crystal display panels. A method for manufacturing such reflectors is similar to the manufacturing method according to the above-mentioned embodiment 3-1. It should be noted, however, that there are slight differences because the reflector of the embodiment 3-2 is a reflector that is used for an active matrix type reflective liquid crystal display panel. Description is made with the emphasis on features of the manufacturing method according to the embodiment 3-2.

The reflector of this embodiment 3-2 comprises a thin film transistor(TFT) 340 formed thereon that serves as a pixel switching cell. Therefore, a contact hole 341 (FIG. 38(c)) is necessary to electrically connect the TFT 340 and the thin light reflecting film 305 that serves as a pixel electrode. To this end, no residual film is allowed around the position where the contact hole is to be formed. A residual film, if present around the position where the contact hole is to be formed, may cause inferior conduction and deterioration of visual qualities.

Figure 39:
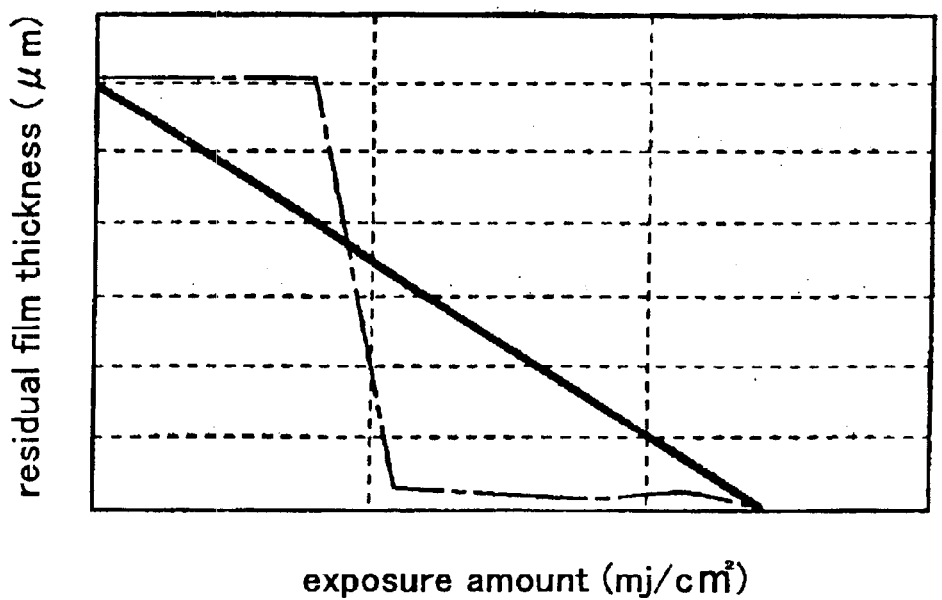
FIG. 39 shows a characteristic curve of a low γ resist.

Taking the above into consideration, a low γ positive resist (trade name: PC409, available from JSR) was used as the photosensitive resin. In the above-mentioned embodiment 1, it is not necessarily to use a low γ resist as the photosensitive resin. On the contrary, in the embodiment 2, the low γ resist should always be used. Reasons thereof are described below. The low γ resist has characteristics that as the integrated exposure amount increases, the thickness of the residual film decreases linearly as depicted by a solid line in FIG. 39. With typical photosensitive resin materials, as depicted by a broken line in FIG. 39, the thickness of the residual film is constant to a certain integrated exposure amount and the thickness of the residual film suddenly drops after the subject integrated exposure amount is exceeded. In the present invention, it is necessary to provide portions where no residual film is present, a residual film, and a column-shaped body that is integrally formed with the residual film. With typical photosensitive resin materials, it becomes difficult to strip off the residual film around the position where the contact hole is to be formed while controlling the thickness of the residual film in other sites. Thus, it is impossible to manufacture the above-mentioned configuration according to the present invention. With this respect, the low γ resist allows easy manufacture of the above-mentioned configuration according to the present invention by controlling the integrated exposure amount because it exhibits the characteristics depicted by the solid line in FIG. 39.

In the manufacturing method according to this embodiment, a photomask used in the exposure step is the one that has the configuration shown in FIG. 38(b). More specifically, a photomask 342 is configured with an ultraviolet ray transmitting region 340a . . . , an ultraviolet ray shielding region 340b . . . , and a region 340c . . . that has a smaller light-shielding index than the light-shielding region. The regions 340a, 340b, and the region 340c are circular or elliptical. The region 340a is for forming the contact hole 341 while the region 340b is for forming the column-shaped body 315. The region 340c is for forming the residual film 3. In the region 340, apertures each of which has a size corresponding to or around the exposure limit can be provided by forming a mesh.

With the used of the photomask 342, the exposure amount is adjusted. Portions that are well etched and hardly etched during the development are formed. As shown in FIG. 33(d), it is possible to form the contact hole 341, the residual film 302 and the convex portions 304 on the substrate 302. When the convex portions 304 are covered, and a thin metal film of, for example, aluminum (Al) is deposited to form the thin light reflecting film 305, the thin light reflecting film 305 and the TFT 340 are electrically connected to each other via the contact hole 341 (FIG. 33(e)).

(Embodiment 3-3)

Figure 40:
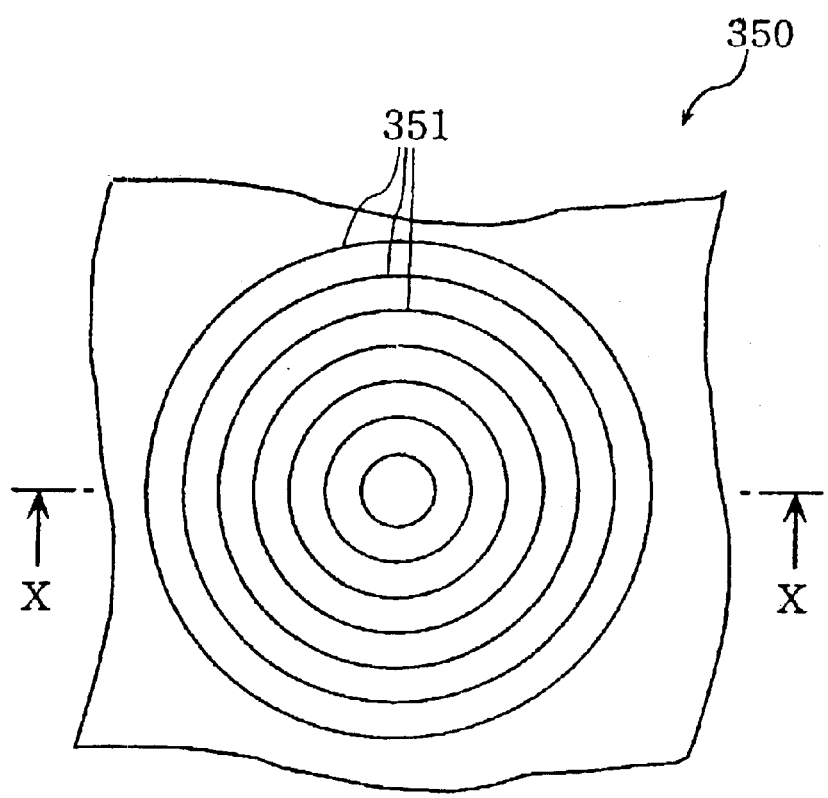
FIG. 40 is a plan view of essential parts of a reflector according to the embodiment 3-3.
Figure 41:
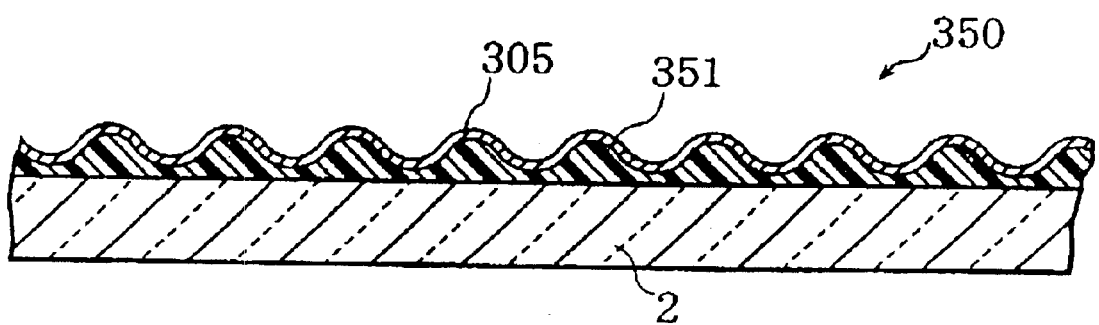
FIG. 41 is a cross section taken in the direction of arrow X—X in FIG. 40.
Figure 42:
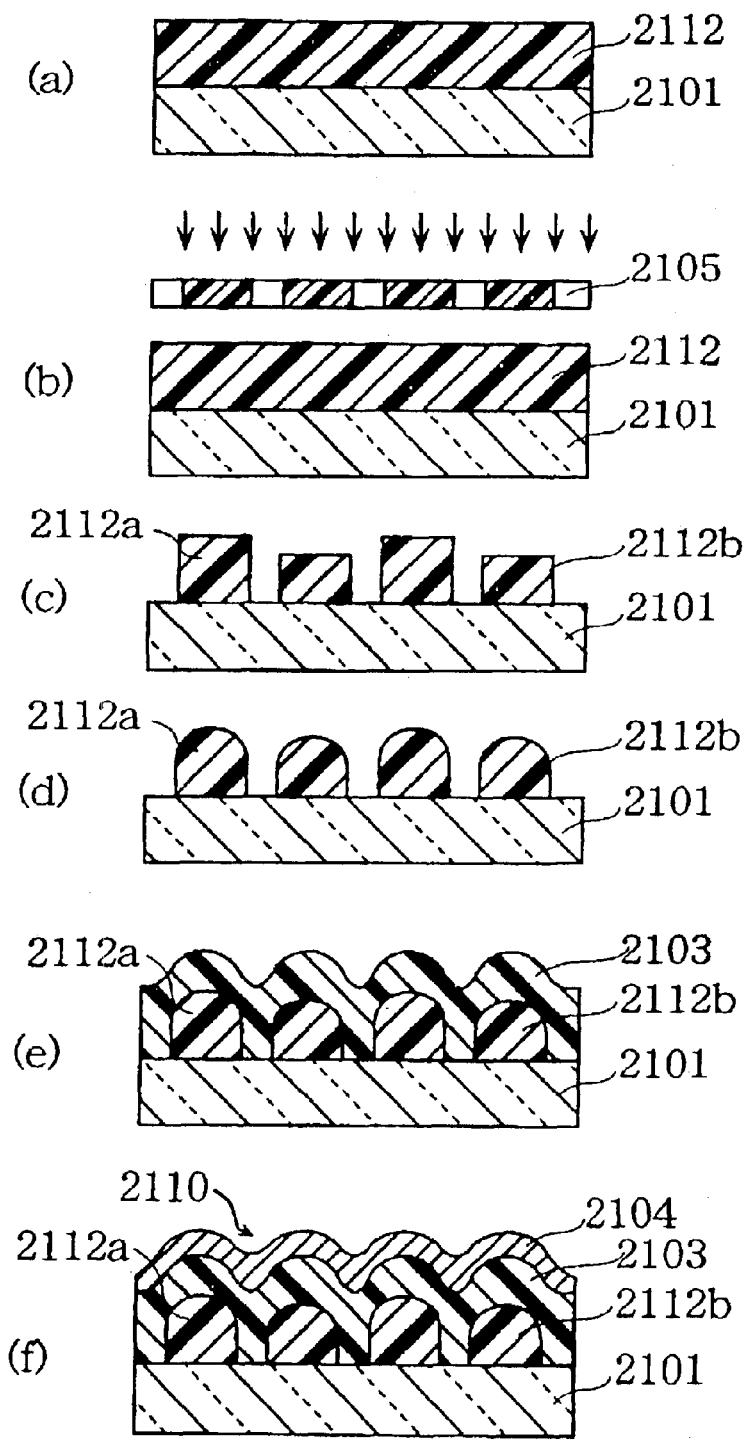
FIG. 42 is a cross-sectional view illustrating steps of a conventional manufacturing method.

FIG. 40 is a plan view of essential parts of a reflector according to the embodiment 3-3. FIG. 41 is a cross section taken in the direction of arrow X—X in FIG. 40. The embodiment 3-3 is an example where the present invention is applied to a diffraction grating type reflector. The embodiment 3-3 is similar to the embodiment 3-1. Accordingly, similar components and parts are depicted by like reference numerals. In this embodiment 3-3, convex portions 351 are used that are arranged concentrically, in place of the convex portions 304 in the embodiment 3-1. The convex portions 351 are obtained by melt deformation of column-shaped bodyd that are made of a photosensitive resin material and arranged concentrically.

A diffraction grating type reflector 350 having such configurations was manufactured using the manufacturing method according to the above-mentioned embodiment 3-1 to prepare a reflective liquid crystal display panel, in which the average tilt angle on sides of the convex portions 351 became almost equal to a set value. A reflective liquid crystal display panel having a wide color reproduction range was produced accordingly.

As apparent from the above, in diffraction grating type reflectors having characteristics with which light is divided due to reflective diffraction, high accuracy is required for the tilt angle on the side of the convex portions 351. Therefore, it is particularly useful to prepare them using the manufacturing method according to the present invention. The pattern of the diffraction grating is not limited to concentric ones. Instead, parallel arrangements may also be used.

(Other Considerations)

(1) In the above-mentioned embodiment, the same photosensitive resin is deposited as the residual film on the lower part of the convex portion. However, another photosensitive resin may be deposited and thereafter the above-mentioned positive resist PC409 available from JSR may be applied thereto before the exposure development with a photomask. This also allows any average tilt angle over a stable region having a large process margin. This is also feasible.

(2) Alternatively, the same positive resist PC409 available from JSR may be applied and then a heating treatment may be made. Subsequently, the PC409 may be applied and the exposure and development are made through a photomask before the formation of concave/convex structure members. This is also feasible.

(3) In the above-mentioned embodiment, a single photosensitive resin layer is formed. However, after the application of, for example, a photosensitive resin, the same photosensitive resin may be applied to produce a two-layered photosensitive resin layer. The exposure and development may be made through a photomask to form convex portions. Alternatively, after the application of the first photosensitive resin layer, the same photosensitive resin may be applied after the steps such as a heating treatment, electron beam irradiation, ultraviolet light irradiation, and the exposure and development may be made through a photomask to form convex portions. A stable region can be defined arbitrarily even when the first photosensitive resin layer is different from the second photosensitive resin layer laminated thereon. This is also feasible. Furthermore, a substance having almost equal surface energy to that of the second photosensitive resin layer may be deposited in the first layer in place of the photosensitive resin, following which the second layer may be deposited. With this process, a stable region can be defined arbitrarily. This is also feasible.

(4) In the above-mentioned embodiment, upon the formation of the column-shaped body, a photolithographic procedure is used. However, other methods, such as, molds and other methods may be used to form the column-shaped body. This is also feasible as long as a photosensitive resin is used.

(5) In the above-mentioned embodiment, the photosensitive resin is formed on the substrate, and a photolithographic procedure is used to form the convex portions. However, a thermoplastic resin may be formed above the substrate and convex portions may be formed by a heating treatment.

INDUSTRIAL APPLICATION FIELD

As described above, according to the present invention, the following effects and advantages can be obtained.
(1) Effects of First Group of Inventions
(1) As apparent from the above, it is a reflector having at least two regions on which cells are arranged regularly. Overlap of the diffracted lights from the regions could restrict clouring due to the diffracted lights.

(2) In addition, the clouring due to the diffracted lights could further be restricted by using a reflector having at least two regions on which cells are arranged regularly at a given pitch.

(3) Furthermore, it is a reflector having at least two regions on which cells are arranged regularly in pixels corresponding to color filters. Overlap of the diffracted lights from the regions could restrict clouring due to the diffracted lights.

(4) In addition, the clouring due to the diffracted lights could further be restricted by using a reflector having at least two regions that have different polarization properties for reflected lights relative to the incident lights.

(5) White display was less or not accompanied with clouring in a reflective liquid crystal display panel that uses any one of the above-mentioned reflectors.

(6) White display produced good visual qualities without any clouring in a reflective display device that uses any one of the above-mentioned reflective liquid crystal display panels.

(7) White display produced good display with less clouring in a reflective/transmissive liquid crystal display panel that uses a reflector according to the present invention.

(8) Furthermore, white display achieved using a reflective/transmissive liquid crystal display device that uses a liquid crystal display panel according to the present invention resulted in good display with less clouring.

(2) Effects of Second Group of Inventions

A single-layered concave/convex structure is formed that has a sloped surface by means of applying a negative photosensitive polymer to a substrate, and then making exposure from the backside. It is not necessary to control a concave/convex shape through thermal annealing, so that productivity is improved at lower costs.

(3) Effects of Third Group of Inventions

A significantly larger process margin can be used than those in the prior arts. Therefore, it is not affected by, for example, processing errors. The convex portions actually formed have an average tilt angle which is almost equal to a set value. Consequently, a surface of a thin light reflecting film that covers the convex portions has a desired contour of irregularities. A reflector and a reflective liquid crystal display panel that are superior in contrast characteristics and PAPER WHITE APPEARANCE can be obtained.

What is claimed is:

1. A reflector comprising two or more regions having different optical characteristics from each other, characterized in that:

said two or more regions each has a plurality of small reflection cells that reflect light, average pitches between the adjacent reflection cells in each region being different from each other.

2. A reflector characterized by comprising two or more types of regions having different polarization characteristics, the regions including a plurality of diffusive or reflective small cells that are arranged thereon.

3. A reflector characterized by comprising two or more types of regions having different reflection characteristics of a reflected light, the regions including a plurality of diffusive or reflective small cells that are arranged thereon.

4. The reflector am claimed in claim 1, characterized in that reflected liqhts have different diffraction angles in said two or more types of regions.

5. The reflector as claimed in claim 4, characterized in that an average pitch between said cells is different.

6. The reflector as claimed in claim 4, charactetized in that the minimum and maximum diffraction angles with respect to said two or more types of regions generally overlap with each other.

7. A reflector comprising two or more regions having different optical characteristics from each other, characterized in that:

said two or more regions each has a plurality of small reflection cells that reflect light, the arrangement of the reflection cells in one region of said two or more regions corresponds to an arrangement that is obtained by rotating the arrangement of the reflection cells in other region.

8. The reflector as claimed in claim 5, characterized in that an arrangement of said cells has recurrency.

9. A reflector comprising two or more regions having different optical characteristics, characterized in that:

said region has a plurality of small reflection cells that reflect light, the shape or the arrangement of the reflection cells in said two or more regions having different optical characteristics being different from region to region so that the individual regions have different polarization characteristics.

10. The reflector as claimed in claim 1, characterized in that said reflection cell is formed to have a convex shape whose surface is curved.

11. A reflective liquid crystal display panel comprising a reflector according to claim 1.

12. A liquid crystal display panel comprising a reflector according to claim 1, 7, or 9.

13. A reflector comprising two or more regions having different optical characteristics from each other, characterized in that:

said two or more regions each has a plurality of small reflection cells that diffuse light, average pitches between the adjacent reflection cells in each region being different from each other.

14. A reflector comprising two or more regions having different optical characteristics from each other, characterized in that:

said two or more regions each has a plurality of small reflection cells that diffuse light, the arrangement of the reflection cells in one region of said two or more regions corresponds to an arrangement that is obtained by rotating the arrangement of the reflection cells in other region.

15. A reflector comprising two or more regions having different optical characteristics, characterized in that:

said region has a plurality of small reflection cells that diffuse light, the shape or the arrangement of the reflection cells in said two or more regions having different optical characteristics being different from region to region so that the individual regions have different polarization characteristics.

* * * * *

UNITED STATES PATENT AND TRADEMARK OFFICE
CERTIFICATE OF CORRECTION

PATENT NO.        : 6,888,678 B2
APPLICATION NO.   : 10/203930
DATED             : May 3, 2005
INVENTOR(S)       : Seiji Nishiyama et al.

It is certified that error appears in the above-identified patent and that said Letters Patent is hereby corrected as shown below:

Column 39, Line 53-56, change " A reflector characterized by comprising two or more types of regions having different polarization characteristics, the regions including a plurality of diffusive or reflective small cells that are arranged thereon." to -- The reflector as claimed in Claim 1, wherein the individual regions exhibit different diffraction angles to incident lights that are identical in wavelength and angle of incidence, in said two or more regions having different optical characteristics. --

Column 39, Line 57-60, change " A reflector characterized by comprising two or more types of regions having different reflection characteristics of a reflected light, the regions including a plurality of diffusive or reflective small cells that are arranged thereon. " to -- The reflector as claimed in Claim 1, characterized in that: the average pitch between said reflection cells is restricted so that the diffraction angles at which the maximum peak of the respective regions are achieved are generally identical to each other, and that the diffraction angles at which the minimum peak of the respective regions are achieved are generally identical to each other, when lights having different wavelengths are directed to said two or more regions to measure the intensity of a diffracted light in each region. --

Column 39, Line 61-63, change " The reflector am claimed in claim 1, characterized in that reflected lights have different diffraction angles in said two or more types of regions. " to -- The reflector as claimed in Claim 3, characterized in that: said lights having different wavelengths are at least two kinds of lights that are selected from the group consisting of a red light, a green light, and a blue light. --

Column 40, Line 1-2, change, " The reflector as claimed in claim 4, characterized in that an average pitch between said cells is different. " to -- The reflector as claimed in Claim 1, characterized in that the plurality of small reflection cells included in said each region are arranged regularly. --

Column 40, Line 3-6, change, " The reflector as claimed in claim 4, charactetized in that the minimum and maximum diffraction angles with respect to said two or more types of regions generally overlap with each other." to -- The reflector as claimed in Claim 5, characterized in that the plurality of small reflection cells included in said each region are arranged as a matrix in each region. --

UNITED STATES PATENT AND TRADEMARK OFFICE
CERTIFICATE OF CORRECTION

PATENT NO. : 6,888,678 B2
APPLICATION NO. : 10/203930
DATED : May 3, 2005
INVENTOR(S) : Seiji Nishiyama et al.

It is certified that error appears in the above-identified patent and that said Letters Patent is hereby corrected as shown below:

Column 40, Line 17-18, change, " The reflector as claimed in claim 5, characterized in that an arrangement of said cells has recurrency. " to -- The reflector as claimed in Claim 7, characterized in that the plurality of small reflection cells included in said each region are arranged as a matrix in each region. --

Column 40, Line 32-33, change, " A reflective liquid crystal display panel comprising a reflector according to claim 1. " to -- The reflector as claimed in Claim 1, characterized in that: said reflection cell is formed to have a rectangular column shape. --

Signed and Sealed this

Thirtieth Day of January, 2007

JON W. DUDAS
*Director of the United States Patent and Trademark Office*